(12) United States Patent
Rhoads et al.

(10) Patent No.: US 10,515,429 B2
(45) Date of Patent: Dec. 24, 2019

(54) IMAGE-BASED POSE DETERMINATION

(71) Applicant: Digimarc Corporation, Beaverton, OR (US)

(72) Inventors: Geoffrey B. Rhoads, West Linn, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 67 days.

(21) Appl. No.: 15/641,081

(22) Filed: Jul. 3, 2017

(65) Prior Publication Data

US 2018/0005343 A1 Jan. 4, 2018

Related U.S. Application Data

(60) Provisional application No. 62/357,879, filed on Jul. 1, 2016, provisional application No. 62/363,152, filed on (Continued)

(51) Int. Cl.
| | |
|---|---|
| *G06K 9/00* | (2006.01) |
| *G06T 1/00* | (2006.01) |
| *G06T 7/73* | (2017.01) |
| *G06T 7/32* | (2017.01) |
| *G06T 3/00* | (2006.01) |

(52) U.S. Cl.
CPC ......... *G06T 1/0092* (2013.01); *G06T 1/0064* (2013.01); *G06T 3/0006* (2013.01); *G06T 7/32* (2017.01); *G06T 7/74* (2017.01); *G06T 2201/0051* (2013.01); *G06T 2201/0052* (2013.01); *G06T 2201/0061* (2013.01); *G06T 2201/0065* (2013.01); *G06T 2201/0601* (2013.01); *G06T 2207/20021* (2013.01); (Continued)

(58) Field of Classification Search
CPC ....... G06T 1/0092; G06T 7/32; G06T 1/0064; G06T 7/74; G06T 3/0006; G06T 2201/0051; G06T 2201/0065; G06T 2201/0052; G06T 2201/0601; G06T 2207/30244; G06T 2201/0061; G06T 2207/20021
USPC ........................................................ 382/103
See application file for complete search history.

(56) References Cited

U.S. PATENT DOCUMENTS

| | | |
|---|---|---|
| 5,862,260 A | 1/1999 | Rhoads |
| 6,442,284 B1 | 8/2002 | Gustafson et al. |

(Continued)

OTHER PUBLICATIONS

International Search Report and Written Opinion dated Jan. 16, 2018 in counterpart application PCT/US2017/040610.

*Primary Examiner* — Van D Huynh
(74) *Attorney, Agent, or Firm* — Digimarc Corporation

(57) ABSTRACT

A steganographic digital watermark signal is decoded from host imagery without requiring a domain transformation for signal synchronization, thereby speeding and simplifying the decoding operation. In time-limited applications, such as in supermarket point-of-sale scanners that attempt watermark decode operations on dozens of video frames every second, the speed improvement allows a greater percentage of each image frame to be analyzed for watermark data. In battery-powered mobile devices, avoidance of repeated domain transformations extends battery life. A great variety of other features and arrangements, including machine learning aspects, are also detailed.

18 Claims, 39 Drawing Sheets

Related U.S. Application Data on Jul. 15, 2016, provisional application No. 62/366,571, filed on Jul. 25, 2016, provisional application No. 62/371,601, filed on Aug. 5, 2016, provisional application No. 62/379,578, filed on Aug. 25, 2016.

(52) U.S. Cl.
CPC ............... *G06T 2207/20048* (2013.01); *G06T 2207/20081* (2013.01); *G06T 2207/30244* (2013.01)

(56) References Cited

U.S. PATENT DOCUMENTS

| | | | |
|---|---|---|---|
| 6,483,927 B2 | 11/2002 | Brunk | |
| 6,516,079 B1 | 2/2003 | Rhoads et al. | |
| 6,580,809 B2 | 6/2003 | Sharma | |
| 6,590,996 B1 | 7/2003 | Reed et al. | |
| 6,614,914 B1 | 9/2003 | Gustafson | |
| 6,625,297 B1 | 9/2003 | Bradley | |
| 6,631,198 B1 | 10/2003 | Hannigan | |
| 6,724,914 B2 | 4/2004 | Hannigan | |
| 6,912,295 B2 | 6/2005 | Hannigan | |
| 7,013,021 B2 | 3/2006 | Sharma et al. | |
| 7,058,979 B1 | 6/2006 | Baudry et al. | |
| 7,072,490 B2 | 7/2006 | Stach | |
| 7,688,996 B2 | 3/2010 | Bradley | |
| 8,199,969 B2 | 6/2012 | Reed | |
| 9,521,291 B2 | 12/2016 | Holub et al. | |
| 2003/0081810 A1* | 5/2003 | Bradley | G06T 1/0064 382/100 |
| 2005/0018871 A1* | 1/2005 | Pun | G06T 1/0042 382/100 |
| 2010/0165158 A1 | 7/2010 | Rhoads | |
| 2010/0325117 A1 | 12/2010 | Sharma | |
| 2012/0218444 A1 | 8/2012 | Stach | |
| 2013/0183952 A1* | 7/2013 | Davis | G06T 1/0021 455/418 |
| 2013/0314541 A1 | 11/2013 | Lord | |
| 2014/0029809 A1 | 1/2014 | Rhoads | |
| 2014/0071268 A1* | 3/2014 | Lord | G01B 11/002 348/135 |
| 2014/0119593 A1* | 5/2014 | Filler | G06T 1/0064 382/100 |
| 2014/0304122 A1 | 10/2014 | Conwell | |
| 2015/0030201 A1* | 1/2015 | Holub | G06T 1/005 382/100 |
| 2015/0055855 A1 | 2/2015 | Brunk | |
| 2016/0055606 A1 | 2/2016 | Petrovic et al. | |
| 2016/0063359 A1 | 3/2016 | Vanhoucke | |
| 2016/0174902 A1 | 6/2016 | Georgescu et al. | |
| 2016/0189381 A1 | 6/2016 | Rhoads | |
| 2016/0217547 A1 | 7/2016 | Stach et al. | |

* cited by examiner

| 71 | 75 | 79 | 83 | 86 |
|----|----|----|----|----|
| 76 | 78 | 77 | 86 | 90 |
| 79 | 80 | 77 | 82 | 85 |
| 73 | 74 | 76 | 79 | 82 |
| 70 | 71 | 78 | 79 | 83 |

|   |   |   |
|---|---|---|
| +1 | -1 | -1 |
| +1 | ★ | -1 |
| +1 | +1 | -1 |

IF CENTER >= NEIGHBOR, +1
IF CENTER < NEIGHBOR, -1
OCT-AXIS = 1 + -1 + -1 + 1 + -1 + 1 + 1 + -1 = 0
OCT-AXIS-9 = 5

| OCT-AXIS | OCT-AXIS-9 | OCT-AXIS-3 |
|----------|------------|------------|
| -8 | 1 | -1 |
| -6 | 2 | -1 |
| -4 | 3 | -1 |
| -2 | 4 | 0 |
| 0 | 5 | 0 |
| 2 | 6 | 0 |
| 4 | 7 | 1 |
| 6 | 8 | 1 |
| 8 | 9 | 1 |

OCT-AXIS-9 VALUES

| - | - | - | - | - |
|---|---|---|---|---|
| - | 6 | 3 | 8 | - |
| - | 9 | 4 | 6 | - |
| - | 4 | 2 | 5 | - |
| - | - | - | - | - |

OCT-AXIS-3 VALUES

| - | - | - | - | - |
|---|---|---|---|---|
| - | 0 | -1 | 1 | - |
| - | 1 | 0 | 0 | - |
| - | 0 | -1 | 0 | - |
| - | - | - | - | - |

| 6-TUPLE OF OCT-AXIS VALUES | FOURIER COEFFICIENTS FOR ROTATION PROBABILITY FUNCTION | FOURIER COEFFICIENTS FOR SCALE PROBABILITY FUNCTION | FOURIER COEFFICIENTS FOR X-TRANSLATION PROBABILITY FUNCTION |
|---|---|---|---|
| {1,1,1,1,1,1} | {0.122,0.742,0.538,0.84,0.248...} | {0.408,0.827,0.417,0.589,0.512...} | {0.874,0.288,0.676,0.545,0.185...} |
| {1,1,1,1,1,2} | {0.634,0.418,0.866,0.648,0.762...} | {0.066,0.235,0.181,0.769,0.261...} | {0.965,0.755,0.912,0.181,0.998...} |
| {1,1,1,1,1,3} | {0.529,0.709,0.024,0.142,0.872...} | {0.311,0.664,0.572,0.854,0.933...} | {0.034,0.164,0.861,0.213,0.453...} |
| {1,1,1,1,1,4} | {0.842,0.95,0.236,0.981,0.708...} | {0.006,0.444,0.62,0.125,0.253...} | {0.701,0.147,0.57,0.291,0.751...} |
| {1,1,1,1,1,5} | {0.594,0.985,0.541,0.112,0.918...} | {0.509,0.314,0.152,0.426,0.744...} | {0.447,0.715,0.148,0.005,0.05...} |
| {1,1,1,1,1,6} | {0.459,0.496,0.923,0.092,0.981...} | {0.739,0.16,0.941,0.375,0.452...} | {0.434,0.487,0.051,0.89,0.554...} |
| {1,1,1,1,1,7} | {0.535,0.034,0.022,0.423,0.677...} | {0.461,0.471,0.34,0.175,0.12...} | {0.47,0.146,0.848,0.392,0.683...} |
| {1,1,1,1,1,8} | {0.516,0.084,0.321,0.164,0.816...} | {0.93,0.029,0.317,0.643,0.873...} | {0.567,0.706,0.874,0.297,0.974...} |
| {1,1,1,1,1,9} | {0.81,0.441,0.763,0.711,0.74...} | {0.982,0.302,0.64,0.393,0.934...} | {0.95,0.974,0.203,0.981,0.275...} |
| {1,1,1,1,2,1} | {0.622,0.098,0.278,0.358,0.001...} | {0.315,0.874,0.288,0.676,0.545...} | {0.393,0.475,0.416,0.272,0.504...} |
| {1,1,1,1,2,2} | {0.016,0.33,0.537,0.738,0.745...} | {0.3,0.965,0.755,0.912,0.181...} | {0.76,0.969,0.965,0.622,0.002...} |
| {1,1,1,1,2,3} | {0.327,0.408,0.827,0.417,0.589...} | {0.552,0.034,0.164,0.861,0.213...} | {0.18,0.505,0.808,0.545,0.696...} |
| {1,1,1,1,2,4} | {0.246,0.066,0.235,0.181,0.769...} | {0.453,0.701,0.147,0.57,0.291...} | {0.322,0.505,0.457,0.606,0.301...} |
| {1,1,1,1,2,5} | {0.364,0.311,0.664,0.572,0.854...} | {0.062,0.447,0.715,0.148,0.005...} | {0.351,0.987,0.027,0.783,0.865...} |
| {1,1,1,1,2,6} | {0.447,0.006,0.444,0.62,0.125...} | {0.67,0.434,0.487,0.051,0.89...} | {0.943,0.607,0.426,0.159,0.17...} |
| {1,1,1,1,2,7} | {0.473,0.509,0.314,0.152,0.426...} | {0.61,0.47,0.146,0.848,0.392...} | {0.481,0.173,0.318,0.028,0.482...} |
| {1,1,1,1,2,8} | {0.368,0.739,0.16,0.941,0.375...} | {0.77,0.567,0.706,0.874,0.297...} | {0.049,0.995,0.348,0.714,0.071...} |
| {1,1,1,1,2,9} | {0.573,0.461,0.471,0.34,0.175...} | {0.014,0.95,0.974,0.203,0.981...} | {0.578,0.525,0.557,0.376,0.273...} |
| {1,1,1,1,3,1} | {0.073,0.93,0.029,0.317,0.643...} | {0.374,0.393,0.475,0.416,0.272...} | {0.658,0.013,0.49,0.611,0.175...} |
| {1,1,1,1,3,2} | {0.32,0.982,0.302,0.64,0.393...} | {0.346,0.76,0.969,0.965,0.622...} | {0.151,0.223,0.448,0.815,0.406...} |
| {1,1,1,1,3,3} | {0.129,0.315,0.874,0.288,0.676...} | {0.886,0.18,0.505,0.808,0.457,0.636...} | {0.378,0.089,0.146,0.206,0.933...} |
| {1,1,1,1,3,4} | {0.169,0.3,0.965,0.755,0.912...} | {0.56,0.322,0.505,0.457,0.606...} | {0.767,0.533,0.52,0.967,0.371...} |
| {1,1,1,1,3,5} | {0.073,0.552,0.034,0.164,0.861...} | {0.147,0.351,0.987,0.027,0.783...} | {0.956,0.356,0.643,0.019,0.772...} |
| {1,1,1,1,3,6} | {0.194,0.453,0.701,0.147,0.57...} | {0.483,0.943,0.607,0.426,0.159...} | {0.85,0.132,0.57,0.235,0.735...} |
| {1,1,1,1,3,7} | {0.509,0.062,0.447,0.715,0.148...} | {0.724,0.481,0.173,0.318,0.028...} | {0.682,0.058,0.84,0.88,0.428...} |
| {1,1,1,1,3,8} | {0.199,0.67,0.434,0.487,0.051...} | {0.985,0.049,0.995,0.348,0.714...} | {0.241,0.365,0.828,0.248,0.026...} |
| {1,1,1,1,4,1} | {0.921,0.61,0.47,0.146,0.848...} | {0.614,0.578,0.525,0.557,0.376...} | {0.779,0.157,0.035,0.629,0.64...} |
| {1,1,1,1,4,2} | {0.904,0.77,0.567,0.706,0.874...} | {0.651,0.658,0.013,0.49,0.611...} | {0.835,0.147,0.927,0.582,0.461...} |
| {1,1,1,1,4,3} | {0.442,0.034,0.95,0.974,0.203...} | {0.377,0.151,0.223,0.448,0.815...} | {0.314,0.575,0.211,0.016,0.815...} |
| {1,1,1,1,4,4} | {0.179,0.374,0.393,0.475,0.416...} | {0.743,0.378,0.089,0.533,0.52,0.967...} | {0.391,0.248,0.049,0.069,0.86...} |
| {1,1,1,1,4,5} | {0.594,0.346,0.76,0.969,0.965...} | {0.879,0.767,0.533,0.52,0.967...} | {0.546,0.591,0.247,0.091,0.298...} |
| {1,1,1,1,4,6} | {0.647,0.886,0.18,0.505,0.808...} | {0.684,0.956,0.356,0.643,0.019...} | {0.212,0.815,0.346,0.455,0.358...} |
| ... | ... | ... | ... |
| {9,9,9,9,9,9} | {0.631,0.483,0.943,0.607,0.426...} | {0.047,0.241,0.365,0.828,0.248...} | {0.733,0.366,0.329,0.398,0.975...} |

← 531,441 ROWS →

FIG. 10

| 196-TUPLE | ROTATION | SCALE | X-TRANS. | Y-TRANS. |
|---|---|---|---|---|
| 0000111110101011100101110010000001010100110011101010001101101010010110100 | -0.21 | 108.759 | 80.087 | 26.412 |
| 0001100100111001010010010011001111110101010010010111101001100011011 | -27.80 | 88.332 | 44.066 | 54.679 |
| 0010010011001000101010010101010101010101011110101101010000101010100 | -7.56 | 72.096 | 85.337 | 55.736 |
| 0010011101001010001111100100000010100110101010111010101011110101111 | 26.98 | 93.929 | 65.167 | 31.406 |
| 0010101000001011101101010101010101010010111101010110010011010110 | -29.66 | 148.597 | 38.730 | 8.763 |
| 0011001101011011100011010101010010010111011110100010100101010100 | -8.43 | 108.325 | 104.011 | 32.313 |
| 0011100010101001011101010111010101010101010101101110110101010101 | -13.38 | 74.607 | 75.186 | 108.249 |
| 0100100000101010101010111010100101010101010101110101010010001000 | 12.91 | 154.231 | 3.314 | 97.798 |
| 1001011000100101011111100101010101010101010101010101010000100010 | 29.90 | 155.114 | 93.775 | 68.436 |
| 0101110101100101010100101111010101010101010101010101010001101111 | 37.86 | 134.434 | 85.745 | 19.909 |

FIG. 13

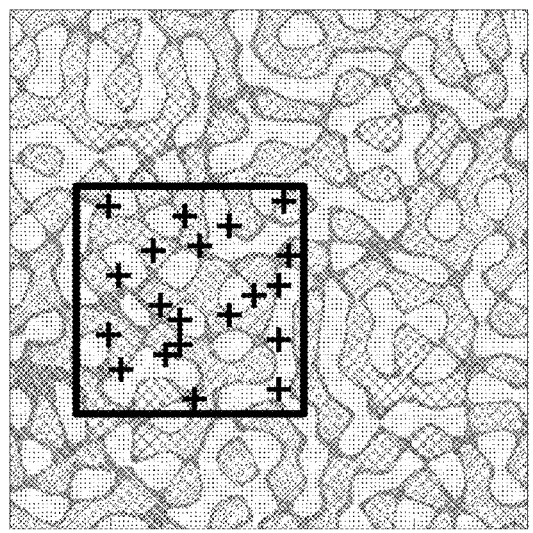
{-1,-1,1,0,0,-1,-1,0,-1,1,-1,-1,...}
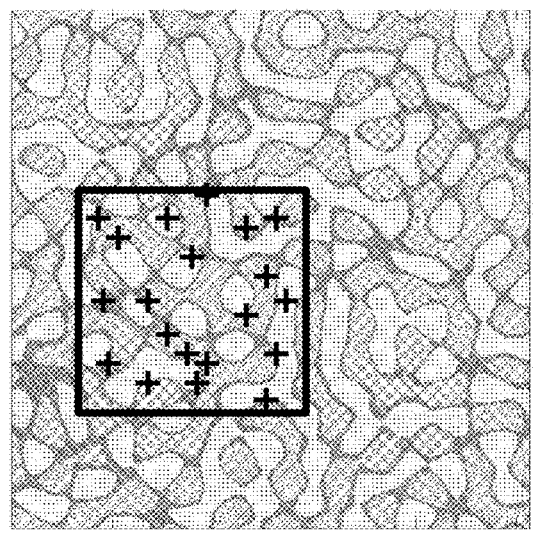
{1,1,1,-1,1,0,-1,1,1,1,1,1,0,1,...}
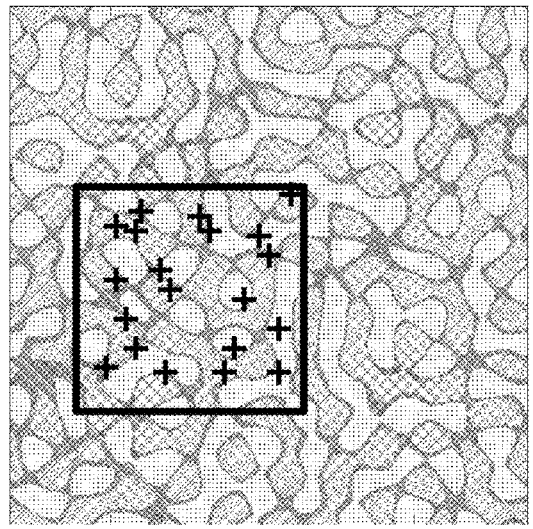
{0,0,1,1,1,-1,1,1,0,-1,1,-1,0,...}
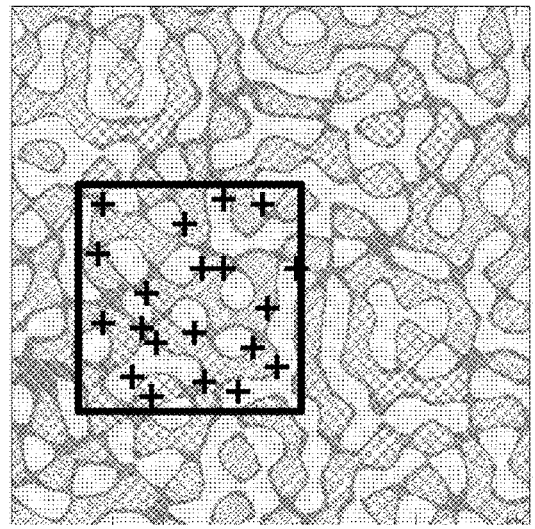
{-1,0,0,0,-1,-1,1,1,-1,-1,0,-1,...}
FIG. 19

| 40-TUPLE OF OCT-AXIS-3 VALUES | CONSTEL-LATION | X-TRANSLATION (IN 1/32 PIXELS) | Y-TRANSLATION (IN 1/32 PIXELS) | ROTATION | SCALE |
|---|---|---|---|---|---|
| {1,-1,-1,0,-1,0,1,1,-1,0... | 8 | 593 | 187 | 328.5 | 147 |
| {-1,-1,0,-1,-1,0,1,0,0,1... | 1 | 838 | 569 | 352 | 120 |
| {-1,-1,0,-1,0,1,0,1,0,1... | 7 | 293 | 982 | 188 | 67 |
| {-1,-1,0,-1,0,1,0,1,0,1,1... | 2 | 737 | 954 | 219.5 | 144 |
| {-1,-1,0,1,0,0,1,-1,0,-1... | 2 | 946 | 24 | 175 | 107 |
| {-1,-1,1,0,0,0,-1,0,-1,0... | 2 | 215 | 365 | 248.5 | 132 |
| {-1,-1,1,0,1,0,0,0,-1,0... | 4 | 770 | 352 | 10.5 | 86 |
| {-1,0,-1,1,0,0,-1,-1,1,1... | 8 | 706 | 505 | 171.5 | 139 |
| {-1,0,0,0,0,0,-1,1,1... | 1 | 489 | 411 | 213 | 133 |
| {-1,0,0,0,0,-1,1,0,0... | 6 | 326 | 125 | 72 | 105 |
| {-1,0,0,0,0,1,0,0,0,0... | 5 | 721 | 383 | 195.5 | 106 |
| {-1,0,0,0,1,-1,-1,-1,1,0... | 3 | 198 | 356 | 318 | 118 |
| {-1,0,0,1,-1,1,0,0,0,1,0... | 4 | 44 | 588 | 165.5 | 150 |
| {-1,0,1,0,-1,1,0,0,-1... | 5 | 915 | 203 | 264 | 86 |
| {-1,0,1,0,1,0,0,0,0,0... | 1 | 43 | 451 | 135.5 | 109 |
| {-1,0,1,1,1,0,0,0,0... | 6 | 768 | 485 | 255.5 | 91 |
| {-1,0,1,1,0,-1,0,0,0,-1... | 3 | 35 | 370 | 6 | 118 |
| {-1,0,1,1,0,1,0,0,-1,1... | 3 | 915 | 450 | 343 | 102 |
| {-1,1,-1,0,-1,0,-1,0,0,-1... | 1 | 952 | 456 | 6 | 121 |
| {-1,1,-1,0,-1,0,1,-1,0... | 8 | 712 | 194 | 359 | 141 |
| {-1,1,-1,0,0,0,0,0,0... | 8 | 466 | 448 | 142.5 | 103 |
| {-1,1,1,1,-1,0,-1,-1,-1... | 7 | 360 | 288 | 195 | 144 |
| {-1,1,0,-1,-1,0,1,0,0,0... | 3 | 643 | 788 | 338.5 | 119 |
| {-1,1,0,-1,-1,0,1,0,1,0... | 8 | 481 | 442 | 226 | 115 |

| 40-TUPLE OF OCT-AXIS-3 VALUES | CONSTEL-LATION | X-TRANSLATION (IN 1/32 PIXELS) | Y-TRANSLATION (IN 1/32 PIXELS) | ROTATION | SCALE | HAM. DIST. | OFFSET | HAM. DIST. | OFFSET | HAM. DIST. | OFFSET |
|---|---|---|---|---|---|---|---|---|---|---|---|
| {-1,-1,-1,0,-1,0,1,1,-1,0... | 8 | 593 | 187 | 328.5 | 147 | 1 | 433583 | 1 | 946304 | 1 | 153482 |
| {-1,-1,0,1,-1,0,1,0,0,1... | 1 | 838 | 569 | 352 | 120 | 1 | 116839 | 2 | 828339 | 1 | 870655 |
| {-1,-1,0,1,-1,0,1,0,0,1... | 2 | 293 | 982 | 188 | 67 | 1 | 748226 | 1 | 889939 | 1 | 567540 |
| {-1,-1,0,-1,0,1,0,1,0,1... | 2 | 737 | 954 | 219.5 | 144 | 1 | -1 | 1 | 432473 | 1 | 801485 |
| {-1,-1,0,1,0,0,1,-1,0,-1... | 2 | 946 | 24 | 175 | 107 | 1 | 676741 | 1 | 210214 | 1 | 989937 |
| {-1,-1,1,0,0,1,-1,0,-1,0... | 2 | 215 | 365 | 248.5 | 132 | 1 | 678837 | 1 | 223502 | 1 | 627555 |
| {-1,-1,1,0,1,0,0,-1,0,-1... | 4 | 770 | 352 | 10.5 | 86 | 1 | 498697 | 1 | 883669 | 1 | 414959 |
| {-1,0,-1,1,0,-1,-1,-1,1,1... | 8 | 706 | 505 | 171.5 | 139 | 1 | 577476 | 1 | 398551 | 1 | 844695 |
| {-1,0,0,0,0,0,0,-1,1,1... | 1 | 489 | 411 | 213 | 133 | 1 | 140170 | 1 | 994508 | 1 | 907560 |
| {-1,0,0,0,1,-1,-1,0,0,0... | 6 | 326 | 125 | 72 | 105 | 1 | 251487 | 1 | 697878 | 2 | 830634 |
| {-1,0,0,0,1,0,0,0,0,0... | 5 | 721 | 383 | 195.5 | 106 | 1 | 998433 | 2 | 549834 | 1 | 380554 |
| {-1,0,0,0,1,-1,-1,-1,1,0... | 3 | 198 | 356 | 318 | 118 | 2 | 181903 | 2 | 261028 | 1 | 214100 |
| {-1,0,0,1,-1,0,1,0,1,0... | 4 | 44 | 588 | 165.5 | 150 | 1 | 593060 | 1 | 751098 | 1 | 928712 |
| {-1,0,0,1,1,0,0,-1,1,0... | 5 | 915 | 203 | 264 | 86 | 2 | 514876 | 2 | 176387 | 1 | 704363 |
| {-1,0,0,1,0,0,0,0,0,0... | 1 | 43 | 451 | 135.5 | 109 | 1 | 368871 | 1 | 179557 | 1 | 452583 |
| {-1,0,0,1,1,0,0,0,0,0... | 6 | 768 | 485 | 255.5 | 91 | 1 | 366990 | 1 | 631432 | 1 | 359627 |
| {-1,0,0,1,1,1,0,0,0,0... | 3 | 35 | 370 | 6 | 118 | 1 | 717435 | 1 | 716560 | 2 | 324260 |
| {-1,0,1,1,0,1,0,0,-1... | 3 | 915 | 450 | 343 | 102 | 1 | 264665 | 2 | 819631 | 2 | 795275 |
| {-1,0,1,0,1,0,0,1,1... | 1 | 952 | 456 | 6 | 121 | 1 | 240481 | 1 | 81084 | 1 | 850004 |
| {-1,1,-1,0,-1,0,1,0,0,1... | 8 | 712 | 194 | 359 | 141 | 1 | 834573 | 1 | 121595 | 1 | 754346 |
| {-1,1,0,0,-1,0,1,-1,0,1... | 8 | 466 | 448 | 142.5 | 103 | 1 | 3450 | 1 | 97584 | 2 | 160792 |
| {-1,1,-1,-1,1,-1,0,-1,-1,-1... | 7 | 360 | 288 | 195 | 144 | 1 | 959653 | 1 | 43537 | 2 | 266103 |
| {-1,1,0,-1,0,-1,0,0,0... | 3 | 643 | 788 | 338.5 | 119 | 1 | 678280 | 1 | 614782 | 2 | 573216 |
| {-1,1,0,-1,1,-1,0,1,0... | 8 | 481 | 442 | 226 | 115 | 1 | 781786 | 2 | 518117 | 1 | 832070 |

| 80-TUPLE OF OCT-AXIS-3 VALUES | X-TRANSLATION (PIXELS) | Y-TRANSLATION (PIXELS) | ROTATION (DEGREES) | SCALE (%) |
|---|---|---|---|---|
| {-1,-1,-1,0,-1,0,1,1,-1,0... | 0 | 0 | 0 | 70 |
| {-1,-1,0,-1,-1,0,1,0,0,1... | 0 | 0.25 | 0 | 70 |
| {-1,-1,0,-1,-1,0,1,0,0,1... | 0 | 0.5 | 0 | 70 |
| {-1,-1,0,-1,-1,0,1,0,1,1... | 0 | 0.75 | 0 | 70 |
| ... | ... | ... | ... | ... |
| ... | ... | ... | ... | ... |
| {-1,-1,0,1,0,0,1,-1,0,-1... | 0.25 | 0 | 0 | 70 |
| {-1,-1,1,0,0,0,-1,0,-1,0... | 0.25 | 0.25 | 0 | 70 |
| {-1,-1,1,0,1,0,0,0,-1,0... | 0.25 | 0.5 | 0 | 70 |
| {-1,0,-1,1,0,0,-1,-1,-1,1... | 0.25 | 0.75 | 0 | 70 |
| ... | ... | ... | ... | ... |
| ... | ... | ... | ... | ... |
| {-1,0,0,0,0,0,0,-1,1,1... | 0 | 0 | 2.5 | 70 |
| {-1,0,0,0,0,0,-1,1,0,0... | 0 | 0.25 | 2.5 | 70 |
| {-1,0,0,0,0,1,0,0,0,0... | 0 | 0.5 | 2.5 | 70 |
| {-1,0,0,0,1,-1,-1,-1,-1,0... | 0 | 0.75 | 2.5 | 70 |
| ... | ... | ... | ... | ... |
| ... | ... | ... | ... | ... |
| {-1,0,0,1,-1,0,1,0,1,0... | 0 | 0 | 0 | 75 |
| {-1,0,0,1,0,-1,1,0,0,-1... | 0 | 0.25 | 0 | 75 |
| {-1,0,0,1,0,0,0,0,0,0... | 0 | 0.5 | 0 | 75 |
| {-1,0,0,1,1,1,0,0,0,0... | 0 | 0.75 | 0 | 75 |
| ... | ... | ... | ... | ... |
| ... | ... | ... | ... | ... |
| {-1,-1,1,0,1,0,0,0,-1,0... | 31.75 | 29.75 | 357.5 | 140 |
| {-1,0,1,1,0,-1,0,0,0,-1... | 31.75 | 30 | 357.5 | 140 |
| {-1,0,1,1,0,1,0,0,-1,1... | 31.75 | 30.25 | 357.5 | 140 |
| {-1,1,-1,0,-1,0,-1,0,0,-1... | 31.75 | 30.5 | 357.5 | 140 |
| {-1,1,-1,0,0,-1,0,1,-1,0... | 31.75 | 30.75 | 357.5 | 140 |
| {-1,1,-1,0,0,0,0,0,0,0... | 31.75 | 31 | 357.5 | 140 |
| {-1,1,-1,1,1,-1,0,-1,-1,-1... | 31.75 | 31.25 | 357.5 | 140 |
| {-1,1,0,-1,-1,0,-1,0,0,0... | 31.75 | 31.5 | 357.5 | 140 |
| {-1,1,0,-1,-1,1,-1,0,1,0... | 31.75 | 31.75 | 357.5 | 140 |

FIG. 23

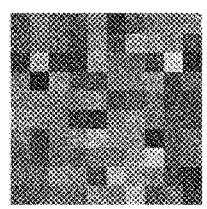 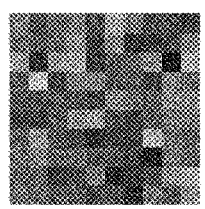
FIG. 27A  FIG. 27B
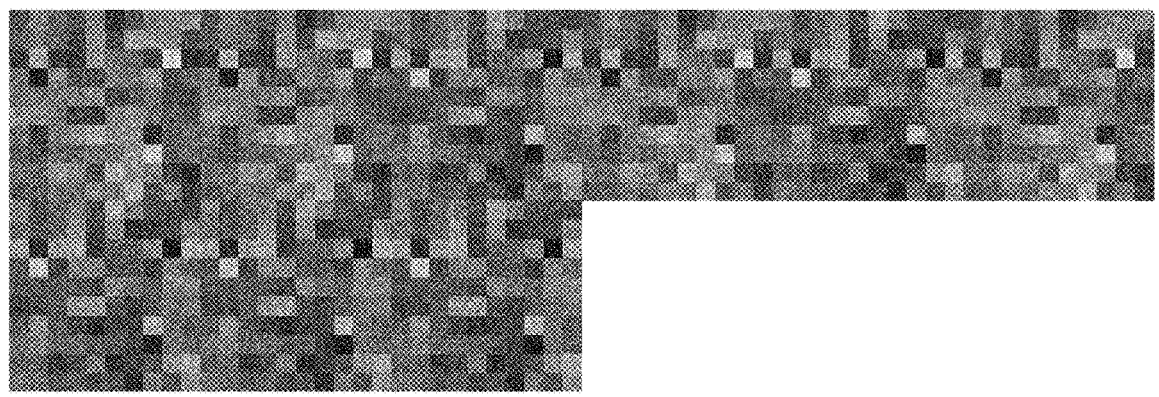
FIG. 28
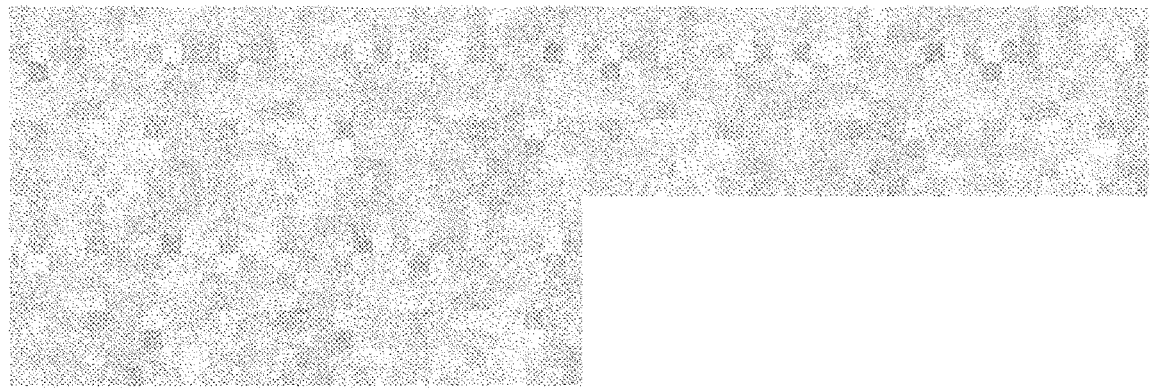
FIG. 29

FIG. 31

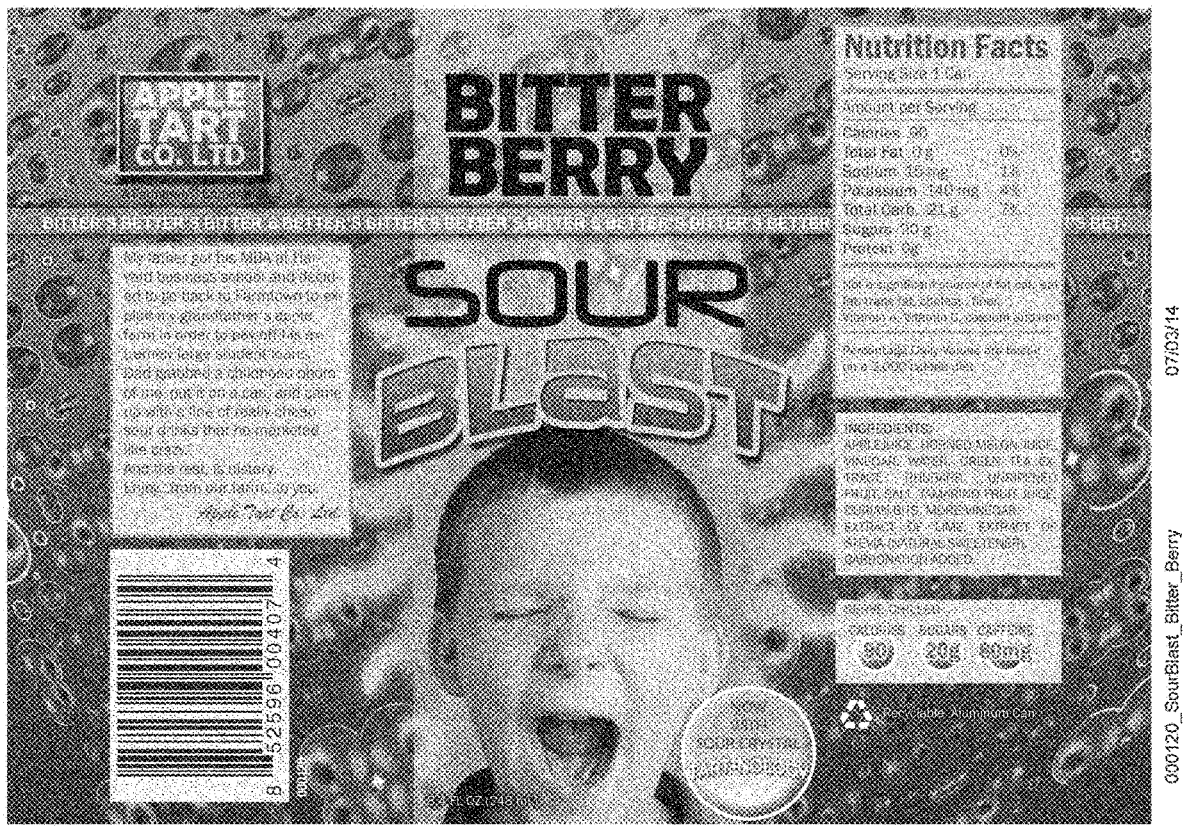
FIG. 32
FIG. 33A
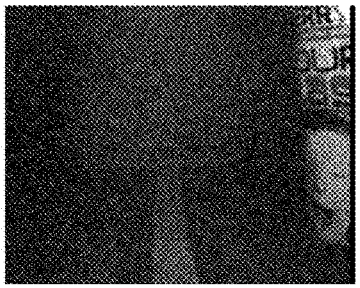
FIG. 33B
FIG. 33C
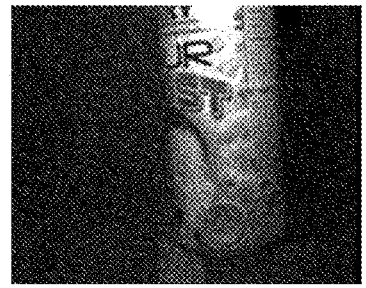
FIG. 33D
FIG. 33E
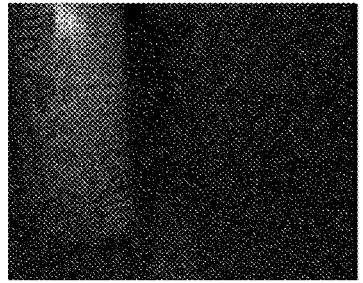
FIG. 33F

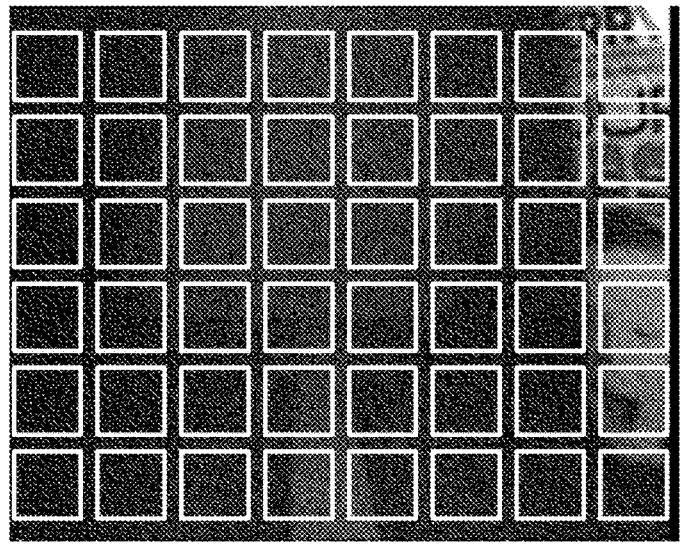
FIG. 36
FIG. 37
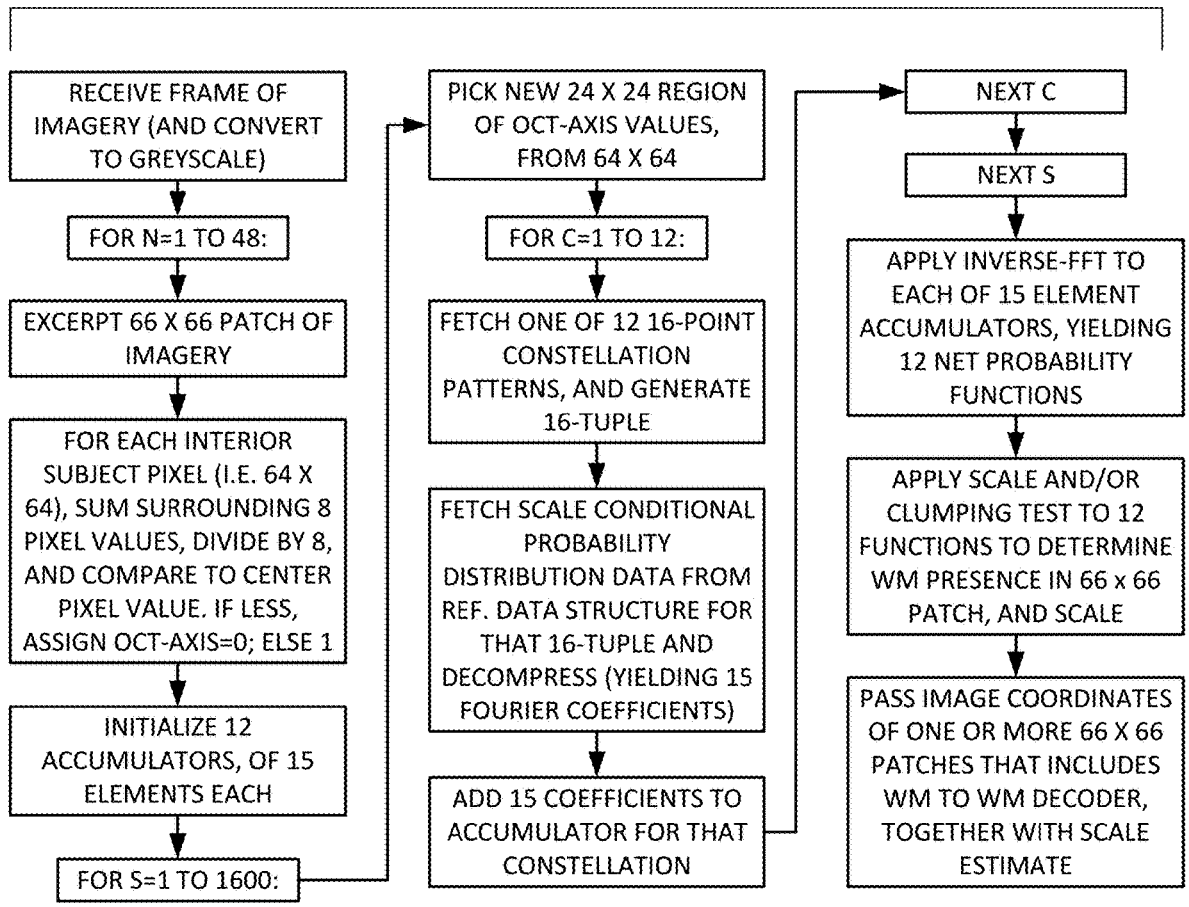

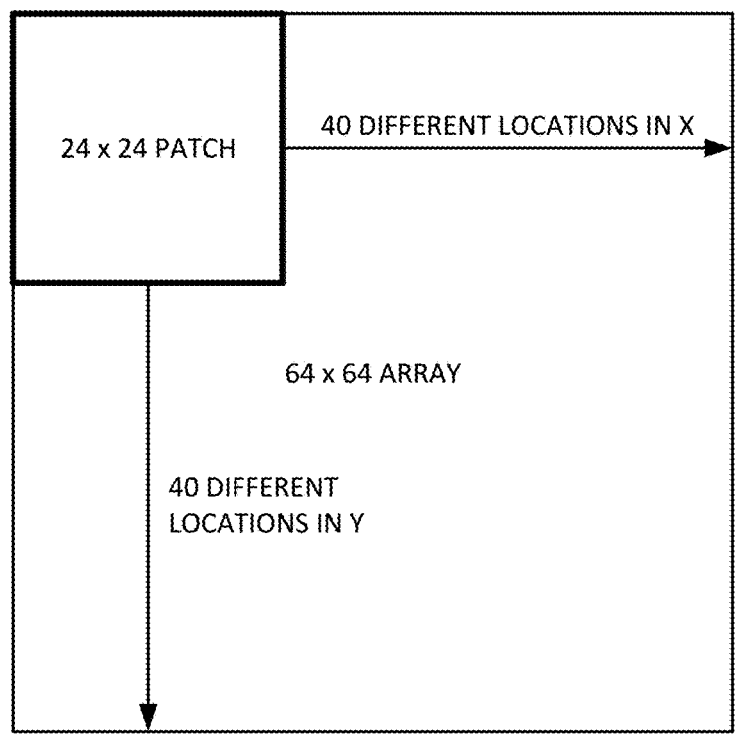
FIG. 38
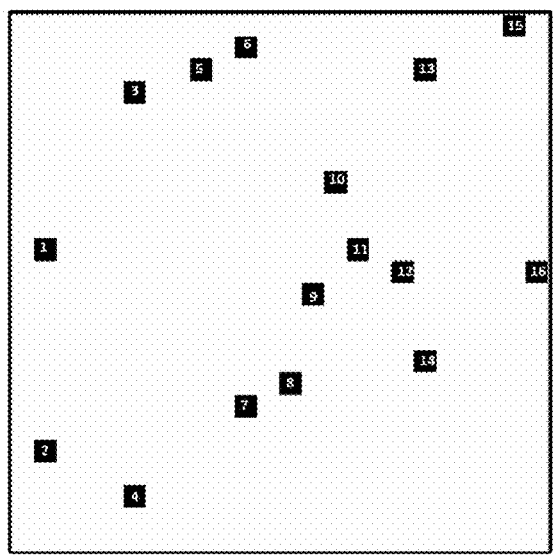 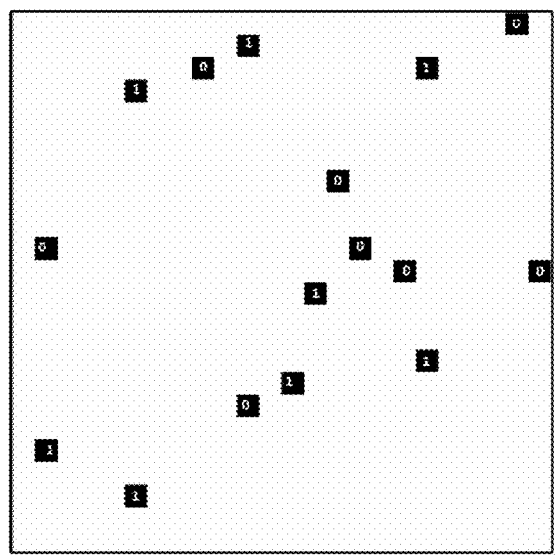
FIG. 39A  FIG. 39B

| +A | -A | +B | -B |
|----|----|----|----|
| -A | +A | -B | +B |
| +C | -C | +D | -D |
| -C | +C | -D | +D |

| +A | +B | -A | -B |
|----|----|----|----|
| +C | +D | -C | -D |
| -A | -B | +A | +B |
| -C | -D | +C | +D |

FIG. 48

|   |    |    |    |
|---|----|----|----|
| a |    | -a |    |
|   | -a |    | -a |
| a |    | -a |    |
|   | a  |    | a  |

FIG. 49

| a  | b  | -a | -b | c  | d  | -c | -d |
|----|----|----|----|----|----|----|----|
| -d | -a | -b | -a | -b | -c | -d | -c |
| a  | b  | -a | -b | c  | d  | -c | -d |
| -d | a  | b  | a  | b  | c  | d  | c  |
| e  | f  | -e | -f | g  | h  | -g | -h |

IMAGE-BASED POSE DETERMINATION

RELATED APPLICATION DATA

The present application claims priority to provisional applications 62/357,879, filed Jul. 1, 2016; 62/363,152, filed Jul. 15, 2016; 62/366,571, filed Jul. 25, 2016; 62/371,601, filed Aug. 5, 2016; and 62/379,578, filed Aug. 25, 2016. These applications are incorporated-by-reference, as if fully set forth herein.

BACKGROUND AND SUMMARY

Digital watermark technology is known, e.g., from Digimarc's U.S. Pat. Nos. 6,408,082, 6,590,996 and 7,046,819, and publications 20060013395 and 20110274310.

As is familiar to artisans, and as detailed in the cited patents, a digital watermark steganographically conveys a payload of hidden auxiliary data, e.g., in imagery. It also often includes a watermark calibration signal. This calibration signal (which can comprise a known reference signal in a transform domain, such as a pattern of plural impulses in the spatial frequency domain) enables a watermark detector to discern how an image submitted for decoding has been geometrically transformed since it was originally encoded. For example, the calibration signal (which may be called an orientation signal or reference signal) allows the detector to discern an amount by which the image has been shifted in X- and Y-directions (translation), an amount by which it has been changed in scale, and an amount by which it has been rotated. Other transform parameters (e.g., relating to perspective or shear) may also be determined. With knowledge of such "pose" information (geometric state information), the watermark detector can compensate for the geometrical distortion of the image since its original watermarking, and can correctly extract the payload of hidden auxiliary data (watermark message).

As camera-equipped processing devices (e.g., smartphones and point of sale terminals) proliferate, so do the opportunities for watermark technology. However, in certain applications, the computational burden of determining pose (e.g., the scale, rotation and translation of the watermarked object as depicted in imagery captured from the sensor's viewpoint, relative to an original, nominal state) can be an impediment to adoption of the technology.

An example is in supermarket point of sale (POS) scanners that are used to read watermarked product identifiers (e.g., "Global Trade Identifier Numbers," or GTINs) encoded in artwork of certain retail product packages (e.g., cans of soup, boxes of cereal, etc.). Such POS cameras commonly grab 40-60 frames every second. If all frames are to be processed, each frame must be processed in 25 (or 16) milliseconds, or less. Since watermarked product markings have not yet supplanted barcode markings, and are not expected to do so for many years, POS scanners must presently look for both barcodes and watermarks in captured image frames. The processor chips employed in POS systems are usually modest in their computational capabilities.

For many years, POS scanners processed only barcodes, and were able to apply nearly all of the available processing capability, and nearly the full 25 millisecond frame interval, to the task. With the emergence of watermarked GTINs, POS equipment had to perform two image processing tasks in the time formerly allocated to only one, i.e., now processing both barcodes and watermarks. Given the larger installed base of barcodes, barcode processing gets the lion's share of the processing budget. The smaller processing budget allocated to watermark processing (just a few milliseconds per frame) must encompass both the task of determining the pose with which the object is depicted in the image frame, and then extracting the GTIN identifier through use of the pose data. Between the two tasks, the former is the more intensive.

There are various approaches to determining pose of a watermarked object depicted in imagery. One employs a transform from the pixel (spatial) domain, into a Fourier-Mellin (a form of spatial-frequency) domain, followed by matched filtering, to find the calibration signal within the frame of captured imagery. This is shown, e.g., in U.S. Pat. Nos. 6,424,725 and 6,590,996. Another employs a least squares approach, as detailed in U.S. Pat. No. 9,182,778 and in pending application Ser. No. 15/211,944, filed Jul. 15, 2016, and Ser. No. 15/628,400, filed Jun. 20, 2017. The former method employs processor-intensive operations, such as a domain transformation of the input image data to the Fourier-Mellin domain. The latter method employs simpler operations, but is iterative in nature, so it must cycle in order to converge on a satisfactory output. Both approaches suffer in applications with tight constraints on processing resources and processing time.

The very short increment of time allocated for watermark processing of each captured image, and the computational intensity of the pose-determination task, has been a persistent problem. This has led prior art approaches to resort to analyzing just a very small subset of the captured imagery for watermark data. An illustrative system analyzes just 3 or 4 small areas (e.g., of 128×128 pixels each), scattered across a much larger image frame (e.g., 1280×1024 pixels), or on the order of 5% of the captured imagery.

The performance of watermark-based systems would be vastly improved if the computational complexity of pose determination could be shortcut.

In accordance with certain embodiments of the present technology, object pose is determined without resort to complex or iterative operations. Instead, such embodiments employ a store of reference information to discern the pose with which an object is depicted in captured imagery. Memory lookups are exceedingly fast, and allow pose to be determined with just a small fraction of the computational intensity and time required by previous methods.

In other embodiments, object pose is determined by presenting an excerpt of image-related data to a convolutional neural network, which has been trained with reference data of known object pose to establish the values of its parameters and weights. With a quick sequence of multiply and add operations, the network indicates whether a watermark is present and, if so, information about its pose state.

In still other embodiments, information other than pose state may also be determined, including—in some instances—the payload of the watermark depicted in captured imagery.

By such arrangements, watermark technology can be implemented more effectively in various applications (e.g., point of sale systems), and can be implemented in other applications where it was not previously practical.

The foregoing and additional features and advantages of the present technology will be more readily apparent from the following detailed description, which proceeds with reference to the accompanying drawings.

BRIEF DESCRIPTION OF THE DRAWINGS

FIG. 10 depicts an illustrative reference data structure used in one arrangement of the present technology.

FIG. 13 depicts an illustrative reference data structure used in another arrangement of the present technology.

FIG. 19 depicts different sampling constellations applied to the FIG. 16 block of oct-axis-3 data, each yielding a different L-tuple.

FIG. 21 depicts an illustrative data structure used in another arrangement of the present technology.

FIG. 22 depicts another illustrative data structure used in another arrangement of the present technology.

FIG. 23 depicts yet another illustrative data structure used in another arrangement of the present technology.

FIGS. 27A and 27B show a greyscale noise tile, and its inverse.

FIG. 28 shows how the noise tiles of FIGS. 27A/27B can be assembled to spatially represent the plural-bit binary message 1101011000 . . . .

FIG. 29 shows FIG. 28 after reducing in amplitude, preparatory to summing with a host image.

FIG. 31 depicts yet another illustrative data structure used in another arrangement of the present technology.

FIG. 32 shows another pattern that can be recognized by embodiments of the present technology.

FIGS. 33A-33F show fragmentary captures depicting the FIG. 32 artwork, as the product is swept in front of a supermarket point of sale camera.

FIG. 36 shows a large set of blocks that can be quickly screened by the present technology for the presence of a watermark signal.

FIG. 37 details an algorithm for processing image patches to determine presence of a watermark.

FIG. 38 shows that a 24×24 pixel patch can be located at 1600 different positions within a 64×64 pixel block of imagery.

FIGS. 39A and 39B show a 16 element sampling constellation, and its application to one of the 24×24 array of oct-axis values.

FIG. 45 illustrates a 4×4 arrangement of embedding locations in a sub-block of a tile.

FIG. 46 illustrates the arrangement of 4 different data signal elements, A, B, C, D, each differentially encoded within the 4×4 arrangement of bit cells of FIG. 45.

FIG. 47 illustrates an example of a sparse differential encoding arrangement.

FIG. 48 shows an example of interleaved data elements using the sparse differential encoding scheme of FIG. 47.

FIG. 49 depicts a sparse differential pattern, similar to FIG. 47 and extending redundancy of a pattern carrying a data element, such as element "a."

FIG. 50 depicts the sparse pattern of FIG. 49, extended to show additional data signal elements mapped to embedding locations.

FIGS. 55 and 56 show other arrangements illustrating data signal tiles.

FIG. 57A shows an optimized filter kernel.

DETAILED DESCRIPTION

Applicant's technology is described with reference to exemplary arrangements. However, such arrangements are illustrative only, and not limiting of the scope of the technology (which can be implemented in many different forms).

Many exemplary embodiments concern determining one or more parameters characterizing a pose with which a camera captures imagery of an object (or an excerpt of an object). The object in the exemplary embodiments can be a physical item, such as a box of cereal or a bag of coffee, in which artwork printed on the item packaging includes a steganographic calibration signal. This calibration signal—in the exemplary embodiment—may be defined in the spatial frequency domain by a few, or a few dozen, peaks (e.g., 8-80), at different frequencies in the u, v plane, which may be of different phases, or of the same phase (or a combination). In the aggregate, when represented in the spatial image domain, the calibration signal appears to casual human observers as noise. It is scaled down to a low level (e.g., varying over 5, 10 or 20 digital numbers) so as to remain imperceptible when added to the host imagery (e.g., in the human-perceptible packaging artwork). It may further be adapted in accordance with characteristics of the human vision system to further decrease perceptibility of the calibration signal in the presence of the host imagery.

Figure 1:
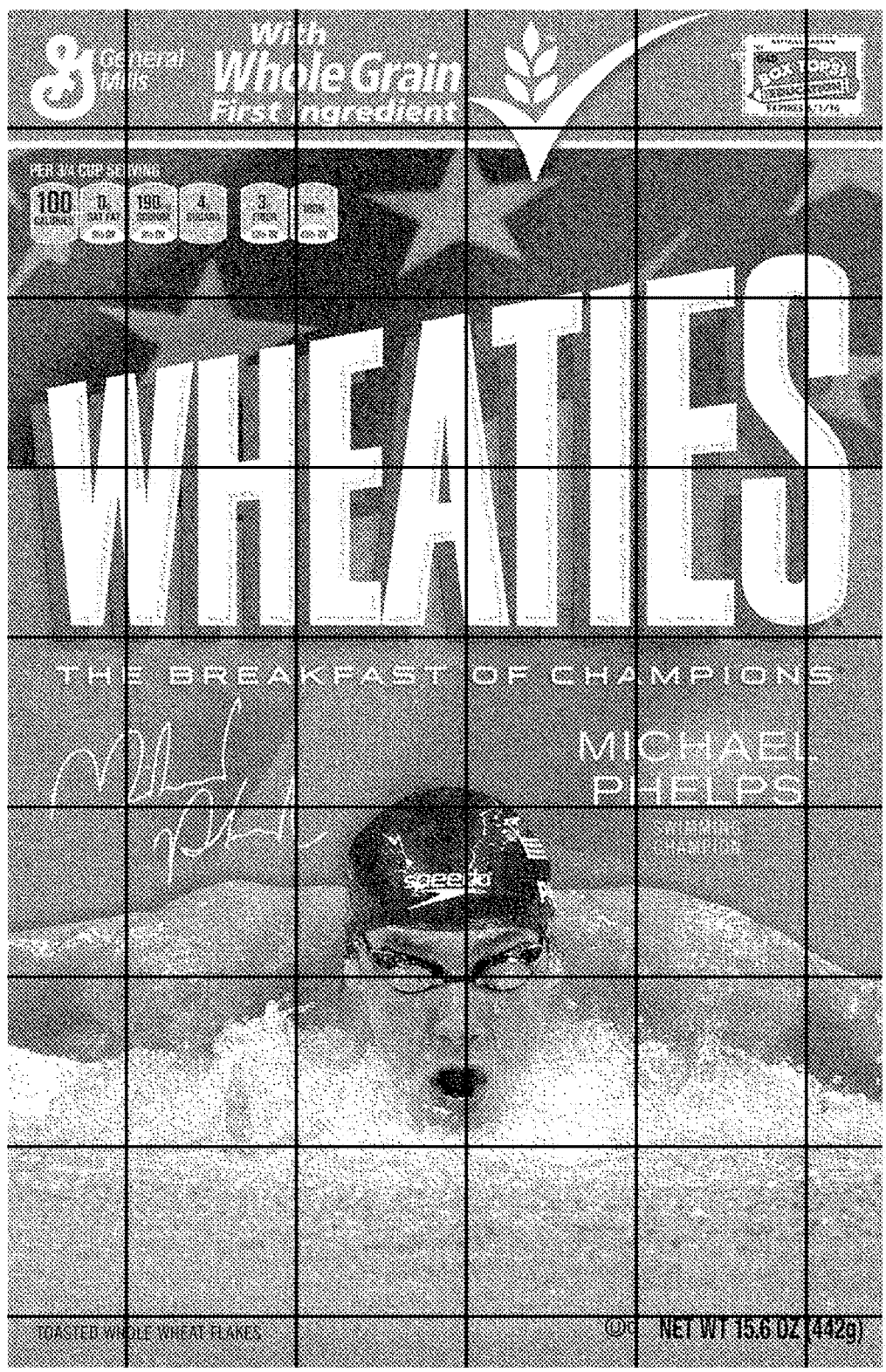
FIG. 1 shows a cereal box, marked to indicate the presence of generally imperceptible calibration signal blocks.

FIG. 1 shows artwork for a cereal box. Visibly overlaid are lines indicating tiled watermark blocks. (This graphic is adapted from patent publication 20140304122, in which the watermarking arrangement is discussed in greater detail.)

The watermark tiles are not generally human-perceptible. That is, the luminance/chrominance variations in the artwork due to the watermark are not noticeable to a viewer inspecting the box from a usual distance (e.g., 20 inches) under normal retail lighting (e.g., 50-85 foot candles), who has not previously been alerted to the existence of the watermark.

The watermark includes two components—the above-referenced 2D calibration signal, and a 2D payload signal. Each tiled block includes the identical calibration signal, and may include the identical payload signal (or the payload signal may vary, block to block).

In watermark detection, the underlying (host) image is often regarded as noise that should be attenuated prior to watermark decoding. This is commonly done by a non-linear filter. In one such arrangement, the value of each image pixel is transformed by subtracting a local average of nearby pixel values. In another such arrangement, each pixel is assigned a new value based on some function of the original pixel's value, relative to its neighbors. An exemplary embodiment considers the values of eight neighbors—the pixels to the north, northeast, east, southeast, south, southwest, west and northwest. An exemplary function counts the number of neighboring pixels having lower pixel values, offset by the number of neighboring pixels having higher pixel values. Each pixel is thus re-assigned a value between −8 and +8. (These values may all be incremented by 8 to yield non-negative values, yielding output pixel values in the range of 0-16.

Alternatively, in some embodiments only the signs of these values are considered—yielding one of just two values for every pixel location.) Such technology is detailed in Digimarc's U.S. Pat. Nos. 6,580,809, 6,724,914, 6,631,198, 6,483,927, 7,688,996 and publications 20100325117 and 20100165158, where it is often referred-to as "oct-axis" filtering.

First Arrangement

In a first exemplary arrangement, the calibration signal is defined by eight spatial frequency components, and yields continuously-varying values of grey (e.g., ranging from 0-255), spanning a 128×128 pixel area, when transformed into the spatial image domain.

This first arrangement, like many that follow, has two phases. The first phase, a training phase, is to compile a library of reference data by modeling, which later is to be consulted in determining pose information for a physical object depicted in imagery. The second phase is the use of this reference library in determining pose information for such a depicted object. In the discussion that follows, the second part is addressed first.

A camera system—such as in a point of sale terminal, or a smartphone camera—captures imagery depicting an object bearing digitally watermarked artwork. Included in the artwork is the noted calibration signal.

After capturing such imagery, a patch—say 32×32 pixels—is passed to a processor for analysis. (Larger or smaller patches can naturally be used.) If the patch is in 8 bit greyscale format, each of the 1024 component pixels may have any of 256 discrete values. The number of possible such patches (1024^256) is virtually infinite. To collapse the information content of the patch down to a more manageable scale, and to suppress the host image content (thereby accentuating the watermark signal components) this first arrangement applies non-linear filtering to some, or all, of the pixels in the patch.

Figures 2, 3, 4, 5:
FIG. 2 shows pixel values in an excerpt of imagery, and an algorithm for computing an oct-axis value for a center pixel in a 3×3 neighborhood of pixels.
FIG. 3 shows relationships between oct-axis, oct-axis-9, and oct-axis-3 values.
FIG. 4 shows some of the oct-axis-9 values corresponding to the image excerpt shown in FIG. 2.
FIG. 5 shows some of the oct-axis-3 values corresponding to the image excerpt shown in FIG. 2.

Suitable non-linear filtering arrangements can be variants of the "oct-axis" filter referenced earlier. FIG. 2 shows, at the left, an excerpt of a 32×32 pixel patch. To compute an oct-axis value for the pixel marked in bold, its value (i.e., 79) is compared to values of eight surrounding pixels. If the value of the center pixel is greater than or equal to the value of a neighbor, the oct-axis value is incremented by one. If the value of the center pixel is less than the value of a neighbor, the oct-axis value is decremented by one. Considering the values of the eight neighboring pixels yields an oct-axis value of 0 for the depicted pixel.

The range of possible oct-axis values is thus the set {−8, −6, −4, −2, 0, 2, 4, 6, 8}. To make all values positive, the calculated oct-axis value can be increased by 8, to range from 0 to 16. The odd numbers, however, aren't present in the resulting set (each neighboring pixel adds or subtracts one, changing the value by two), so the values can be remapped sequentially, as shown in the second column of FIG. 3. These may be termed oct-axis-9 values, which span the range 1-9.

Many other variants are possible. For example, the original 9 oct-axis values can be collapsed to just 3 values, by mapping values in the domain {−8, −6, −4} to −1; mapping values of {−2, 0, 2} to 0, and mapping values of {4, 6, 8} to 1. This is shown in the third column of FIG. 3, and may be termed oct-axis-3 values, or tri-state oct-axis. Similarly, the range can be collapsed to just two values. For example, all original oct-axis values of 0 or less can be mapped to 0, and all original oct-axis values of 2 or more can be mapped to 1. This map be termed oct-axis-2 values, or bi-state oct-axis.

Myriad such variants are possible. Moreover, in collapsing an input set of values, it is not necessary for a property of locality in the input domain to be preserved as corresponding locality in the resulting range. For example, in a variant tri-state mapping, the input set of values {−8, −6, −4, −2, 0, 2, 4, 6, 8} can map to an output set of values {−1, 1, −1, 1, −1, 1, 0, 0, 0}, etc.

Returning to FIG. 2, the illustrated oct-axis value of 0 for the bolded pixel is the statistically most-common. That is, on average, any pixel will have four adjoining pixels of larger values, and four adjoining pixels of smaller values, for a net original oct-axis value of 0 (or a value of 5 in oct-axis-9 parlance). In contrast, the most extreme values (e.g., original values of −8 and 8, corresponding to oct-axis-9 values of 1 and 9) are the most statistically unlikely. In some embodiments, it is desirable to employ non-linear transformations in which each of the possible output values is more or less equally probable. (This is roughly the case for the oct-axis-2 case.)

When an excerpt, such as a 32×32 pixel patch, is taken from the captured image, it is not normally possible to compute oct-axis values for pixels along the border, because the values of eight neighboring pixels for each are not known. Thus, it is only possible to determine oct-axis values only for a region of 30×30 pixels within the 32×32 patch.

FIG. 4 shows oct-axis-9 values for some of the pixels in the depicted excerpt. FIG. 5 shows oct-axis-3 values for the same pixels.

Figure 6:
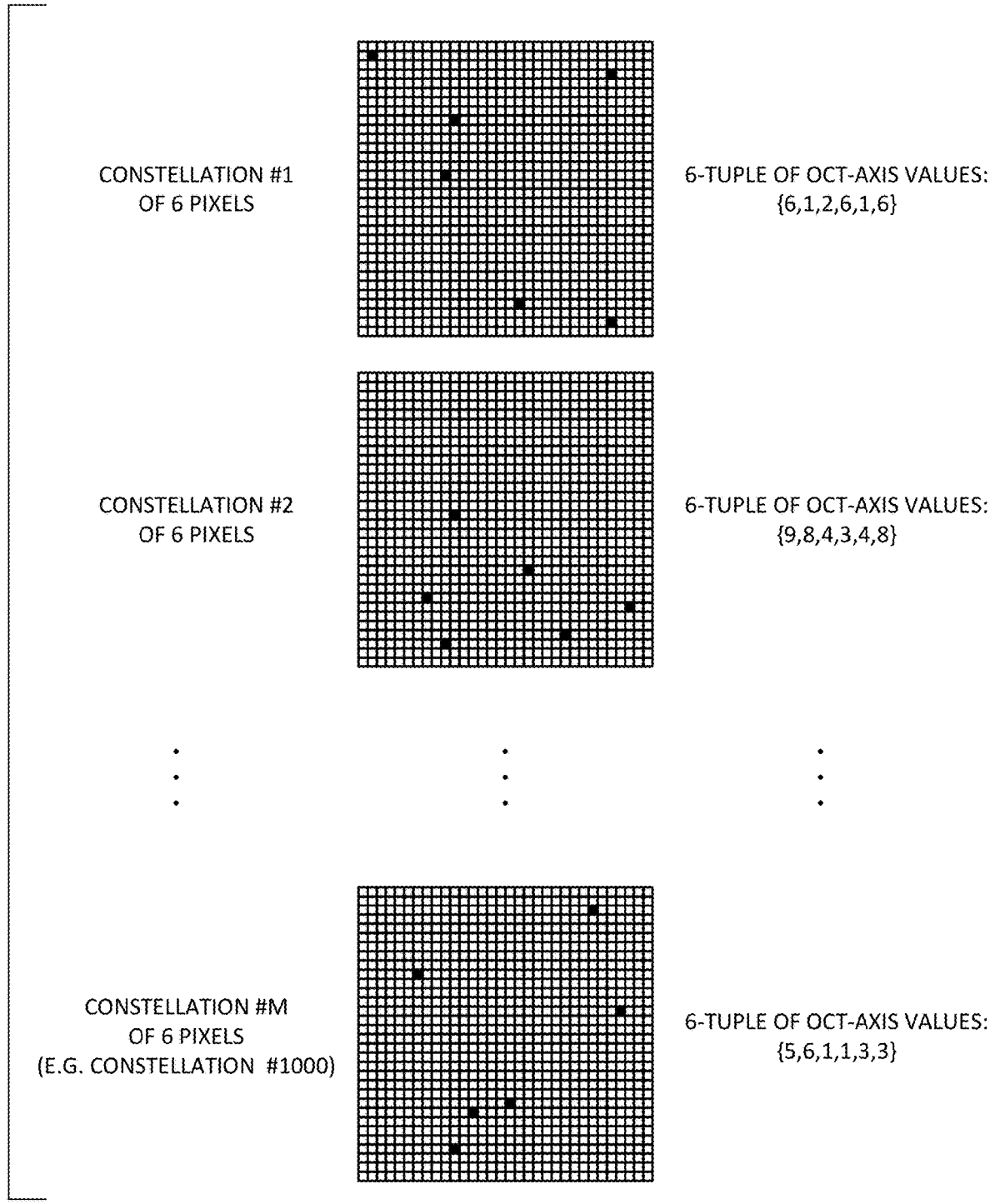
FIG. 6 shows some of a set of a thousand different sampling constellations, by which corresponding 6-tuples of oct-axis values can be extracted from a patch of imagery.

A next act in the first exemplary arrangement is to pick multiple (i.e., M) constellations of L pixels from the image patch. The top of FIG. 6 shows a first constellation—6 pixel locations selected from the 32×32 patch (i.e., L=6). Each selected location has a corresponding oct-axis value. Here oct-axis-9 values are used. The selected constellation of locations thus yields an "L-tuple" of oct-axis values. The L-tuple for the top selection is the set of values {6, 1, 2, 6, 1, 6}. (The patch may be scanned left-to-right, starting at the top left corner, and proceeding down, to determine the order in which the elements of the L-tuple are expressed.)

This operation is repeated multiple times—each with a different constellation of pixel locations, as shown lower in FIG. 6. There may be dozens, hundreds, or thousands (or more) of such constellations—each yielding a corresponding 6-tuple of oct-axis values.

The oct-axis values for each location in the excerpt can be pre-computed. Alternatively, the oct-axis values for selected locations may be computed only as needed. If M is large, the former approach is typically preferable. Note that pixel locations along the rows/columns bordering the 32×32 excerpt are excluded from selection, as their oct-axis values are indeterminate.

It will be understood that there is nothing magical about L=6. L can be smaller or greater. Desirably, the constellations do not include adjoining pixels. Moreover, it seems best if the selected pixel locations be at a variety of different spacings from each other, with lines connecting the locations being oriented at a variety of different angles.

Figure 7:
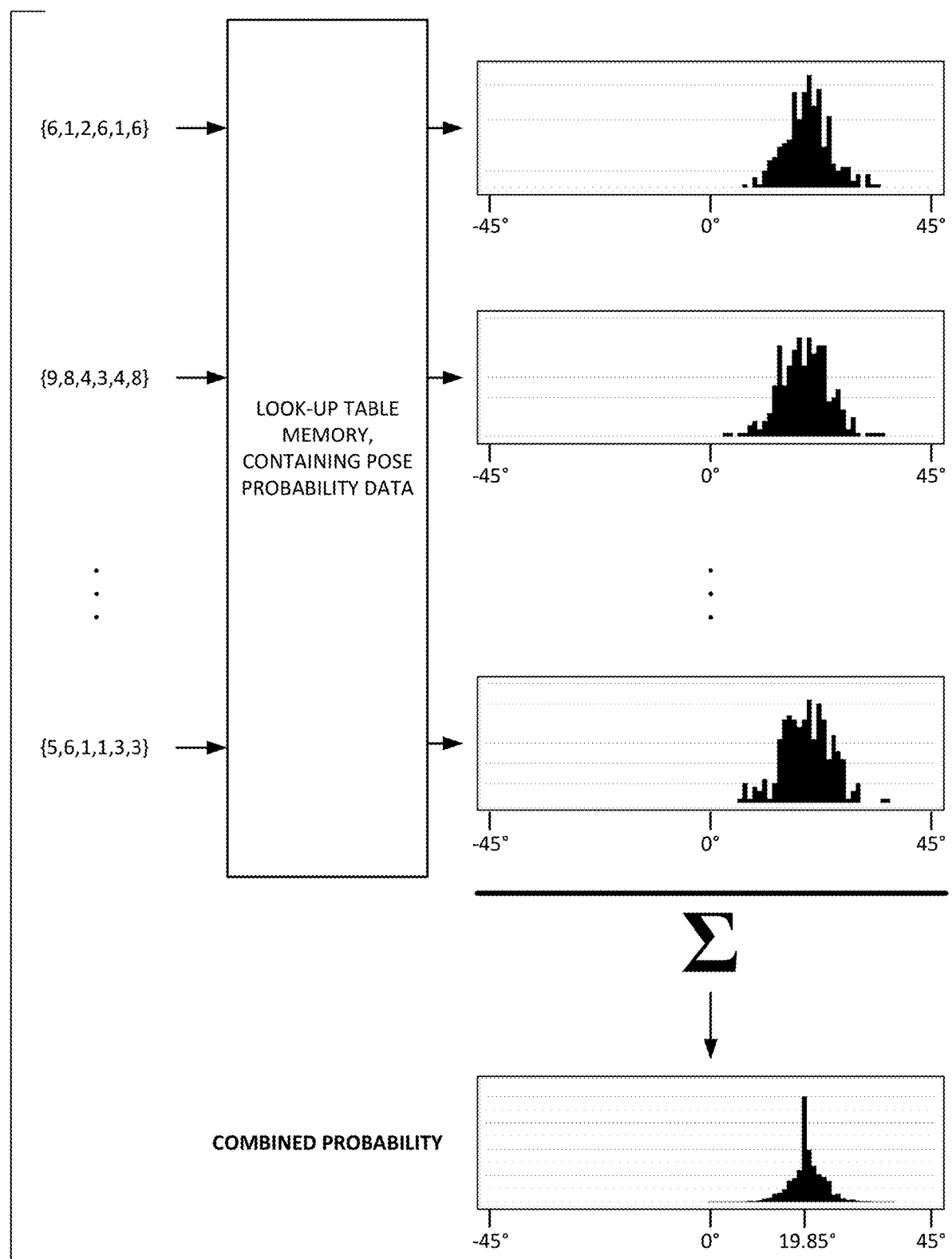
FIG. 7 illustrates that 6-tuples derived from imagery are used to access reference pose data from a data structure, which are then combined to determine pose of the imagery.

Referring now to FIG. 7, each of the L-tuples (in conjunction with an identifier of the sampling constellation with which it was generated) is used to identify a corresponding set of probability data in a reference data structure (which may also be termed a reference library, a database, a lookup table, etc.). The depicted probability data is for rotation angle, but data for X-translation, Y-translation, scale, and/or other pose parameters can additionally, or alternatively, be provided. (In this first arrangement, the calibration signal is quad-symmetric in the u, v plane. Thus, rotation only needs to be resolved to within +1-45 degrees.)

Although FIG. 7 shows a single look-up table, there may be plural tables—one for each sampling constellation.

In the depicted arrangement, each set of probability data takes the form of a histogram, indicating the relative frequency with which a particular L-tuple is found to occur in a set of reference data collected from sample imagery having the same calibration signal, when imaged from a particular known pose, and sampled with a particular sampling constellation. (The process of compiling this reference data is discussed more fully below.)

As can be seen, each L-tuple leads to a respective set of probability data. In accordance with the exemplary first arrangement, these sets of probability data are combined—as shown at the bottom of FIG. 7, to yield an aggregate probability. If enough L-tuples are considered, there will be a pronounced peak in the aggregate data. This peak indicates the most likely rotation of the captured image data (19.85 degrees in this example).

Desirably, there is an entry in the lookup table for a particular sampling constellation for each possible L-tuple, yielding a corresponding set of probability data. With 6-tuples, each element of which can have one of 9 states, the number of entries in a lookup table for one sampling constellation is 9^6, or 531,441.

The indicated probability data corresponding to the first 6-tuple {6,1,2,6,1,6} is based on about a thousand reference image captures in which such 6-tuple was found with that sampling constellation. In the depicted probability histogram, the indicated rotation angles are fairly tightly clustered. However, this need not be the case. Particularly for the most common 6-tuples (e.g., {5,5,5,5,5,5}), the spread of probability can be much larger—in some instances appearing as nearly uniform noise of a normal distribution across the range of possible angles. Yet when combined with probability data for many other 6-tuples, an evident peak will emerge—indicating the best estimate of rotation.

A simple way of combining the probabilities for the many L-tuples obtained from the input image patch is simply to sum their histograms, each bin count with its respective counterparts. (The histogram data is maintained as 1801 bins of counts in one embodiment, each bin representing a twentieth of a degree range of rotation value. Bin 0 is from −45° to −44.95°, bin 1 is from −44.95° to −44.90°, etc. Each bin contains a count of the number of earlier-analyzed reference images having that respective rotation, and having that respective L-tuple.)

Another way of combining the probabilities is in the Fourier domain. Each of the probability histograms depicted on the right side of FIG. 7 can be converted, by a DFT operation, into a corresponding continuous probability curve. In accordance with a method due to Hill, Conflations of Probability Distributions, Trans. Am. Mathematical Society, 363:6, June, 2011, pp. 3351-3372, these curves can be combined by first taking their logarithms, and then summing their log-counterparts. (Applicant has found it helpful to first apply a fixed small value to all the bins before the DCT operation, to avoid zero values and negative values in the resultant continuous function, with attendant difficulties in performing the logarithm operation.) The peak of the resulting curve again indicates the most probable value for the subject pose parameter (e.g., rotation).

In variant embodiments, the probability data for each L-tuple isn't stored as histogram data, but rather as a sequence of Fourier coefficients defining a continuous function corresponding to the probability distribution. Or the table-stored probability data can take the form of log-counterparts to such continuous probability function. This log data may be represented as Fourier coefficients defining the log-counterpart curve. Alternatively, it may comprise a series of data points, inverse-Fourier-transformed from the log-Fourier domain—each corresponding to a respective one of the 1801 different ranges of rotation angle. Such values may be accessed from the table for each of the L-tuples extracted from the image patch, and summed, to indicate the rotation of the image patch.

Figure 8:
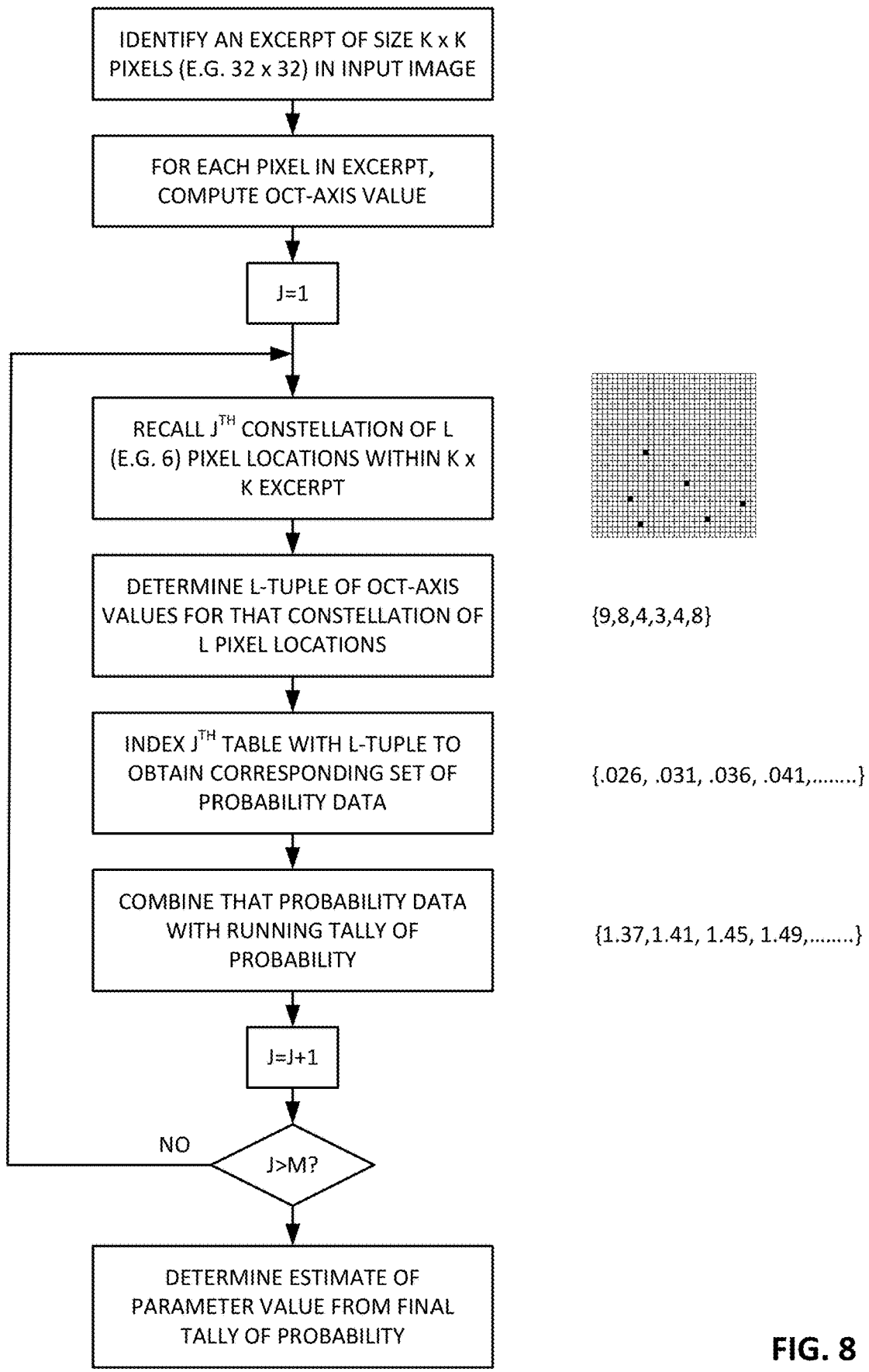
FIGS. 8 and 9 are flow charts depicting methods according to one arrangement of the present technology.

FIG. 8 is a flow chart summarizing the above method.

While this flow chart refers to accessing the $J^{TH}$ lookup table with the L-tuple, by indexing, to obtain a corresponding set of probability data, approaches other than indexing can be used. In some embodiments a search procedure, such as a binary search, can be applied to locate corresponding probability data in the table.

Further, in some embodiments, the data in a table may be sparse, so that there is not a set of probability data stored for each possible L-tuple. (This arises more commonly where L is large.) In such case, a preferred algorithm identifies an L-tuple that is closest, in a Hamming distance sense, for which corresponding probability data is available. The probability data for that neighbor is then used for the L-tuple for which probability data is missing. If several such L-tuples are similarly-close (e.g., within a Hamming distance of 1, such as {7,1,2,6,1,6} and {6,2,2,6,1,6}, relative to {6,1,2,6, 1,6}), their respective probability data may be averaged to yield probability data for the missing L-tuple. Still more complex arrangements form a weighted average probability based on L-tuples that are close but at varying distances (e.g., Hamming distances of 1 and 2}, with weights inversely proportional to the distance.

Known approximate (aka fuzzy) string matching algorithms for identifying similar strings are known from other fields (e.g., text searching and genetic sequencing) and can be applied to L-tuples here. See, e.g., Navarro, "A Guided Tour to Approximate String Matching," ACM Computing Surveys (CSUR) 33.1 (2001): pages 31-88, and Chang et al, "Sublinear Approximate String Matching and Biological Applications," Algorithmica 12 (1994), pp. 327-244.

Backing up now to the preceding, training phase, the stored probability data in this first arrangement is compiled by a brute force approach. A first reference surface (e.g., a plane) comprising a tiled array of the analog calibration signal block (i.e., the spatial domain counterpart to the eight spatial-frequency domain signals) is digitally defined, and its appearance from variant viewpoints is virtually modeled and sampled to yield a simulated captured image frame. Desirably, the full range of possible object-camera poses is modeled, as combinations of 1801 different rotation states (e.g., −45.025° to +44.975° in 0.05° increments), with 100,000 different scale states (i.e., stepping from a scale of 60% to 160% in increments of 0.001%), with 128,000 different X-translation states (i.e., shifts of 0 to 128 pixels in 0.001 pixel increments; 128 pixels because the exemplary calibration signal is periodic with a spatial frequency of 128 pixels), and a similar number of Y-translation states. This yields about 3×10^18 different pose possibilities (not including perspective variables, which may additionally be included). A pinhole camera model can be employed, or a different camera model (e.g., one taking into account the focal length of the lens system) may be selected that more nearly corresponds to the optics of cameras that will be employed in actual use.

It is not practical to exhaustively simulate image frames captured from such a large number of different viewpoints, so a stochastic sampling approach can be used. That is, an ensemble of {X-translation, Y-translation, rotation, scale} parameters is randomly selected, and the capture of a first reference image is simulated with these pose parameters. This first capture may be characterized by a random ensemble of pose parameters, such as {63.961 pixels, 116.036 pixels, −35.875°, 153.221%}.

A first constellation of, e.g. 6, locations is chosen from a 32×32 patch randomly selected in this first reference image, and oct-axis-9 values are computed for each of the six locations. The 6-tuple of oct-axis-9 values for this first constellation may be {2,8,9,4,6,4}. In this case, the rotation probability data in a table entry corresponding to {2,8,9,4, 6,4} for the first constellation is updated to reflect an instance of −35.875° rotation. For example, a count in a histogram bin corresponding to rotation angles of between −35.85 and −35.90° is incremented by one. Corresponding X-translation, Y-translation, and scale probability data are updated similarly (reflecting this instance of an X-translation of 63.961 pixels, a Y-translation of 116.036 pixels, and a scale of 153.221%).

A second, different, constellation of 6 locations is next chosen from this same 32×32 patch, and its corresponding 6-tuple (e.g., {8,6,6,2,4,2}) is similarly determined. Probability data in a table corresponding to this new 6-tuple, and the second sampling constellation, is identified, and updated to reflect an instance of −35.875° rotation. And similarly for the other pose parameters.

Perhaps a thousand or so different constellations of 6 locations are selected from this first 32×32 patch, and table-stored probability data for the corresponding thousand 6-tuples are each updated to reflect this patch's pose parameters of {63.961 pixels, 116.036 pixels, −35.875°, 153.221%}.

A different 32×32 patch within this first reference image can then be selected, and the process repeated, identifying a thousand more L-tuples for which corresponding data in the tables should be updated to reflect an instance of pose parameters{63.961 pixels, 116.036 pixels, −35.875°, 153.221%}.

The number of patches from the first-posed model that are processed in this manner can be as small as one, or can be arbitrarily large. Desirably, the patches span different parts of the modeled object, but since the illustrative calibration signal repeats every 128 pixels, there is a practical limit to the number of repetitions that are useful. In a particular embodiment, 4 different patches are processed in this manner—all characterized by the same pose parameters.

At this point, entries for 4000 L-tuples in the tables have been updated with the original pose parameters.

A second set of pose parameters is then selected, and the above process repeats.

And then a third set of pose parameters is selected. And then a fourth. And on it goes until hundreds of thousands, or millions, of random poses have been modeled—each prompting (in this example) 4000 updates to the tables.

To say the process is laborious is an understatement. However, it needs only be performed once, and the resultant table-stored probability data can be used for as long as the calibration signal is in use. The availability of tremendous computing power in the "cloud" makes the process tractable.

Figure 9:
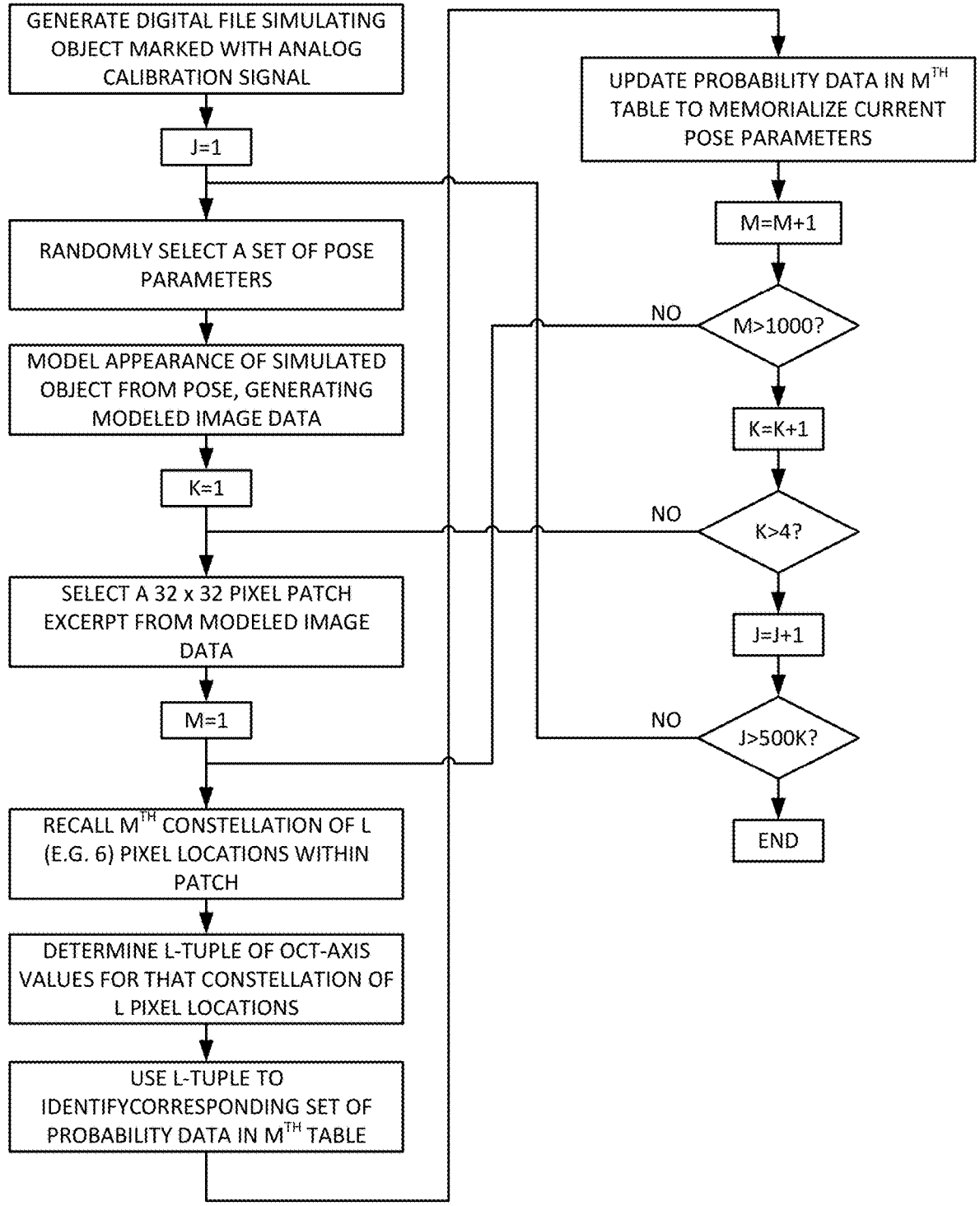

The above-detailed algorithm for producing the reference probability data is depicted by the flow chart of FIG. 9. FIG. 10 shows excerpts from an exemplary pose probability for one sampling constellation table after the process has completed.

In the FIG. 10 table, the probability function for each of the parameters is stored as a series of Fourier domain coefficients, which can reduce the amount of storage needed. (The values in FIG. 10 are filler data and do not correspond to actual probabilities.) 20 Fourier coefficients are used to characterize each function in the illustrated case, but typically a different number of coefficients would be used for rotation than for X-translation, Y-translation, and scale, as the number of possible states for these latter parameters is generally larger. More coefficients allows more fidelity in representing the probability function, at the cost of more storage.

Figure 11A:
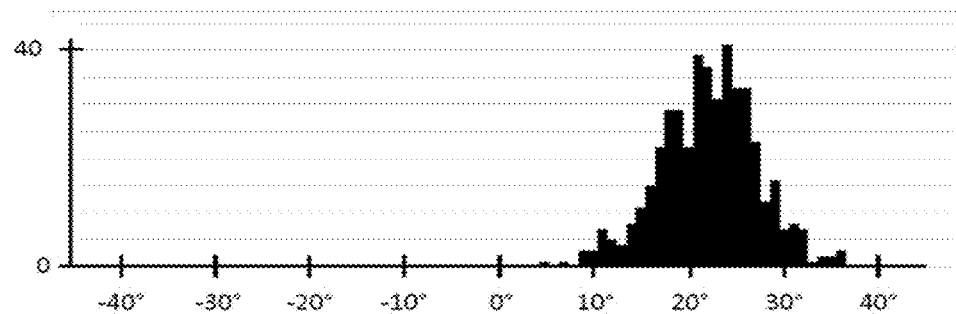
FIG. 11A is a histogram depicting probabilities of different poses.
Figure 11B:
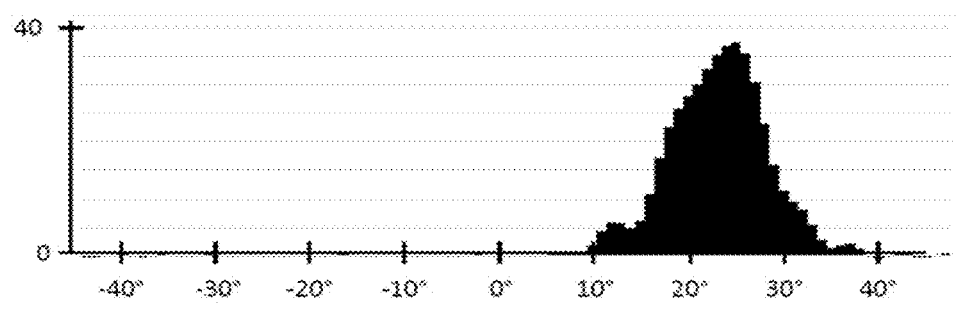
FIGS. 11B, 11C and 11D show how the histogram of FIG. 11A can be approximated with increasing numbers of Fourier coefficients.
Figure 11C:
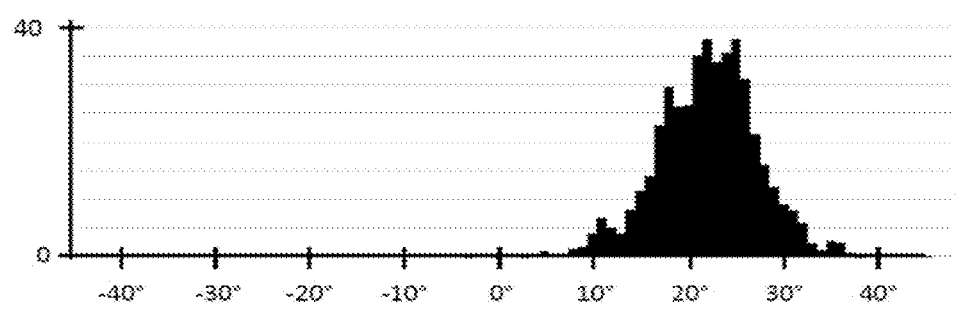
Figure 11D:
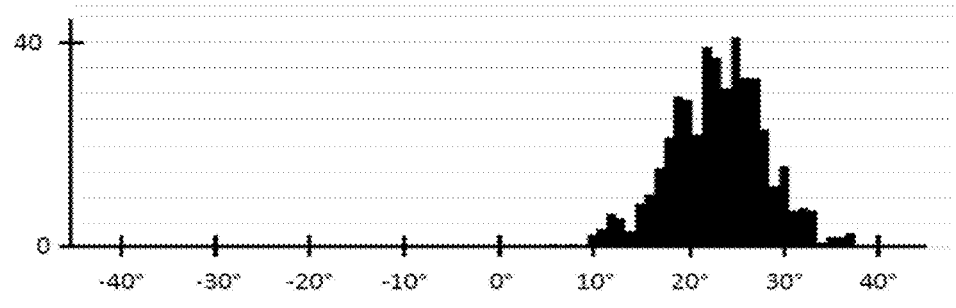

FIGS. 11A-11D illustrate this fidelity phenomenon. FIG. 11A shows a set of original histogram data, depicting rotation state, based on a total of 450 samples. FIG. 11B shows a grossly-approximated Fourier counterpart to the function of FIG. 11A, using 20 complex Fourier coefficients (i.e., 20 each of magnitude and phase, obtained by a discrete Fourier transform on the FIG. 11A histogram data). At some points, the FIG. 11B dips slightly below zero due to "ringing" associated with the component cosine waveforms. FIG. 11C is like FIG. 11B, but with 30 Fourier coefficients, and shows greater fidelity to the FIG. 11A original. FIG. 11D, which is nearly indistinguishable from FIG. 11A, shows the results using 40 Fourier coefficients.

Compression arrangements other than Fourier representations can be employed. Another arrangement approximates such functions using Chebyshev polynomials.

In other implementations, histogram bin counts can be stored. Given the sparseness of certain of the bin count data, known data compression methods can be used, such as run length encoding to avoid storing countless repetitive values of zero.

While the described process was performed with four parameters, a greater- or lesser-number can be used. For example, the described domain of four pose parameters (X-translation/Y-translation/rotation/scale) can be expanded to include one or two parameters to characterize perspective.

As indicated earlier, it is preferable that the spatial constellations of locations from which the L-tuples are derived not be entirely random. For example, clumping of two or more locations together diminishes the information that may be gleaned about the patch. And having three or more locations along a common line also diminishes the available information. It is thought better to have a constellation of six locations, characterized by a diversity in distances between the locations, and diversity in relative angles.

Heuristically, it is seen that some constellations are more useful in the detailed arrangement than others. Desirably, statistics are gathered indicating which constellations are highly probative of pose, and which are less-so. The one thousand constellations that are found to be most useful are the ones that are ultimately used in collecting L-tuple data—both in the training phase just-discussed, as well as in the end use determination of one particular object's pose.

In the above-described process of generating the reference probability data, the modeled image data was pure calibration signal. In actual practice, it is sometime helpful to gather probability statistics based on image data comprising the calibration signal plus noise (e.g., Gaussian noise).

One way to do this is to add a different frame of noise to the pure calibration signal each time a different pose is simulated. Another is when selecting the 32×32 pixel patches. For example, the first-selected patch can be selected from the modeled calibration signal, alone. The second-through-fourth-selected patches can be summed with different noise patches (optionally transformed in accordance with the current pose parameters). The amplitude of the modeled noise signal, as compared to the calibration signal, is a matter of design choice. Ten percent is a starting point. Higher values—including RMS amplitudes greater than the calibration signal, can be used as well.

Once the pose of the object is thereby understood, extraction of the encoded plural-bit watermark payload data is straightforward, as detailed in the cited references.

A Digression about Geometry and Sampling

There are a variety of spatial domains involved in the sampling constellations. To avoid confusion, these are reviewed below.

One is the final spatial domain, imposed by the physical camera that is capturing an image of a physical object. The camera's imaging sensor comprises (typically) rows and columns of photodetectors, defining a geometry (e.g., up/down, left/right). This geometry is imposed on whatever physical object is depicted in the captured imagery. It may be termed the physical sensing domain. Each photodetector in the sensor integrates the light that the camera lens collects and directs to a small, square collection aperture. Subsequent circuitry in the camera quantizes the light signal captured by each photodetector, and converts it into one of, e.g., 256 discrete levels.

A second spatial domain is associated with the physical object that is being photographed. As in the above-described arrangement, the object may be a cereal box printed with artwork that includes a digital watermark. This watermark comprises a tiled array of blocks. The location of each watermark block may be referenced to a single physical location, such as the location on the box at which the upper left corner of the block is positioned. (In some embodiments, the center of the block may alternatively be used.) This location is termed the watermark origin.

There is an up and down, and left and right, in this cereal box domain (which may be termed the physical object domain). However, "up" on the cereal box may be depicted as "down" in the physical sensing domain of the camera (e.g., if the box is inverted relative to the camera).

The physical relationship between the camera, and the printed cereal box, introduces the pose parameters discussed above: X-translation, Y-translation, scale and rotation.

X-translation refers to the offset, in camera pixels, between the origin of a watermark block printed on the cereal box, and the depiction of that watermark block in the image captured by the camera. If the upper left corner of the watermark block is regarded as the origin, and that watermark block is depicted in the captured image frame with its upper left corner positioned at the upper left corner of the captured image frame, then the block has an X-translation of zero pixels and a Y-translation of zero pixels. If the depiction of the watermark block is moved one pixel to the right in the captured image, it has an X-translation of one pixel, and a Y-translation of zero pixels, etc.

Rotation is straightforward, and refers to the angular relationship between the coordinate systems of the physical sensing and physical object domains. For example, if the top edge of the physical box is depicted horizontally at the top of the captured image (neglecting lens distortion), the watermark is depicted with a rotation of zero degrees in imagery captured by the camera.

Scale refers to the magnification with which the cereal box is depicted in the captured image frame. In an illustrative watermarking system, the watermark payload (e.g., of 50 or 100 bits) is processed with a forward error correction process that yields a redundantly encoded output signal comprising 16,384 elements. This signal is further randomized by XORing with a pseudo-random key sequence. The resulting 16,384 elements have "1" or "0" values that are mapped to a 128×128 array of watermark elements ("waxels") in a single watermark block. If there are 75 waxels per inch (WPI), then each block is 128/75, or 1.7 inches on a side. If the cereal box is printed at 300 dots per inch resolution, each block is 512×512 pixels in size, and each waxel spans a 4×4 pixel area.

If the image frame captured by the camera depicts such a watermark block region on the cereal box by a patch of imagery that is 640 pixels on a side, then such depiction is at a scale state of 125%. It such a printed watermark block is depicted in the captured imagery by a 358×358 pixel region, it has a scale state of 70%.

Figure 12A:
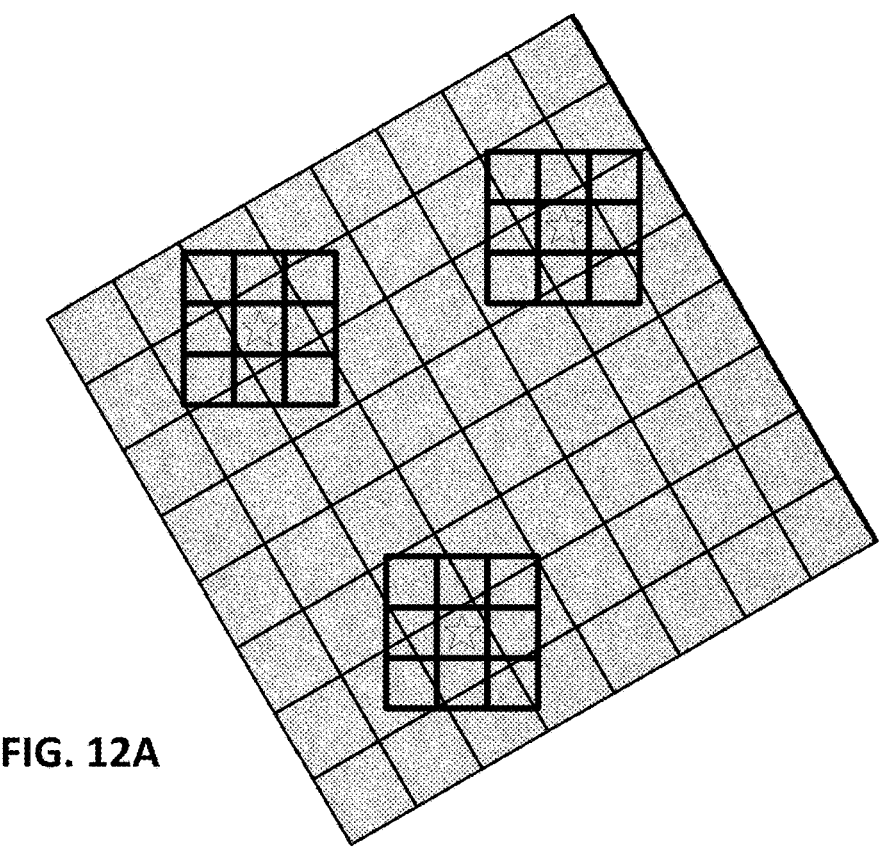
FIGS. 12A and 12B further detail the sampling that serves as the basis of the oct-axis computations.

Things can get a little confusing when it comes to oct-axis determinations, because oct-axis commonly imposes one spatial domain (e.g., the physical sensing domain) on another (e.g., the physical object domain). FIG. 12A helps illustrate.

FIG. 12A shows, in bold, pixels of camera-captured imagery, and, in light, pixels on the cereal box being imaged. The cereal box is depicted in the captured imagery at a scale of 150%, and at a rotation of 30 degrees.

Consider, first, the second phase of operation described in the above-described arrangement, in which a physical camera captures imagery from a physical object. In FIG. 12A, the starred locations indicate points in the sampling constellation. At each such location (i.e., a pixel in the captured imagery), an oct-axis value is computed—based on relationships between the camera pixel value at the starred location, and the camera pixel values at the eight surrounding locations (as indicated by the smaller, bolder boxes).

Recall that each pixel of the camera integrates light falling on a small square region—the collection aperture of a photodetector. The physical object (cereal box) being photographed may, itself, have pixelated regions (indicated by the thinner lines in FIG. 12A). Thus, a single pixel in the camera may integrate a combination of light reflected from two or more pixels printed on the cereal box. (This is shown by certain of the camera pixels identified by the bold lines in FIG. 12A, that encompass regions of two, three or even four of the larger cereal box pixels identified by the finer lines.)

In this second phase of operation, the camera quantizes each of its pixels to a discrete state, between 0 and 255. The oct-axis values in this second phase of operation are thus computed based on discrete (integer) values, which in turn are based on an integration of light reflected from (often) several pixels printed on the cereal box.

The situation is different in the first, training phase. In the training phase there is no physical camera, and there is no physical object. Rather, the calibration pattern is modeled by computer, and its value is sampled (computed) at a variety of points to determine the reference oct-axis values (and L-tuples).

In this training phase, each sampling point does not correspond to a pixel, having a small 2D collection aperture. Rather, it corresponds to a single point—the value of which is computed, mathematically, from the continuous function that defines the calibration signal value throughout its two dimensions of expanse. Such a point-based computation of the calibration signal value is performed for the sampling point itself, and also for eight nearby sampling points (indicated by the arrow tips in FIG. 12B). Each computation yields a floating point (as opposed to an integer) value. The oct-axis computation is thus based on floating point numbers—comparisons between the function value at the sampling point itself, and the eight neighboring points.

This distinction between the first and second phases of operation, as it relates to the sampling constellations, is sometimes glossed over when discussion of the various arrangements focuses on other aspects of the technology. Thus, this digression seemed appropriate.

Second Arrangement

A second arrangement is similar to the just-described first arrangement in certain respects, but differs in others.

One difference is the size of the calibration signal. In the second arrangement (and in those that follow), the calibration signal is defined by eight spatial frequency components, and yields continuously-varying values of grey (e.g., ranging from 0-255), spanning a 32×32 pixel area (instead of a 128×128 pixel area), when transformed into the spatial image domain.

One difference is that, instead of selecting six pixel locations within a 32×32 pixel patch, in accordance with a first sampling constellation, to form a 6-tuple, and repeating with other selected septets of pixel locations, defined by other sampling constellations, to form other 6-tuples, the second arrangement employs all of the interior pixel locations (i.e., no pixels on the patch boundary) within a 16×16 pixel patch. There is but one sampling constellation, and it includes all 196 pixel locations in the interior 14×14 patch of pixels. The resulting 196-tuple of oct-axis values are used to access pose probability data from a single lookup table.

A second difference is that, since all of the interior pixels are used at once, there is no need for thousands of different references to lookup tables, to obtain glimmers of pose information which are then combined to yield a final pose determination. Instead, a single reference to the table gives the answer (that is, a single reference based on the 196-tuple)

A third difference, to make this approach practical, is to switch from oct-axis-9 values, to oct-axis-3 or oct-axis-2 values. Even with oct-axis-2 values (e.g., each of the 196 locations has a value of 0 or 1, or −1 or 1), this leads to 2^196 possible states. This is rather much larger than the 531,441 possible 6-tuple states for each sampling constellation of the first arrangement.

Given the immensity of the L-tuple space, the table organization of FIG. 10, in which each possible L-tuple has its own row/record, is abandoned. Instead, an ordered list of 196-tuples, for which pose data has been collected in the data collection phase, is maintained. No void space is maintained for the vast numbers of 196-tuples for which no pose data is collected.

The reference data collection proceeds similarly to the first arrangement, as discussed above in connection with FIG. 9. However, instead of a 32×32 patch, a 16×16 patch is used. And the depicted "M" loop is omitted; instead of storing the pose data in association with a thousand 6-tuples, the pose data is stored in association with just one 196-tuple.

In this second arrangement, the pose data stored in the table does not have the statistical uncertainty of the pose data associated with individual 6-tuples in the first arrangement (e.g., as depicted by the spread of populated bins in the histograms on the right side of FIG. 7). Rather, if there is any pose data in the table, it is essentially deterministic. A single datum suffices to give the pose answer. Moreover, the chance of having more than a single datum associated with any 196-tuple is vanishingly small (absent a flaw in the reference data collection implementation that leads to analysis of the same image data patch twice).

An exemplary table structure for this second arrangement is shown in FIG. 13. There are no rows for most 196-tuples. It is very sparse. Only a single value is stored for each pose parameter.

In use, the thus-collected reference pose data is used in a fashion similar to, but simpler than, that discussed above in the first arrangement (e.g., as depicted in FIG. 7). A 16×16 pixel excerpt is taken from imagery captured by a camera. Oct-axis-2 (or −3) values are determined for each of the internal 196 pixel positions, yielding an ordered 196-tuple. The reference table is then searched to find stored pose data for a 196-tuple that is closest (in a Hamming sense) to the 196-tuple gleaned from the image patch. The stored pose data is the answer.

The topic of searching for nearest L-tuples was discussed above in connection with the first arrangement. While use of such methods arises sometimes in the first arrangement, it arises all of the time in the second arrangement. That is, the 196-tuple extracted from real camera imagery will, practically speaking, never be one of the 196-tuples for which pose data is stored in the table. The pose answer lies in a different table row—the row for the 196-tuple most similar to the image-derived 196-tuple.

Figure 14:
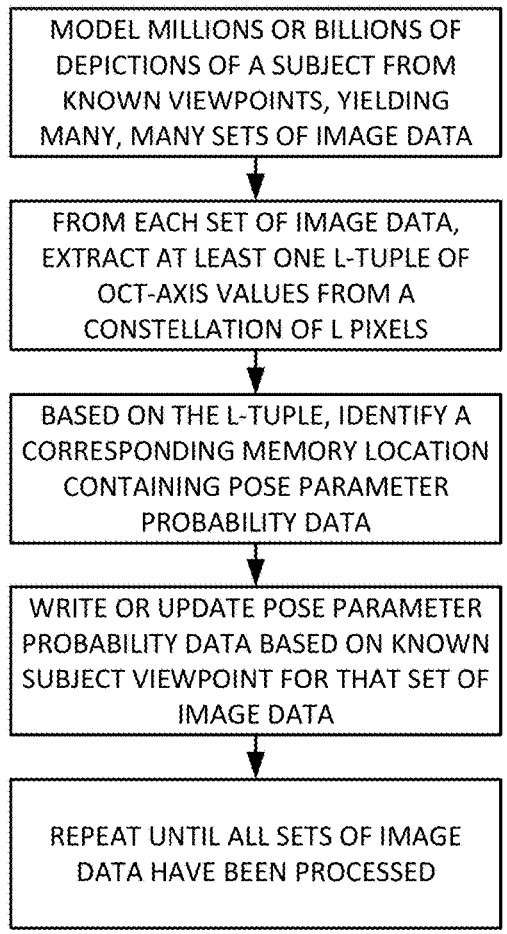
FIGS. 14 and 15 are flow charts depicting methods according to another arrangement of the present technology.
Figure 15:
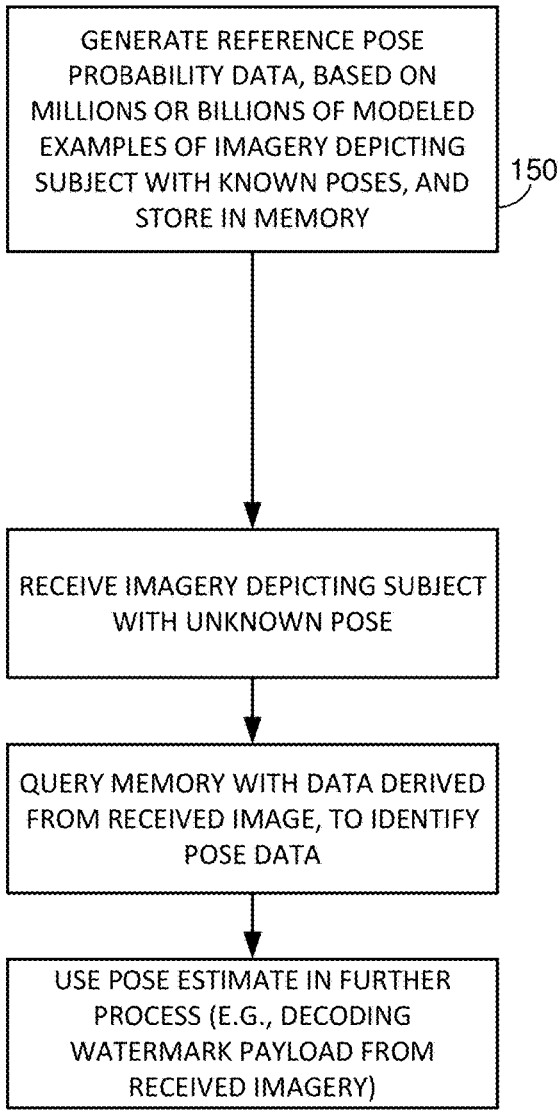

The arrangements discussed above are illustrated in simplified fashion in FIGS. 14 and 15. FIG. 14 shows a generalized method of compiling reference pose data in a memory. FIG. 15 shows the entire process—start to finish. The first box, 150, corresponds to the flow chart of FIG. 14. The lower boxes detail use of the reference pose data in memory to determine the pose of input imagery.

Third Arrangement

The third arrangement extends from the second arrangement. Additional features in the third arrangement include Rockstar L-tuples, and Hamming troughs.

The below discussion first addresses an algorithm to generate the library of reference data in the data structure.

Figure 16:
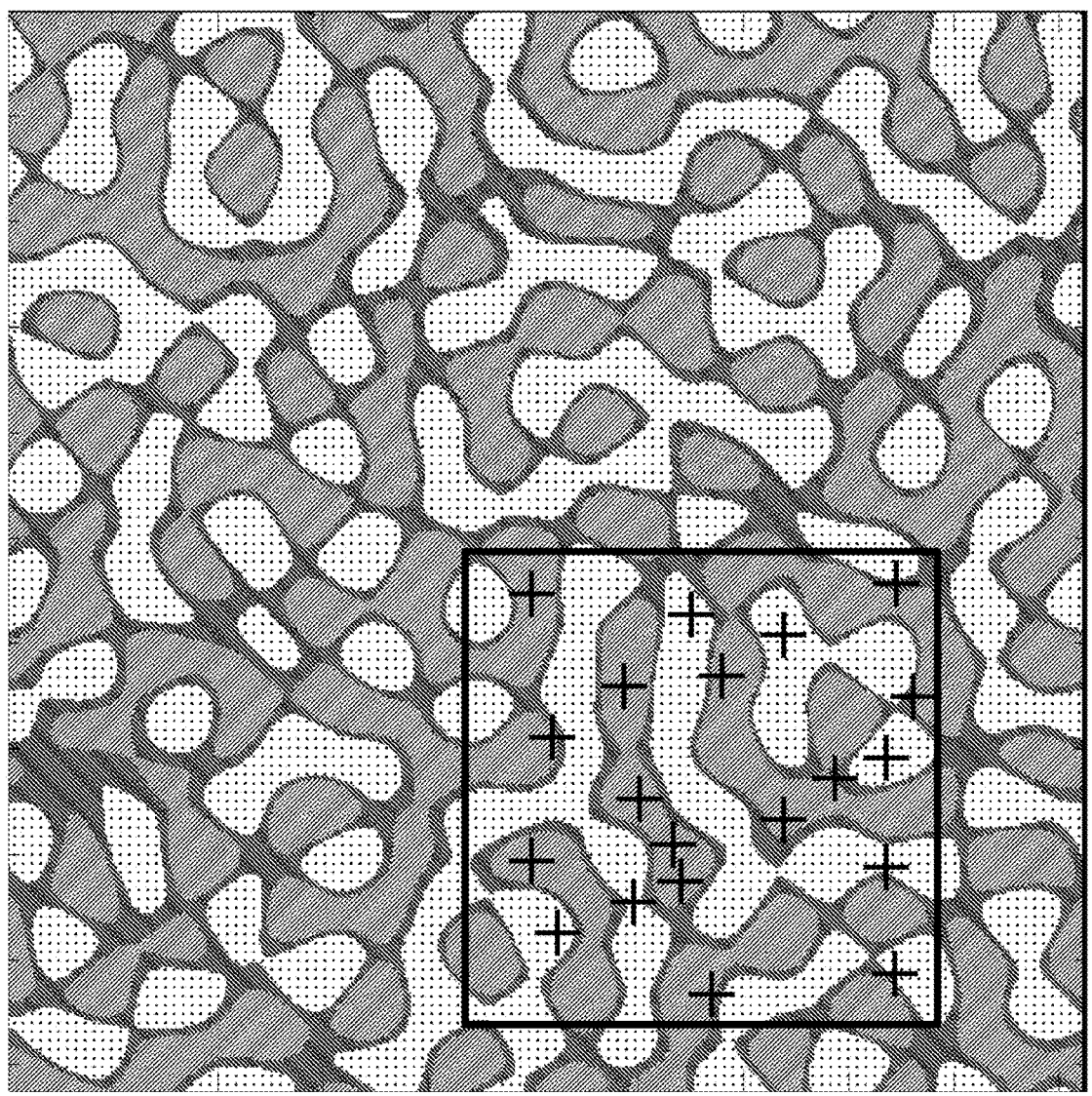
FIG. 16 depicts a block of oct-axis-3 data corresponding to a 32×32 pixel block of calibration signal, with a constellation of sampling points.
Figure 17:
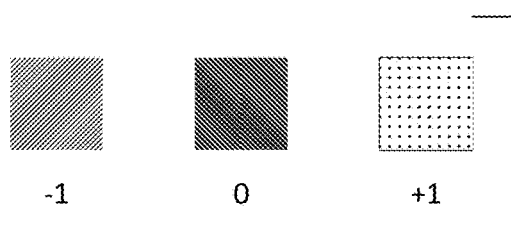
FIG. 17 is a key identifying oct-axis-3 values associated with FIG. 16.

FIG. 16 shows an illustrative calibration signal block after oct-axis-3 transformation. (The depicted signal is shown without X- or Y-translation, and with a rotation of zero degrees. It is depicted at many times full-scale.) Each point in the 2D block has a value of −1, 0 or 1, as shown by the key of FIG. 17.

Figure 18:
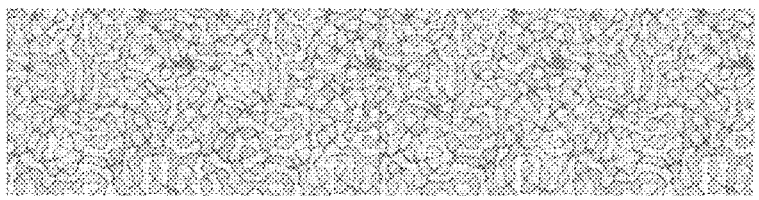
FIG. 18 illustrates how the FIG. 16 block of oct-axis-3 data is continuous at its edges.

(The 2D calibration block, and the corresponding oct-axis-3 transformation of same, are continuous at their edges, to avoid visibility artifacts from non-continuous transitions when the calibration block is tiled across artwork. For example, the left edge of the FIG. 16 block matches the right edge, and likewise with top and bottom edges. An edge-to-edge presentation of multiple oct-axis-3 counterpart blocks is shown in FIG. 18.)

In this third arrangement, 40 random locations, denoted by + indicia in FIG. 16, are sampled within a 14×14 patch. (Only 20 locations are marked, for clarity of illustration.) A 40-tuple of oct-axis values is generated from this sampling constellation of + locations, and is added to the reference data, in association with its corresponding pose data (e.g., X-translation, Y-translation, rotation, and scale), and with an identifier of the constellation.

Seven other constellations may be applied to this same 14×14 patch, yielding a total of eight 40-tuples—all associated with the same pose data. (FIG. 19 shows a few such 40-tuples.)

(As before, different patch locations can be selected within the illustrated image excerpt, and the process repeated—gathering more reference data associated with the original pose. However, for expository convenience, this alternative is not further considered.)

With 40 different elements in the 40-tuple, each of which can have any of three values, there are a total of 3^40 different 40-tuples that are possible. That's unfathomably enormous. But since the calibration pattern has some structure, so, too, does the corresponding oct-axis-3 pattern. And consequently, not all of the 3^40 40-tuples arise. In fact, an infinitesimally-small fraction of the 3^40 possible L-tuples actually arise.

After performing the above data collection process for a single virtual object-to-virtual camera pose, the modeled object-to-camera geometry is changed, and the process is repeated. And again and again, through all—or a stochastic sampling—of billions of different pose states.

More particularly, the first sampling constellation is applied to the virtually posed object bearing the calibration pattern at each possible X-translation value of interest, in increments of 1/32 pixels. If the modeled calibration signal block is 32×32 pixels in size, this yields 1024 different X-translation values. (When a sampling constellation extends off the edge of the 32×32 region, the adjoining pattern can be sampled, since the patterns are spatially-cyclical.) This process repeats for all eight of the sampling constellations. The 8,192 40-tuple values resulting from these 1024 applications of eight different sampling constellations are added to the reference data, each with the current pose (i.e., the incremented X-translation value, and fixed values for Y-translation, rotation, and scale) and a corresponding sampling constellation ID.

Next, the Y-translation is changed by 1/32 of a pixel, and the foregoing process is repeated—stepping through all possible values of X-translation (again with all eight sampling constellations). This process is repeated for all 1024 values of Y-translation. The result is a total of about 8 million 40-tuples—eight associated with each different combination of possible X-translation and Y-translation values (but with rotation and scale parameters static).

Next, the rotation of the virtual object-virtual camera pose is incremented by a half-degree, and the foregoing process is repeated—stepping through all possible values of X- and Y-translations. Rotation is similarly incremented through all 360 degrees (i.e., through 720 different values). So the reference data now includes about 6 billion entries, each having a 40-tuple associated with a unique pose in X-translation, Y-translation, and rotation.

Next, the scale state is similarly varied, in 1% increments, from 66% to 150% (i.e., 85 different values), and all of the foregoing sampling of 40-tuples is again repeated. So the reference data now has about 500 billion entries, each comprising a 40-tuple associated with a respective pose. Again, these 500 billion 40-tuples amount to trivially more than 0% of the 3^40 possible 40-tuple values.

Reference is made, below, to the universe of pose states. This refers to the collection of each possible combination of pose parameters of interest, as quantized with a particular set of granularity increments. With 4 pose parameters (X-translation, Y-translation, rotation and scale), and the increments noted above, the universe comprises about 64 billion different pose states. This number derives from 1024 different values of X-translation (e.g., resolution to 1/32 of a pixel, in a block that measures 32 pixels in X dimension), times 1024 different values of Y-translation (similar to X), times 720 different rotation states (i.e., 360 degrees, in half-degree increments), times 85 different scale states (i.e., 66% scale to 150% scale, in 1% increments). The above-referenced increments (1/32 pixel, 0.5 degree rotation, 1% scale) may be regarded as coarseness increments by which the continuous realm of 4D pose space is quantized into 64 billion discrete states. (Eight sampling constellations are applied at each of these 64 billion states, leading to the 500 billion 40-tuples referenced above.)

Turning briefly to statistics, what happens to the 40-tuple denoted by the constellation of "+"s in FIG. 16 if the constellation is moved to the right by a tiny delta (e.g., a trillionth of a pixel)? The answer is: nothing. The structures in the oct-axis-3-transformed block are big enough that such a movement results in not one of the +'s moving from one tri-state value to another. Similarly if the constellation is moved to the right by a second such increment. Again, nothing happens.

With enough cumulative tiny movements to the right, eventually one of the + sampling points crosses into a new area, and a single one of the elements in the 40-tuple changes in value (e.g., from a −1 to a 0, from a +1 to a 0, or from a 0 to either a −1 or +1). The new 40-tuple is said to have a Hamming distance of "1" from the previous 40-tuple. That is, a single one of its elements is different by 1.

(Hamming distance, more generally, can be regarded as the sum of the absolute value changes between corresponding elements of two L-tuples. The smaller the Hamming distance, the more nearly two L-tuples are identical.)

Applicant has found that, with a single 1/32 pixel change in X-translation (or in Y-translation), the 40-tuple that results from a particular sampling constellation remains unchanged about half the time.

Likewise, sometimes a change in rotation by a half degree leads to no change in the 40-tuple resulting from a particular sampling constellation. Ditto for some changes in scale by one percent.

Indeed, Applicant has found that, less frequently, shifts in X-translation, Y-translation, rotation, and scale, which are larger than the above increments (i.e., larger than 1/32 pixel, 0.5 degree, or 1%), lead to no change in a constellation's L-tuple. Thus, some L-tuples appear repeatedly in the collected reference data.

A histogram may be constructed that shows how often different 40-tuples occur in the reference data. Such a histogram shows that about half of the 40-tuples are unique. That is, they appear only once in the reference data. If their corresponding pose state is changed at all, a different 40-tuple results.

Such a histogram further shows that on the order of 98% of the 40-tuples appear either once, twice or three times in the reference database.

At the other end of the histogram curve, there is a small percentage of 40-tuples that identically appear a huge number of times in the reference data—each with incrementally adjoining sets of associated pose parameters. Applicant terms these 40-tuples "Rockstars." In one embodiment, a Rockstar is any 40-tuple that occurs more than 1000 times in the data. (This Rockstar threshold can be set to higher or lower values, as discussed below).

In one embodiment, there are about a dozen 40-tuples that appear 1000 times. And there are a similar number that appear 1001 times. And a similar number that appear 1002 times.

Gradually, the counts diminish. For example, there are about six 40-tuples that appear 1100 times each. And about another 6 that appear 1101 times each.

And there are about 4 different 40-tuples that occur about 1200 times each. And another 4 or so that occur about 1201 times each.

The histogram curve continues to diminish, becoming more sparse. But some very large counts arise for isolated 40-tuples. For example, in one data set, there may be one 40-tuple that appears 2512 times in the reference data—each time associated with a slightly-different pose. Another one may appear 2683 times. Another one may appear 2781 times. And so forth, in sparse fashion—with some 40-tuples occurring (once) in association with 4000 or more different pose states.

(Although 4000 pose states sounds like a large number, the poses are defined with such granularity that the differences among them are typically trivial in practical application. For example, the 4000 pose states corresponding to the biggest Hall of Fame Rockstar in the reference data may span a tiny blob within the pose universe that is a third of a pixel in X, by a third of a pixel in Y, by 3 degrees in rotation range, by 6% in scale range. Such refinement exceeds the requirements of most real world applications.)

Figure 20A:
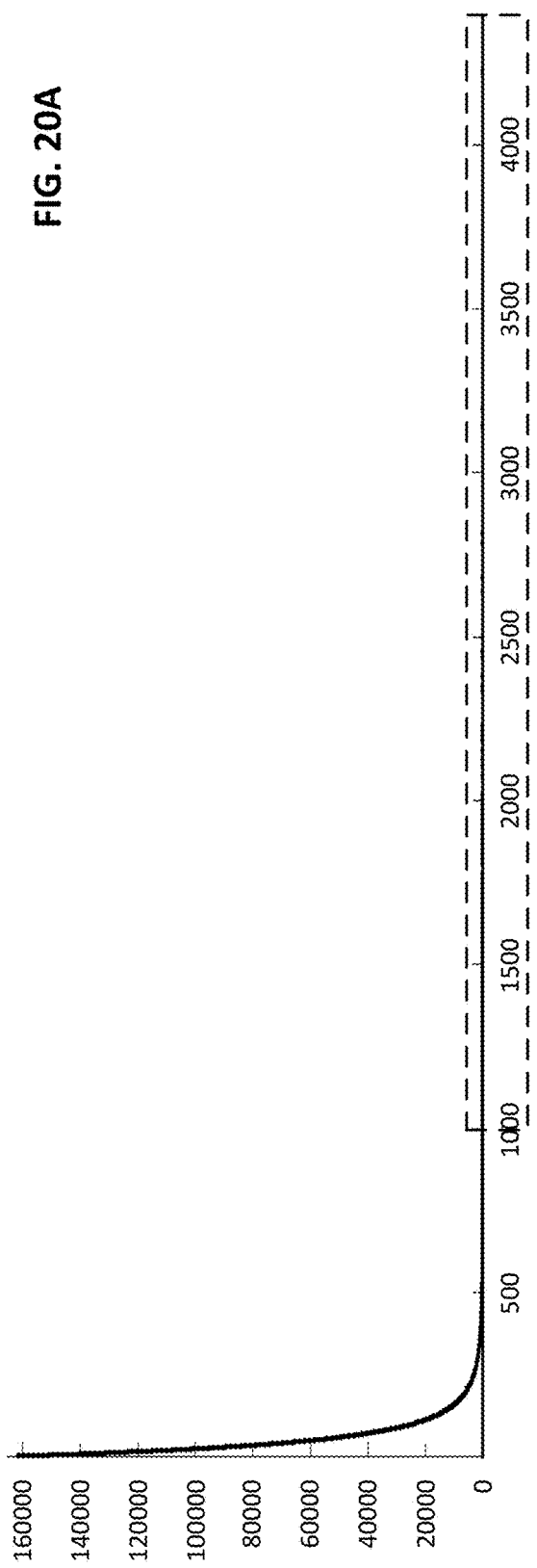
FIG. 20A is a histogram detailing, on the horizontal axis, the number of different pose states to which a particular L-tuple corresponds, and on the vertical axis, the number of such L-tuples in a representative data set.
Figure 20B:
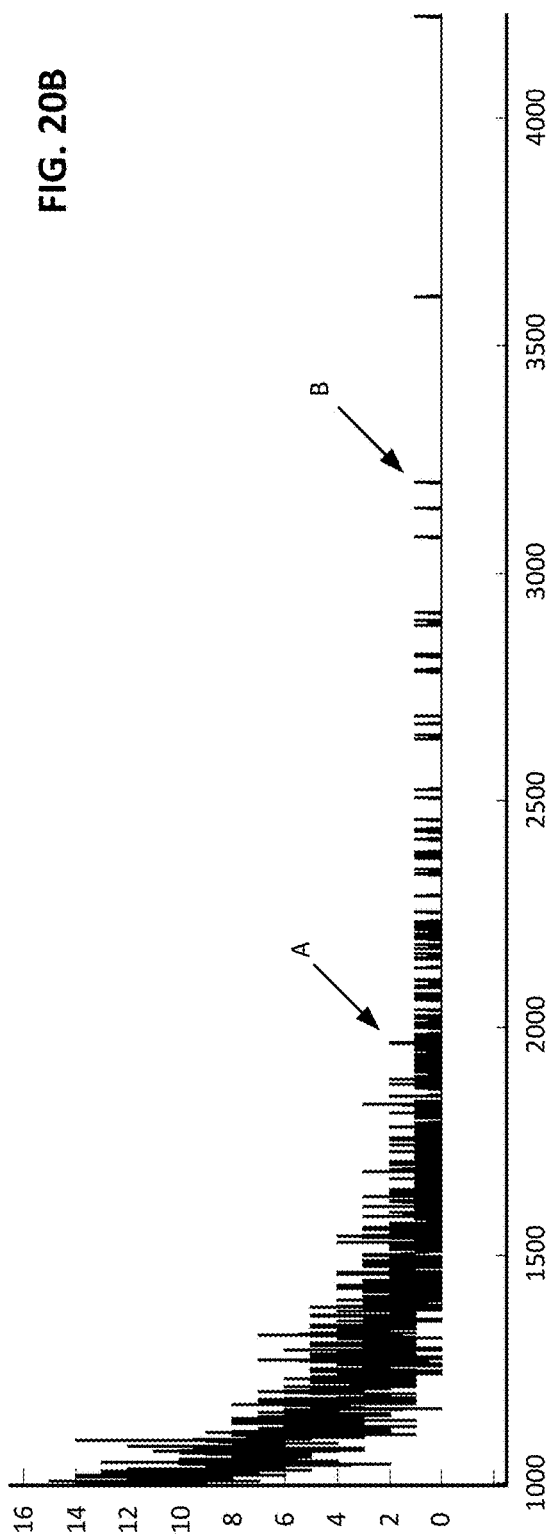
FIG. 20B is an enlarged excerpt of FIG. 20A, corresponding to the region outlined in dashed lines.

FIGS. 20A and 20B show an exemplary histogram for the reference data collected by the above procedure. FIG. 20A shows the full histogram. FIG. 20B shows a greatly-enlarged excerpt of the dashed excerpt of FIG. 20A—showing the Rockstar 40-tuples that occur a thousand or more times, each, in the reference data.

(On the bottom axis of both plots is the number of times a 40-tuple is found in the reference data. On the left axis is the count of such 40-tuples in the reference data. Thus, the histogram element shown at "A" indicates that there are two different 40-tuples in the reference data that occur 1944 times each. The histogram element shown at "B" indicates that there is one 40-tuple in the reference data that occurs 3198 times.)

While the above discussion contemplate that a Rockstar is any 40-tuple that occurs more than 1000 times in the data collection process, a particular implementation uses a different Rockstar threshold: 150. In such an implementation, Applicant found 8,727,541 different 40-tuples that occur 150 or more times.

In the preferred algorithm for generating the reference data in the memory structure, any 40-tuple that is not a Rockstar is discarded. The X/Y/rotation/scale parameters stored for each Rockstar are the averages of the 150+ individual X/Y/rotation/scale parameters with which the Rockstar is associated. In the noted example, the data structure thus includes 8,727,541 records—the number of 40-tuples that occur 150 or more times.

These Rockstars enable a substantial decrease in the size of the reference library that must be maintained and searched, since each such 40-tuple corresponds to a collection of hundreds (or thousands) of tightly-clustered pose states. But even with nearly 10 million Rockstars—each spanning an average of, say 200, different pose states, they collectively account for only 2 billion different pose states—out of the 64 billion in the pose universe.

To achieve the memory savings associated with Rockstars, while addressing the vast number of pose states not encompassed by the Rockstars, Applicant introduces the concept of a Hamming trough. A Hamming trough is the set of all 40-tuples that are within some fixed Hamming distance of a Rockstar 40-tuple. (The original Rockstar 40-tuple is termed the "seed" 40-tuple of the Hamming trough.) This Hamming distance threshold may be, e.g., 10, 15 or 20. Each such 40-tuple within such a Hamming distance (say 17) is regarded as a near neighbor in Hamming distance, and corresponds to a pose that is very close to the set of 4D poses to which the Rockstar 40-tuple corresponds. Thus, each Hamming trough corresponds to a large set of closely-adjoining pose states.

(40-tuples that have Hamming distances more than about 25 away from the seed Rockstar 40-tuple tend to have poses that are radically different than the Rockstar 40-tuple.)

While the Rockstars, themselves, do not fully span the universe of all possible pose states, the Hamming troughs seeded by such Rockstars collectively do. That is, the Hamming troughs fill the regions in pose space (often redundantly) between the pose regions indicated by the Rockstar 40-tuples.

The universe of pose states can be filled in two ways: with more Rockstars, or with bigger troughs surrounding each Rockstar. The former is done by lowering the Rockstar threshold (e.g., the value of 150 in the above example). The latter is done by increasing the Hamming distance threshold (i.e., the value of 17 in the above example).

The tradeoffs between these variables include memory size, and error frequency.

If the Rockstar threshold is set to a very low value, such as 20 (i.e., a Rockstar is any 40-tuple that occurs 20 or more times in the 40-tuples resulting from all possible pose states), then the number of Rockstars is very large, and the Hamming distance threshold that defines the surrounding Hamming trough can be quite small. Yet all possible pose states will be encompassed with essentially no possible pose errors.

In contrast, if the Rockstar threshold is set to a very large value, such as 2000 (i.e., a Rockstar is any 40-tuple that occurs 2000 or more times in the 40-tuples resulting from all 64 billion possible pose states), then the Rockstars themselves will be exceedingly few and far between. The Hamming trough extending from each such Rockstar 40-tuple will need to be quite large to, collectively, fill the entire universe of pose states. Such large troughs requires large Hamming distance thresholds and, as noted, when the Hamming distance gets up above 25 or so, 40-tuples at that distance sometimes correspond to poses that are wildly different than the tightly-clustered pose states to which the Rockstar 40-tuple and its near Hamming neighbors correspond.

Depending on the application, the design engineer can select the Rockstar threshold and the Hamming distance threshold to yield Hamming troughs that, in the aggregate, completely fill the universe of pose states, while balancing memory size and error constraints.

FIG. 21 shows a reference data structure of the sort that may result from the above-described reference data generation algorithm. Each row corresponds to a Rockstar 40-tuple. The left column identifies the 40-tuple (here sorted in numeric order, to aid in searching). The next column identifies which of the eight constellations was applied to derive that 40-tuple. The next four columns identify the pose parameters characterizing the (virtual) view of the (virtual) calibration signal-marked object that led to that 40-tuple.

The following discussion now turns to use of the above-compiled reference data in assessing the pose of an unknown object, e.g., for watermark decoding.

A camera captures an image of a physical object bearing the calibration pattern, from an unknown pose. A 14×14 patch is selected (e.g., from a region characterized by high local contrast—indicating sharpness and suitable illumination), and oct-axis-3 values are computed for each of the 196 pixels. The eight 40-point sampling constellations are applied, yielding eight 40-tuples (termed "query" 40-tuples).

An approximate string matching algorithm is then applied to find the eight Rockstars in the reference data structure that are closest to the query 40-tuples. Each Rockstar entry thereby identified includes a quartet of pose data.

The eight pose quartets obtained from the data structure are checked for clustering of their corresponding pose parameters.

X- and Y-translation parameters may be regarded as clustered if they are within a half-pixel of a particular value; rotation parameters may be regarded as clustered if they are within two degrees of each other; scale parameters may be regarded as clustered if they are within 2.5% scale of each other. These values may be referenced as clustering thresholds If a threshold number (e.g., 2, 3 or 4) of the eight pose quartets obtained from the data structure have all four of their pose parameters within the stated clustering thresholds of the other quartets, then the average of such clustered pose parameters is computed, and is output as a pose parameter for the physical object. A further process dependent on the pose determination (e.g., watermark determination, or presentation of a calibration pattern-aligned augmented reality graphic, etc.) is then launched.

If sufficient clustering is not exhibited in the first eight quartets of pose data, the process is repeated with a second patch of pixels excerpted from the captured imagery (which may overlap the first patch, or be disjoint), and eight more sets of pose parameters can be obtained from the data structure. The sixteen sets of pose data are then examined for clustering as above.

(The threshold number of pose quartets required to be clustered may be increased with the number of patches processed, e.g., 3 for one patch (8 pose candidates), 4 for two patches (16 pose candidates), 5 for four patches (32 pose candidates), 6 for ten patches (80 pose candidates), etc.)

The above process is repeated until either sufficient clustering is exhibited, or a limit is reached on the number of patches processed—in which case the captured imagery is determined not to include a readable watermark calibration signal. (With strong host signal interference, data from a hundred or more patches may be analyzed to assure sufficient confidence in the pose results.)

As with other parameters in this specification, the clustering parameters just-given can be established in accordance with the demands of particular applications. The stated ranges comprise 1.5% of the possible X-translation range, 1.5% of the possible Y-translation range, 0.55% of the possible rotation range, and 2.9% of the possible scale range. Collectively, these clustering parameters define a region in the 4D pose space amounting to less than 0.004% of the possible pose universe. For 4 of 16 pose quartets (or for 10 of 1000 pose quartets) to be clustered within the same small range simply by random chance is exceedingly improbable.

Even if each of the clustering ranges is increased by a factor of 3, the likelihood of multiple pose states falling within such cluster range, randomly, is still highly improbable.

In a variant embodiment, instead of storing exact pose parameters in the data structure, one of 21,684 possible pose "cells" is identified, based on the above-noted clustering parameters. Such a representation can be achieved with 16 bits. The clustering check then simply checks for identity between the pose cell identifiers read from the data structure.

Another variation concerns the check for a closest string match between a query 40-tuple derived from actual camera data, and a reference Rockstar. In this variation, the reference data structure is expanded to include—in association with each Rockstar 40-tuple—pointers to several other Rockstars that are close Hamming neighbors.

Such an arrangement is shown in FIG. 22. To the right of the pose data discussed earlier are three pointers to the three other Rockstars that are closest, in Hamming distance, to the Rockstar identified in the left column. Each pointer comprises a pair of data: Hamming Distance, and Offset. The Hamming Distance column indicates the degree by which the pointed-to Rockstar 40-tuple differs from the Rockstar 40-tuple stored in the left column. (The first of the three depicted pointers nearly always has a Hamming distance of "1"—indicating a single difference in a single element between the two 40-tuples.) The Offset column identifies the distance—in table rows—at which information associated with this very similar Rockstar 40-tuple is stored. (The table here has about a million rows, so the offsets are in the range of negative one million to positive one million. The fourth row in the illustrated table shows an offset—to the nearest Hamming neighbor—of −1 rows. This points to the immediately-preceding row, for which the 40-tuple is identical, except for a single element. Those two 40-tuples are naturally sampled with the same constellation pattern.)

In use, an approximate string match algorithm is used to find a first Rockstar 40-tuple that roughly matches a query 40-tuple sampled from a physical object. "Roughly" means matching within the Hamming trough threshold, e.g., a Hamming distance of 17. Or it can be a threshold offset from such distance, such as within a Hamming distance of 20 (i.e., +3) or 14 (i.e., −3).

Once a first candidate match (i.e., Rockstar) to the query 40-tuple is identified by approximate string matching, the pointers for that Rockstar are checked. That is, each of the other Rockstars identified as similar to this first Rockstar are checked to determine whether any has a Hamming distance less than or equal to the Hamming distance between the query 40-tuple and the first Rockstar. These second level matches to the query 40-tuple are at least as good as the first Rockstar, and may be better (if their respective Hamming distance from the query 40-tuple is less).

The process then repeats with these second level matches. That is, each of their pointers is checked to identify other Rockstars, and the Hamming distance between each of these other Rockstars and the query 40-tuple is computed. If any is as close as, or better, than the current best-match Rockstar, their respective pointers are investigated, and the process continues.

This tree-like search process continues, identifying further Rockstars that are as close as, or closer to, the query 40-tuple in Hamming distance, and their respective pointers are investigated, until all such pointers are found to lead to Rockstars with larger distances than the then-best. The Rockstar that is the absolute closest, in Hamming distance, has then been identified.

Compilation of this pointer data for storage in the data structure is laborious (and may be performed in an exhaustive process—computing the Hamming distance between every pair of Rockstar entries in the data structure), but once completed, it serves thereafter as a resource that greatly speeds the process of finding the reference Rockstar that is closest to the query 40-tuple.

While FIG. 22 shows pointers to the three closest Rockstars, in actual practice a different number can be used (e.g., 5, 8, 12, 18, 25, etc.). Engineering considerations will indicate a suitable balance between economy of data structure storage, and efficiency of the search process to find the best Rockstar match to a query 40-tuple.

Fourth Arrangement

A fourth arrangement builds on the second and third arrangements. Hamming troughs again play a role, but no Rockstars.

In this arrangement, unlike the second and third arrangements, the reference data structure is populated with L-tuples corresponding to regularly-spaced points in pose space (i.e., a 4D lattice). This 4D lattice quantizes the pose universe into about 35 million different pose states, or cells.

Again, four dimensions are used. X- and Y-translation are quantized to the nearest 0.25 pixel (i.e., 128 states for each, given a calibration tile that repeats every 32 pixels). Rotation is quantized in increments of 2.5 degrees, yielding 144 different states. Scale, in the range of 70% to 140%, is quantized in increments of 5%, yielding 15 different states. A total of 35,389,440 different pose states are thereby defined (referenced below as 35 million).

(Quantized pose parameters may be referenced by the middles of their respective ranges. Thus, a pose of {16.5, 8.25, 7.5°, 85%} refers to a pose state in which the X-translation falls between 16.375 and 16.625 pixels; the Y-translation falls between 8.125 and 8.375 pixels; the rotation falls between 6.25° and 8.75°, and the scale falls between 82.5% and 87.5%.)

Instead of sampling the input imagery with a constellation comprising 40 locations, as in the third arrangement, or exhaustively, as in the second arrangement, a constellation comprising 80 locations is used. And the samples span a patch that is 21 pixels in width and 21 pixels in height. And only a single sampling constellation is employed. The L-tuple is comprised of an ordered sequence of 80 oct-axis-3 values (e.g., −1, 0, 1).

An exemplary reference data structure is shown in FIG. 23. Data is collected by modeling the appearance of an object printed with a calibration tile, with an initial pose of (0,0,0°,70%). The resulting 80-tuple is determined and stored in the data structure. The Y-parameter is then incremented by 0.25 pixel, and the process repeats. The process continues in this fashion until the Y-translation has been stepped through each of its 128 states, finally reaching 31.75 pixels. 128 80-tuples are, at this point, stored in the data structure. The X-parameter is then incremented by a quarter pixel, and the process repeats. After all of the X- and Y-translation pose states have been evaluated, the modeled rotation is incremented from 0° to 2.5° and the process repeats. After all X- and Y-translation poses, and rotation states, have been modeled, the scale is changed by 5% and the process repeats. Eventually, all 35 million lattice points in the 4D pose universe have been modeled, and for each an 80-tuple is generated and stored in the data structure.

In use, with imagery of a physical object captured by a real camera, a 21×21 patch of the captured imagery is processed to determine a 21×21 array of oct-axis-3 values. 80 values are sampled from this array with the 80-point sampling constellation, thereby defining a query 80-tuple. The reference data structure is then searched for the closest match (in terms of Hamming distance). The best-match entry indicates the object pose.

Pose resolution that is finer than the quantization increments of the 35 million pose cells can be obtained by combining pose estimates from several pose cells. For example, the algorithm can identify not just the closest 80-tuple match in the reference table (in terms of Hamming distance), but the N closest entries. Each estimate is then weighted by the reciprocal of its Hamming distance to the query 80-tuple, and a weighted pose average is computed. (The reciprocal of the Hamming distance serves as a figure of merit for the associated pose values.)

To illustrate, if N is 4, the four closest 80-tuple entries in the reference table (A-D), and their respective Hamming distances from the query 80-tuple, may be as follows:

| 80-Tuple | Hamming Distance | X | Y | Rotation | Scale |
|---|---|---|---|---|---|
| A | 30 | 16.5 | 8.25 | 7.5° | 85% |
| B | 38 | 16.75 | 8.5 | 7.5° | 85% |
| C | 43 | 16.5 | 8.75 | 10° | 90% |
| D | 45 | 16.25 | 8.0 | 7.5° | 80% |

The indicated pose parameters are then multiplied by corresponding weighting values ranging from $1/30$ to $1/45$. The weights, the weighted pose parameters, and their weighted averages, are then as follows:

| Entry | Hamming Distance | Weight | X | Y | Rotation | Scale |
|---|---|---|---|---|---|---|
| A | 30 | .0333 | .55 | .275 | .25 | 2.833 |
| B | 38 | .0263 | .441 | .224 | .224 | 2.236 |
| C | 43 | .0233 | .385 | .204 | .204 | 2.1 |
| D | 45 | .0222 | .361 | .178 | .167 | 1.78 |
| Sum | | .105 | 1.74 | .881 | .845 | 8.95 |
| Weighted Average | | | 16.5 | 8.38 | 8.04° | 85.1% |

The simple weighting arrangement detailed above facilitates explanation. In practice, however, different weighting arrangements (e.g., the reciprocal of the Hamming distance, raised to an exponent) may, more commonly, be used.

In Matlab, the closest matches to the query 80-tuple in the reference data structure can be identified by the following procedure:

The query L-tuple is replicated 35 million times—once for each entry in the reference data structure, and forms an array that is 80 elements high by 35 million elements across. (The Matlab function "repmat' is used for this operation.) The 80-tuples in the reference data structure are assembled in a second array, in order of their row numbers (in the FIG. 23 presentation). The Matlab function ".*" is then used to compute the dot product between corresponding 80 element vectors in the two arrays. As is familiar, the greater the correlation between two vectors, the greater will be their dot product. This .* operation yields 35 million scalar values, indicating the similarity of the query 80-tuple to each of the 35 million reference 80-tuples in the data structure. These results are sorted from largest to smallest to indicate the 80-tuples in the reference data structure that are closest to the query 80-tuple. By such method, the N closest matches (e.g., for interpolating finer pose estimates) may be obtained.

While one procedure for computing Hamming distance was detailed earlier, there are countless alternatives. Some may non-linearly weight different changes to a particular element in the L-tuple. For example, if corresponding elements in two L-tuples differ by 1 (e.g., 0 vs. 1, or 0 vs. −1), this may contribute a value of 1 to the Hamming distance. However, if corresponding elements differ by 2 (e.g., −1 vs. 1), this may contribute a value of 4 to the Hamming distance, instead of 2 as earlier detailed. (Such modification can be implemented simply by squaring each contribution. $1^2=1$; $2^2=4$.) The original metric may be termed a First Hamming distance; the just-described modification may be termed a Second Hamming distance.

The Matlab dot-product method of ranking the closest matches in the reference data structure may not exactly correspond to their ranked order based on Second Hamming distances. If the N top matches by Second Hamming distance are desired, the top 2N or 3N matches by the above dot-product method can be determined, to yield a small pool of candidate best matches. Second Hamming distances can then be computed for each, and those results can be sorted to pick the closest N in Second Hamming distance.

Still another way of identifying best matches with 80-tuples in the reference data structure is detailed in Norouzi, Fast Search in Hamming Space with Multi-Index Hashing, IEEE Conference on Computer Vision and Pattern Recognition (CVPR), 2012.

Figure 24:
FIG. 24 depicts a greyscale image of an egret, to which a watermark calibration signal has been added.

FIG. 24 shows a grey-scale image of an egret. The 32×32 pixel calibration signal block described earlier (e.g., comprised of 8 components in the spatial frequency domain, transformed back to the pixel domain and reduced in amplitude) is tiled across the image, and summed with it. The amplitude of the added signal is large enough to make the block's effect in the spatial image domain plainly visible in the patent illustration.

An excerpt (FIG. 25) was selected from the calibration signal-added egret image. This excerpt was rotated 173 degrees, scaled to 128%, and cropped so that the calibration signal origin was displaced in X by 19.5 pixels, and displaced in Y by 21.5 pixels. This excerpt was then non-linearly filtered by the oct-axis-3 transform, and sampled with the 80 point constellation, yielding a query 80-tuple. The 35 million entries in the reference data structure were then searched to find the best matches.

Figure 26:
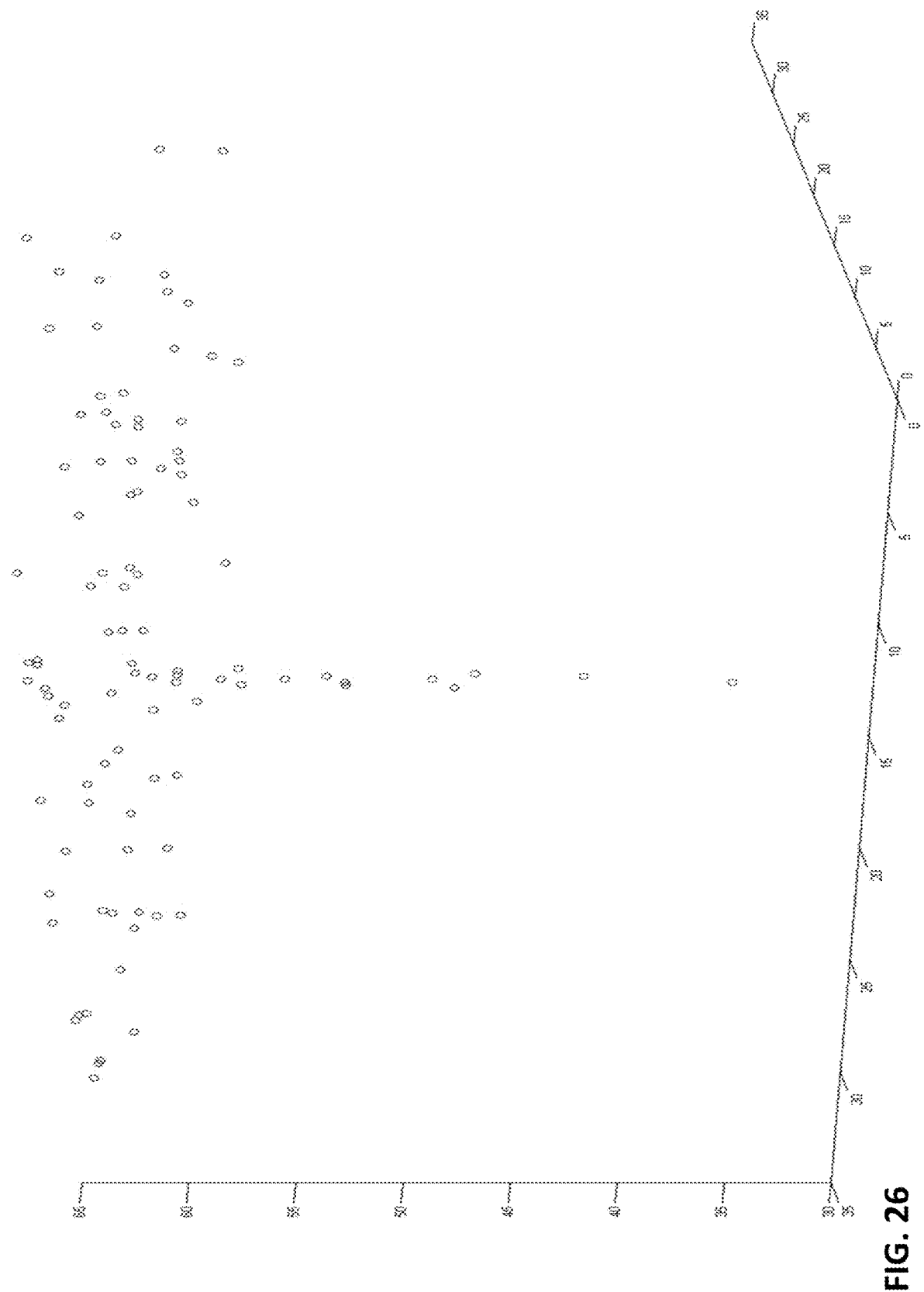
FIG. 26 shows Second Hamming distance measurements between a query 80-tuple based on the FIG. 25 image excerpt, and reference 80-tuples in a data structure.

The results of the search are shown in FIG. 26. Each dot represents a reference 80-tuple in the data structure. The vertical distance indicates the corresponding Hamming distance. The lower the dot, the better the match. Five dimensions are at play—the four pose parameters, and the Hamming distance metric. FIG. 26 depicts only two of the pose parameters—X-translation and Y-translation (each on a 0-31.75 pixel basis, in steps of 0.25 pixels).

As can be seen, the best matches are tightly-clustered in X-Y space. The best-matching reference 80-tuple has a Hamming distance of about 35 from the query 80-tuple. Next-best has a Hamming distance of about 42. The pose estimates continue to be tightly clustered, in a Hamming trough corresponding to the correct pose, until the Hamming distance gets up above 55.

(This is typical for the detailed fourth arrangement; true matches have Hamming distances below 50; mis-matches start to appear above that distance. The lower Hamming distances referenced in the third embodiment were due to the shorter L-tuples, i.e., 40 there versus 80 here.)

The same deep trough, and clustering, appears in plots depicting the Hamming distances of reference 80-tuples with the other pose parameters (e.g., X-translation, rotation; rotation, scale; etc.). Each has an appearance akin to a tornado—a cloud above, resolving into a tight funnel extending below.

FIG. 26 doesn't show dots corresponding to most of the 35 million entries in the reference data structure. Most have Hamming distances on the order of 110 to 130 from the query 80-tuple.

If the deep excursion of the Hamming trough into low Hamming distances, and the noted tight clustering, left any doubt as to the confidence of the determined pose, the process can be repeated by re-sampling the input imagery one pixel away from the original location of the sampling constellation, in either X- or Y-. So-doing shows that the tight X-Y clustering persists (albeit shifted one pixel in X- or Y-), whereas the points with Hamming distances above 55 scatter randomly, in incoherent fashion.

Fifth Arrangement

The fifth arrangement extends the arrangements detailed above through use of machine learning.

As before, reference data is collected by simulating presentation of a reference pattern to a virtual camera at a great diversity of pose states, and capturing patches of image data. As before, oct-axis processing of the captured patches of image data is performed to generate L-tuples (e.g., 40-tuples as in the third arrangement).

In this fifth arrangement, however, a learning system—such as a convolutional neural network, or other multi-layered learning system—is provided with the resulting oct-axis data, as input data—in association with the quartet of pose data to which each corresponds. The learning system then trains on this data (e.g., by backpropagation using stochastic gradient descent) to discern mappings that relate different regions in the L-tuple oct-axis space to different regions in the 4D pose space.

Once trained, the system is provided one or more query L-tuples derived from one or more patches of camera imagery captured from a physical object. The trained learning system outputs the corresponding pose state.

In another embodiment, oct-axis processing is not used. Instead, reference imagery depicting the calibration block at a great diversity of pose states (e.g., the 35 million of the fourth arrangement) is presented to the learning system as training data, again in association with the set of pose parameters to which each corresponds. Backpropagation is again employed to train the system, to map differently-posed depictions of the calibration block to their associated sets of pose parameters.

Figure 25:
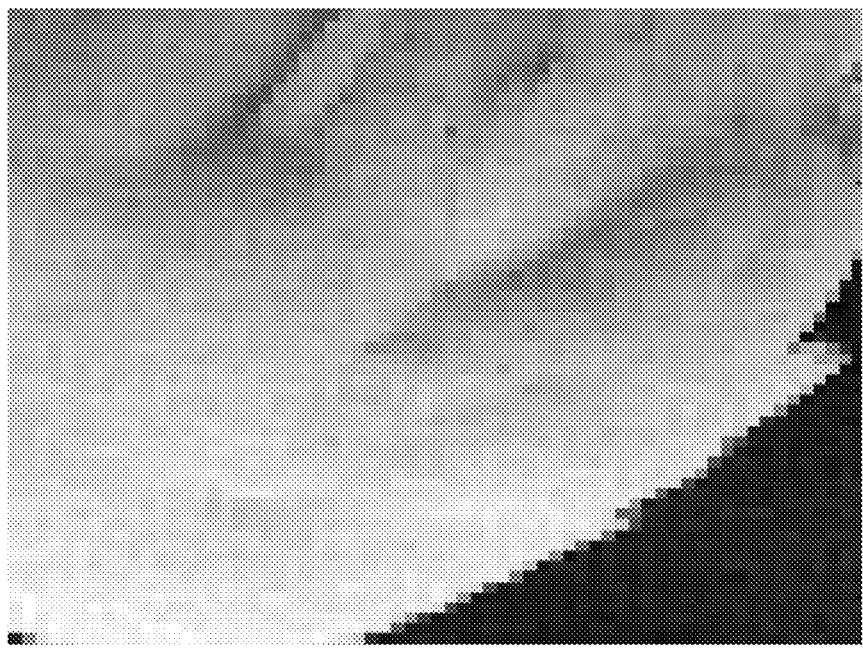
FIG. 25 shows an excerpt of the FIG. 24 image, altered in X-translation, Y-translation, rotation, and scale.

In use, the system is provided with an image excerpt that includes the calibration signal (e.g., the egret excerpt of FIG. 25). The trained system responds by outputting the corresponding pose parameters: {19.5, 21.5, 173°, 128%}.

As in the other embodiments, the outputted pose parameters are provided to a process that uses the pose parameters to correctly find and decode a steganographically-encoded watermark payload that was added to (or otherwise combined with) the host signal, along with the calibration signal.

Sixth Arrangement

A sixth arrangement according to the present technology may be termed pose-independent watermarking. In such arrangement, there is no calibration signal. Rather, data is conveyed simply by detecting the presence of one or more known patterns (and, optionally, their spatial ordering).

Just as other arrangements detailed in this disclosure allow recognition of a known calibration signal, they similarly can be applied to recognize any known pattern within imagery. One example is a noise block—or its inverse—used to signal "1" and "0" bits in a steganographic data encoding pattern. Such a pair of blocks is shown, schematically, at FIGS. 27A and 27B. (In actual practice, many more pixels would make up each block, but the details would then not be visible in the patent illustration.) An array of such blocks can be formed to represent a plural-bit payload (typically encoded in a manner including error correction bits), scaled in amplitude to reduce visibility, and added to a host image (such as packaging for a food product, imagery for a magazine advertisement, etc.).

FIG. 28 shows part of such a pattern, representing (left-to-right, and top-down) the bit string 1101011000 . . . .

FIG. 29 shows such a pattern, scaled-down in amplitude prior to adding with host imagery. Typically, the scaled-down noise signal is further scaled in accordance with a model of human visual system perception, to further decrease visibility of the pattern when added to the host image. Such techniques are known from Applicant's watermarking work.

Figure 30:
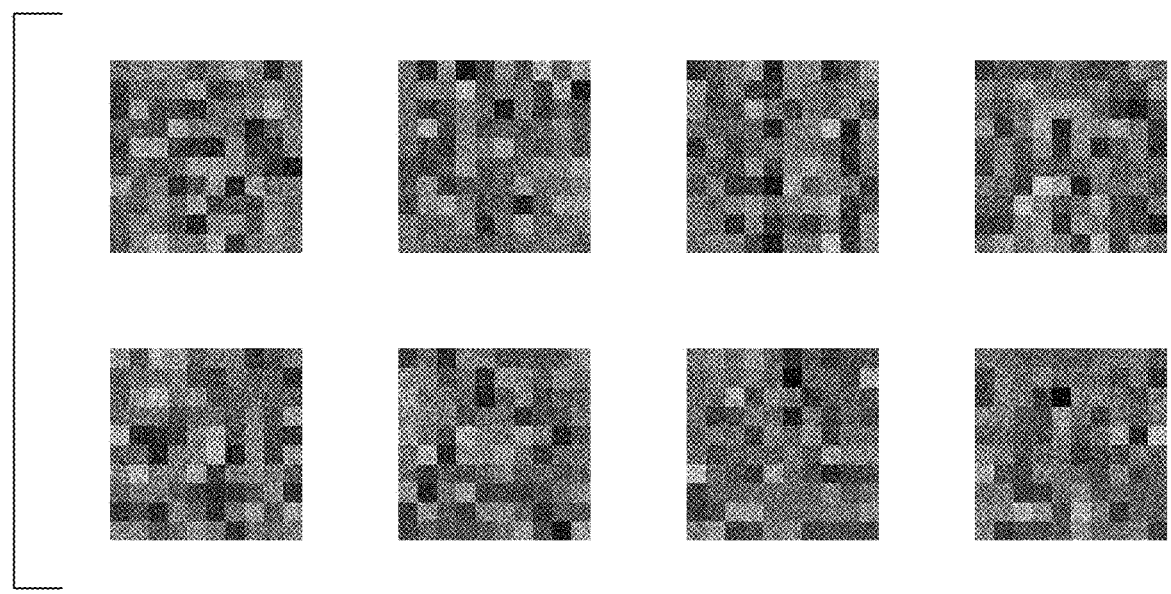
FIG. 30 shows eight different noise tiles, suitable for encoding in octal, or encoding 8 different bit positions in an 8-bit binary message.

The symbols of which such a watermark are comprised need not simply be a pattern and its inverse. An essentially unlimited vocabulary of symbols can be employed. FIG. 30 shows eight different noise patterns, which can be used to encode a payload using the symbols 0-7 of octal notation.

A ninth pattern, or a sequence of patterns, can be used for synchronization purposes, e.g., to signal the start of the payload sequence.

In other embodiments, a single bit "flag" payload suffices, and is signaled by the presence (or absence) of a single pattern. This is the case, for example, in certain authentication applications, in which detection of a known signal pattern (or lack of such detection) serves to trigger a responsive action.

Although the above example allocated a different spatial region to each signal block, this is often not the case. An alternative such embodiment may encode a 70 bit payload using 70 different known noise patterns. Each bit position in the payload is associated with one of these known patterns. If a particular bit position in the 70 bit payload should convey a "1" datum, the corresponding pattern is used without modification; if it should convey a "0," the inverse of that pattern is used. The 70 resulting patterns are combined (e.g., summed—possibly with a small offset) into an aggregate, overlaid pattern, which is then scaled-down in amplitude so as to be imperceptible and added to (or otherwise combined with) the host image signal.

Although 70 different patterns are present (and the host signal may be counted as a $71^{st}$), the above-described detection methods of the present technology can confidently confirm the presence (or absence, or inverse) of each of them, allowing recovery of the full 70 bit payload without the intermediate act of compensating for pose-related distortion using a calibration signal.

Seventh Arrangement

A seventh arrangement of the present technology uses 256-tuples of tristate oct-axis values, sampled from constellation-defined collections of pixels locations within a 29×29 patch of imagery. In this arrangement, plural different sampling constellations are employed, e.g., three. None of the pixel locations sampled by one sampling constellation is sampled by any of the other sampling constellations. (A 29×29 pixel patch defines 841 locations; three sampling constellations involve 256*3 or 768 pixel locations.)

As in the fourth embodiment, reference L-tuple data for a lattice of pose states are initially collected by modeling presentation of the calibration pattern at different pose states. The pose states are defined by quantization increments of 0.25 pixels in X- and Y-translation (across the 32 pixel height and width of the calibration pattern block), and 2 degrees in rotation (across all 360 degrees of possible rotation). The reference data collection procedure in the fourth arrangement is adapted to the above parameters.

The scale states (from 70% to 140%), however, are quantized non-uniformly. At the small end of the range, the scale quantization interval is 5% (i.e., 67.5% to 72.5%). At the high end of the range, the scale quantization interval is 3% (i.e., 138.5% to 141.5%). Intermediate scale state quantization intervals are linearly-interpolated between these values (although, of course, non-linear variation across this 70-140% range can be used).

After the reference data is collected, imagery is captured from a physical object, and the first sampling constellation is applied to a 29×29 patch. Instead of finding the closest-matching 256-tuple in the reference data store (as in the fourth embodiment), this seventh embodiment identifies multiple (e.g., 20-100) entries in the reference data that are pretty good matches to the query 256-tuple.

Ideally, these pretty good matches would be the best 20-100 matches to the query 256-tuple. However, "best" is not required. By not requiring the best matches, faster searching can be achieved.

(If a set of 100 "pretty good" matches is desired, and the 100 "best" match encompass First Hamming distances between the query 256-tuple and reference 256-tuples up to N, then "pretty good" matches may be regarded as those within First Hamming distances of 1.1*N, or N+3 (or N+5, N+10, etc.).)

These 20-100 matching entries in the reference database will correspond to 20-100 different pose cells (states) in the 4D pose universe. Many will be tightly-clustered, indicating the pose of the object depicted in the image.

The same procedure then follows, with the second and third 256-location sampling constellations applied to the 29×29 image patch. Again, 40-200 more matching entries in the reference database will be thereby identified. Again, these will cluster around the correct pose state.

A total of 60-300 candidate pose states are thereby identified. Those that are not clustered are disregarded. Those that are clustered are combined (e.g., using the Hamming-weighted arrangements described above) to yield the final object pose.

In a variation, the above procedure is applied to a different 29×29 excerpt of the captured imagery. For example, it may be the original excerpt, shifted by one pixel in X or Y. Additional pose estimates are thereby obtained. Instead of 60-300 "pretty good" matches, 120-600 "pretty good" candidate pose states are considered. Again, the pose states that are clustered indicate the correct answer, and can be combined to yield a final answer.

In some variations, the original 29×29 excerpt is shifted repeatedly, tens or hundreds of times, in both X- and Y-, to enlarge still further the set of "pretty good" matches from which the final pose answer is derived.

Eighth Arrangement

While the seventh arrangement uses large sampling constellations that yield long L-tuples (i.e., 256), the eighth arrangement goes the opposite direction, with small sampling constellations that yield short L-tuples (e.g., 10 or 16). In this respect it is reminiscent of the first detailed arrangement. The constellations here sample locations from a 29×29 or 16×16 patch of imagery. However, unlike that first detailed arrangement, this eighth arrangement uses oct-axis-2 or –3 filtering of the sampled oct-axis data. The particular embodiment discussed below employs 16-tuples, sampled by four different constellations applied to a 16×16 patch of imagery.

Like the first arrangement, the reference data in this eighth arrangement takes the form of probability density functions that are associated with each L-tuple/constellation pair. As in the first arrangement, these probability functions can be expressed by histograms. In the subject embodiment, the histograms reflect data generated by applying the 16-location sampling constellation to a modeled tiled pattern of calibration signal blocks at each different pose state in a lattice of pose states (i.e., the pose universe) defined by a set of quantization parameters. A suitable set of pose quantization parameters is X- and Y-translation states in 0.25 pixel increments between 0 and 31.75 pixels, every rotation state in 2 degree rotation increments between 0 and 358 degrees, and every scale state in uniform 5% scale increments between 70 and 140%, yielding a total of 44 million pose states. (Tiling of the modeled calibration signal assures that no sample points, e.g., at 70% scale, are indeterminate.)

For a given L-tuple (e.g., {0,0,0,1,0,1,1,0,0,0,1,0,1,1,0, 0}), and a given sampling constellation, one histogram indicates the respective number of times—in the 44 million pose states just-identified—that this L-tuple resulted when modeling the calibration signal pattern with a rotation parameter of 0, 2, 4, 6 . . . 358 degrees. Another histogram does likewise, associating that L-tuple and constellation with the number of times the X-translation had a value of 0, 0.25, 0.5, 0.75, . . . 31.75 pixels, etc. Other histograms likewise reflect the number of occurrences for different Y-translation states, and scale states, in conjunction with the {0,0,0,1,0,1,1,0,0,0,1,0,1,1,0,0} 16-tuple and a corresponding sampling constellation.

This same procedure can be repeated one or more times, with the 16×16 sampling constellation located differently relative to the 32×32 calibration signal block.

Figure 31:
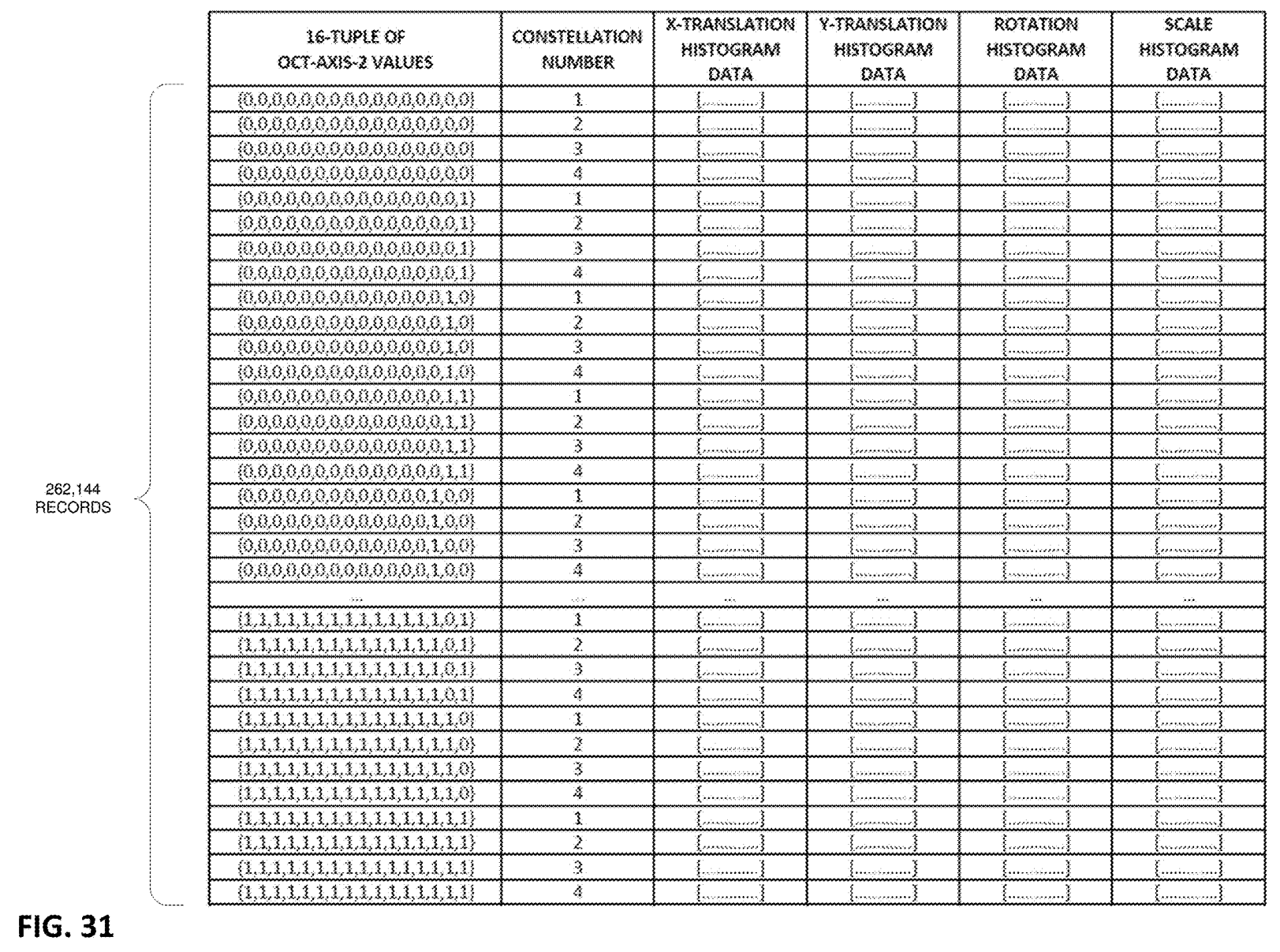

With 16 locations in the sampling constellation, and oct-axis-2 filtering, there are only 65,536 possible L-tuples. The data structure typically includes a record for each. With 44 million different pose states, each L-tuple commonly occurs multiple times (on average, 44M/65K, or ~2700 times). Since each of the 44M pose states is sampled with four different constellations, the data structure includes 262,144 records. Each is associated with four sets of histogram data, for the four pose variables. Such a data structure is shown, conceptually, in FIG. 31.

After reference data has been collected for each of the 44 million pose states, for each of the four sampling constellations, imagery is captured from a physical object. A patch is excerpted, and the first sampling constellation is applied to a 16×16 excerpt, yielding a first 16-tuple of oct-axis-2 values. By reference to this 16-tuple, and an identifier of the first constellation a first set of reference rotation histogram data is obtained from the data structure, together with first sets of reference scale histogram data, X-translation histogram data, and Y-translation histogram data.

The second sampling constellation is next applied to this same 16×16 pixel patch, yielding a second 16-tuple. A corresponding second rotation histogram is accessed from the reference data structure. Likewise for the second scale, X-translation, and Y-translation histograms corresponding to the second 16-tuple.

This process continues for the third and fourth sampling constellations, yielding third and fourth 16-tuples. For each, the reference data structure yields histograms for rotation, scale, X-translation and Y-translation.

Reliance on just four probability histograms for each of the pose variables not adequate in this particular arrangement. Accordingly, the above process is repeated by applying the four sampling constellations elsewhere in the captured imagery. In one particular embodiment, the 16×16 patch is simply moved one pixel to the right (e.g., east), and the four sampling constellations are re-applied (i.e., themselves moved one pixel to the right). Four more sets of pose histograms are thereby identified from the data structure.

It is sometimes convenient to define the location of a 16×16 pixel patch by the coordinates of its upper-left-most pixel (i.e., the northwestern-most pixel), termed an anchor pixel.

To enhance the statistical accuracy, the above process continues—stepping the anchor pixel along a row of pixels, one at a time. After a number (e.g., 30) of patches have been processed in this manner, the anchor pixel of the 16×16 patch is moved one pixel vertically (e.g., north) from its original position, and the process continues—applying constellations to a second row of patches.

This process repeats until the anchor pixel has stepped across a 30×30 pixel span of the captured image. At each location, 4 sampling constellations are applied to the thus-positioned 16×16 patch, yielding four additional 16-tuples. The rotation, scale, X-translation and Y-translation histogram data corresponding to each of these 16-tuples (and constellations) is thereby identified. After the 30×30 pixel span has been processed, 3600 different 16-tuples has been identified (i.e., four sampling constellations, applied to 900 different 16×16 patches). Thus, 3600 different rotation histograms have been identified. A like number of scale, X-translation, and Y-translation histograms are also identified.

(In other embodiments, the anchor pixel is stepped across a non-square region. For example, the anchor pixel may be moved to each location in a region that is 60 pixels in width, and 16 pixels in height. Or the anchor pixel may be moved in one dimension only, e.g., repositioning the 16×16 patch to a succession of 1000 positions, each displaced horizontally from the predecessor by one pixel.)

After the, e.g. 3600, rotation histograms have been identified, they are accumulated, with the bin count for 0 degree rotation in the first histogram summed with the bin count for 0 degree rotation in each of the other 3599 histograms, and likewise with the bin counts for 2 degree rotation, 4 degree rotation, etc. The resulting aggregate rotation histogram evidences a clear peak (e.g., as shown at the bottom of FIG. 7). It may indicate, for instance, that the object pose is characterized by a rotation angle of 34 degrees.

The same procedure is applied to the 3600 histograms of scale data. The resulting aggregate scale histogram may indicate that the depiction of the object in the captured image is presented at a 115% scale.

While the foregoing procedure is satisfactory, it can be improved by determining the pose parameters in two or more successive stages—with the former helping narrow the range of pose possibilities presented by the latter.

In one such staged arrangement, 3600 16-tuples are obtained from the captured imagery, as described above. 3600 corresponding scale histograms are accumulated into an aggregate scale histogram. This aggregate scale histogram may indicate, e.g., that the captured image is at 110% scale.

While determination of the X- (and Y-) translation pose value can proceed in the same manner, the resulting aggregate histogram is noisy. That is, the peak that indicates the correct pose parameter (as in the bottom of FIG. 7) does not rise as far above other values as it could.

Applicant determined that this is because the X- and Y-translation pose parameters are functions of the rotation and scale parameters. For example, a displacement of the calibration signal pattern in the X-direction, at a rotation of 0 degrees, appears as a displacement of the calibration signal pattern in the Y-direction, if the pattern rotation is 90 degrees.

Various algorithms can be applied to increase the signal-to-noise ratio of the peak value in the aggregate X-translation histogram (and likewise for the Y-translation).

A simple algorithm is to prune the 3600 X-translation histograms to exclude those that are apparently inconsistent with a rotation value of 34 degrees, and a scale value of 115%. This can be done by ranking the 3600 records in order of the count in the bin corresponding to 34 degrees in their rotation histogram. Many of the rotation histograms will have large bin counts at 34 degrees (after all, the value of 34 degrees emerged from accumulating all 3600 rotation histograms, indicating there are more counts in the bins corresponding to 34 degrees than any other). Those 16-tuples for which the rotation bin count at 34 degree is low can be pruned, and the histograms in their corresponding records can be discarded from further consideration. (The threshold for "low" can be determined empirically. In some embodiments, if the bin count at 34 degrees is zero, that record is discarded. In others, if the 34 degree bin count is below the average bin count, of approximately 14 (i.e., 2700/180 bins in the rotation histogram), that record is discarded.)

A further pruning operation follows, based on scale value. The records remaining after the above operation are re-sorted, this time based on the count in their scale histogram corresponding to 115%. Again, many scale histograms will have large bin counts at 115%. The records for which the scale histograms have low bin counts (e.g., of 0, or less than 2700/15=180), are disregarded.

Those records remaining, of the original 3600, after these two pruning operations, consist of records that are not evidently inconsistent with a rotation angle of 34 degrees and a scale state of 115%. The X-translation histograms of these remaining data structure records are summed. One value rises above the rest, e.g., an X-displacement of 24.75 pixels. The Y-translation histograms are similarly summed. Again, one value rises above the rest, e.g., a Y-displacement of 17.25 pixels.

While the just-described simple algorithm increases the confidence in the determined X- and Y-translation pose values (by increasing the signal to noise ratio in the aggregated translation histograms), its reliance on pruning actually culls information that may be useful.

As noted earlier, the direction of the translation (i.e., in X- and Y-) depends on the rotation with which it is viewed. Similarly, the amount of the X-Y-translation depends on the scale with which it is viewed.

Reference data collected at a rotation pose of 124 degrees can be made useful in determining the X- and Y-translation of an object depicted with a rotation pose of 34 degrees; the X- and Y-coordinates just have to be adjusted (e.g., a positive X-displacement becomes a positive Y-displacement; a positive Y-displacement becomes a negative X-displacement; etc.). Similarly for every other rotation pose (although a change in X- generally maps to a change in both X- and Y-)

In like fashion, reference data collected at scale poses different than 115% can be made useful in determining the X- and Y-translation of an object depicted with a scale pose of 115%. The X- and Y-translation values simply need to be adjusted by the corresponding ratio in scale states.

Thus, a second algorithm for enhancing the determination of X- and Y-translation pose parameters employs the earlier-determined correct values for scale and rotation to register the X and Y accumulations. Otherwise, a shift in the L-pattern results in shifts in the accumulation location. The data is inverse-scaled and inverse-rotated, effecting the re-mapping needed in order to have histogram accumulations that correspond to the correct X and Y states.

Back to rotation, if the calibration signal has symmetric properties in the spatial pixel domain, the aggregate rotation histogram may evidence two peaks, 180 degrees apart (or four peaks, 90 degrees apart, etc.). In such case, the histogram may be divided in half (fourths, etc.), and the two halves (fourths, etc.) respectively summed (e.g., the 2 degree histogram bin count is added to the 182 degree histogram bin count; likewise for the 4 and 184 degree bin counts; etc.). The repeating-peak bins will sum, but paired bins corresponding to incorrect rotation states may be less correlated and sum proportionately less, causing the former to stand out more from the latter. Simple follow-on tests can then resolve the 180 (90, etc.) degree ambiguity in the final rotation state.

(In other embodiments based on symmetric calibrations signals, reference data is only collected for rotation angles between 0 and 178 degrees, reducing the amount of memory required to store the reference data. Once an object's rotation state is resolved to within this range, the ambiguity with a state 180 degrees away can be examined and resolved.)

As described in connection with the first embodiment, the histogram data can be approximated by Fourier coefficients instead of literal histograms with bin counts for each different parameter value. An illustrative arrangement uses 16 Fourier coefficients, 8 for cosine functions and 8 for sine functions, at each of 8 frequencies (theta, 2*theta, 3*theta, . . . 8*theta). So doing achieves some reduction in memory requirements, at the expense of some loss in data accuracy. As also described earlier, such histogram representations can be combined based on the teachings of Hill, using logarithms (e.g., the histograms are converted to log-likelihood functions prior to adding together).

Ninth Arrangement

A ninth arrangement of the present technology focuses on the "block selection" problem. (The earlier-detailed arrangements similarly address this problem, but the relevance is made explicit in the following discussion.)

FIG. 32 shows artwork that may be applied to an item of product packaging, such as a can or box. Included is a tiled digital watermark signal, as above-described.

FIGS. 33A-33F show the fragmentary captures of the FIG. 32 artwork that result as the product is swept in front of a supermarket point of sale camera system. (FIGS. 32 and 33A-33F are taken from published application 20150055855.)

Each of the FIGS. 33A-33F frames is characterized by a troublesome attribute: most of the frame area has no product depiction. The product occupies only a minority of the image area. An attempt to decode a watermark from a randomly-selected location will most commonly fail—because no product artwork is depicted at the average location.

Accordingly, supermarket POS systems commonly analyze multiple patches of captured imagery, taken from multiple locations in the frame, in an attempt to find a decodable watermark.

A difficulty that arises, however, is that analysis of each patch typically requires a computationally-expensive 128× 128 FFT. Due to the complexity of the FFT processing, the number of blocks that can be analyzed within the allotted time interval is limited: most current POS systems can analyze only 2-7 patches in each image.

Figure 34A:
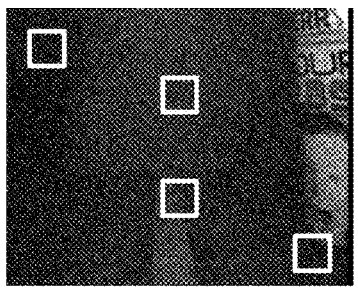
FIGS. 34A and 34B show fixed and adaptive selection of blocks for analysis from captured imagery.

Some embodiments select blocks for analysis at one or more locations that are fixed in every frame. A selection of four such static blocks is shown (by white squares) in FIG. 34A. Here, as is often the case, none of the depicted patches corresponds to watermarked imagery.

Figure 34B:
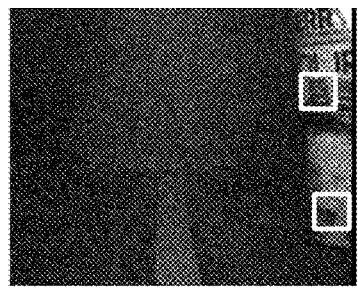

To avoid such outcome, and to avoid wasting CPU efforts on regions devoid of product depictions, some watermark detectors rely on metrics that help identify regions that seem promising. Such metrics are detailed, e.g., in U.S. Pat. Nos. 6,442,284, 6,516,079, 6,590,996, and 7,013,021, and include regions with high local contrast and/or with strong edges. Published application 20150030201 teaches that a binary classifier can be trained, by a large corpus of POS image patches (labeled to identify which include watermarks and which do not) to assess which regions are more likely to include watermark data. By such adaptive block selection approaches, a POS system may decide that two patches of imagery in the FIG. 33A frame are promising, at the locations shown in FIG. 34B, and can attempt watermark decoding from such image patches.

Different block selection methods may be combined in various ways. For example, a POS camera system may be software-configurable, by an administrator, to apply different block selection methods to different frames in an N-frame image sequence. For example, the administrator may configure the system to select the four static blocks of FIG. 34A for analysis, out of the first frame in a four frame sequence. The system may further be configured to employ the adaptive block selection approach of application 20150030201 to the second and third frames in the sequence—identifying, from each, three promising blocks for analysis. And for the final frame of the sequence, a horizontal-mirror-image counterpart of the FIG. 34A arrangement of four static blocks may be selected for analysis. Such administrator-defined cycle repeats continuously during scanner operation.

While adaptive block selection, and configurably-varying block selection, are improvements over static block selection, such techniques still sometime fail, e.g., because regions that look promising may still have little or no watermark energy.

Figure 35A:
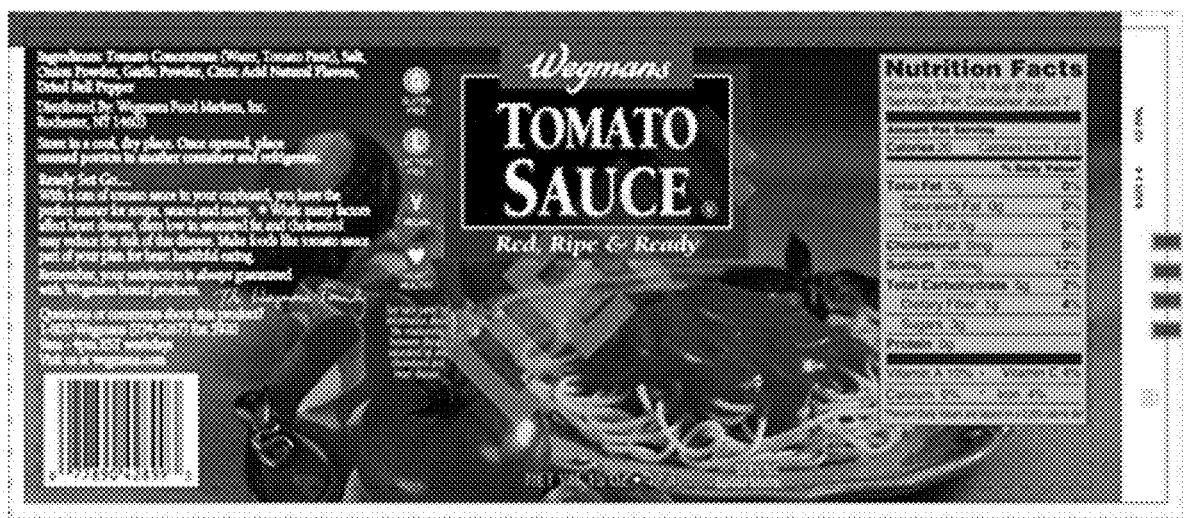
FIGS. 35A and 35B show a product label, and a corresponding watermark strength map.
Figure 35B:
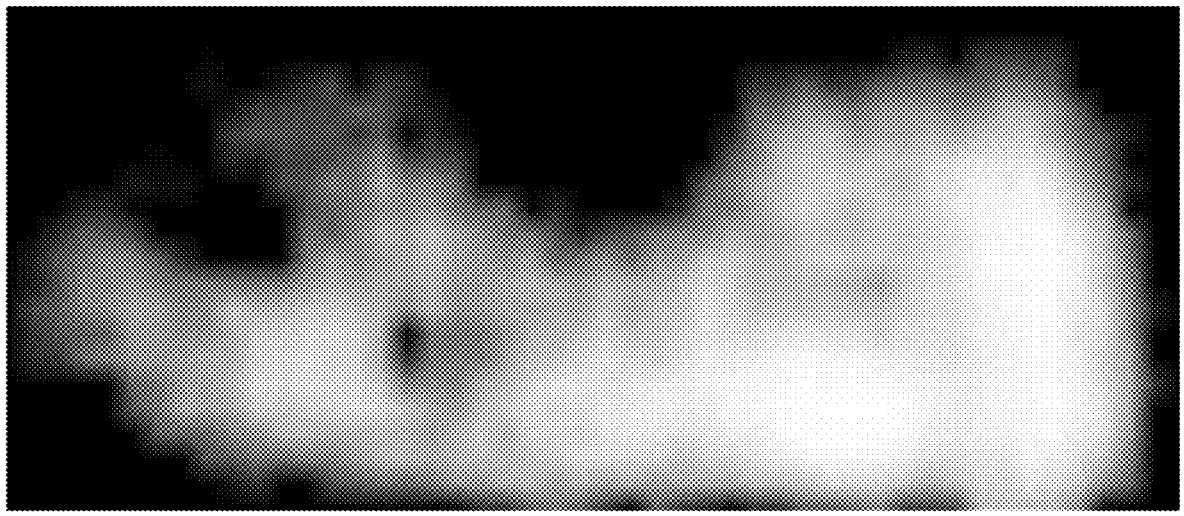

Consider FIG. 35A, which shows a product label. FIG. 35B is a watermark strength map corresponding to the FIG. 35A label, and identifies—in black—the regions with little or no watermark energy. (These figures are taken from pending application Ser. No. 15/154,529, filed May 13, 2016.)

As can be seen, the "Tomato Sauce" text at the top center of FIG. 35A is characterized by high local contrast, and strong edges. However, the watermark signal is weak or missing there. Likewise with the text in the upper left corner. Thus, the previous techniques for identifying promising image excerpts can lead to computationally-expensive processing of image regions from which no watermark information can ever be decoded.

The present technology offers a way to select blocks that, to an arbitrarily high certainty, include decodable watermark data. (The degree of certainty is a parameter that can be user-set, as detailed below.) Moreover, the block selection process is exceedingly fast, e.g., generally employing no transformation of image data from the pixel (aka spatial) domain into the spatial-frequency domain (e.g., by an FFT or DFT), thereby permitting a great number of candidate patches within the captured imagery to be evaluated for watermark energy. FIG. 36 is illustrative, depicting 48 patches within the POS-captured imagery that the present technology can quickly evaluate for the presence of watermark signal. Those that are found to pass such a screening can be passed to a traditional watermark detector for decoding—confident that watermark payload data can be recovered.

Figure 12B:
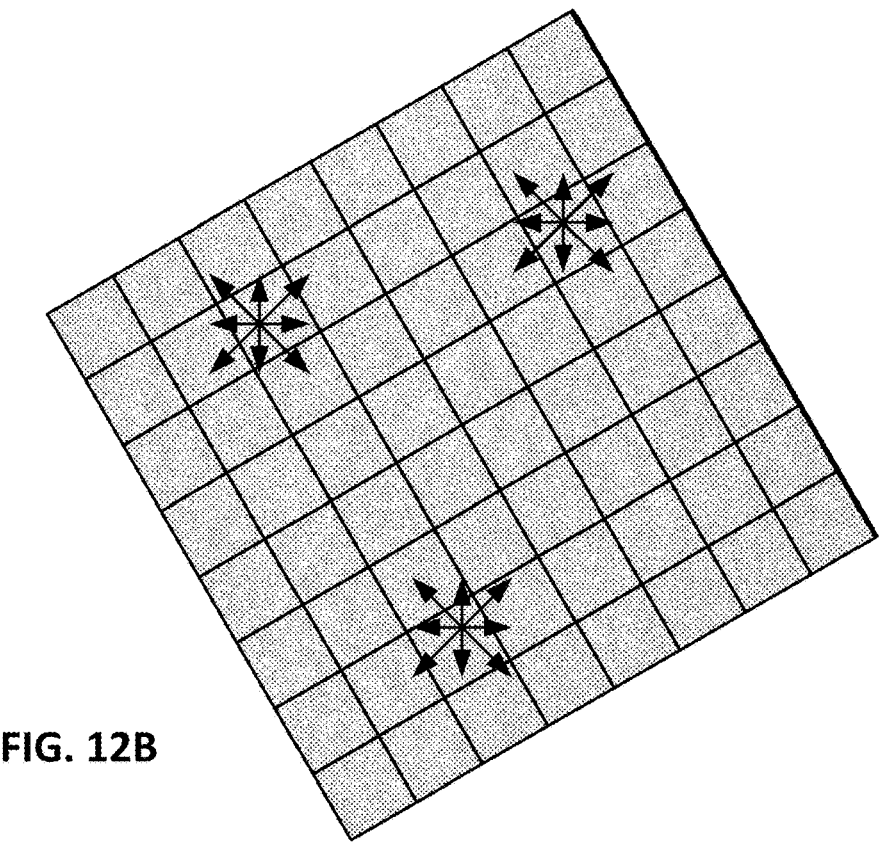

In the first phase of operation, training data is generated by modeling a tiled, continuous (i.e., not pixelated) calibration signal at each of the above-referenced 44 million different pose states. (The calibration signal in this arrangement is comprised of 40-80 signal components in the spatial frequency domain, embedded in tiled watermarks as 128× 128 calibration blocks.) At each pose state, 12 different 16-point sampling constellations (each spanning a 24×24 pixel region) are repeatedly applied to the tiled calibration signal. At each of the sampling points, a non-linear filtering operation is applied, comparing the signal value at the sample point with the average signal value at 8 surrounding points (as depicted in FIG. 12B). If the sample point is larger than the average of the surrounding points, a "1" is assigned to that location in the resulting 16-tuple; else a "0" is assigned. For each 16-tuple, a corresponding bin in a scale histogram is incremented in accordance with scale value of that pose state. (In this arrangement, unlike the eighth arrangement, no rotation histogram is maintained. Likewise, no X- or Y-translation histogram is maintained.) After all 44 million pose states have been processed in this manner, the final scale histograms are optionally converted into Fourier form, represented by 15 coefficients.

In the second phase of operation, patches of camera-captured imagery from 48 different locations in an image frame (e.g., from the 48 regions depicted in FIG. 36) are separately processed to determine whether a watermark is present. Where a watermark is present, its scale is also determined. A watermark decoder is then alerted to the location of the block(s) determined to include watermark data, and the estimated scale state for each, so that it may quickly extract watermark data from such image region(s).

One particular algorithm for the second phase of operation (i.e., processing image patches captured from a physical object by a physical camera to determine presence of a watermark) is detailed in the flow chart of FIG. 37. The process starts by grabbing one of the 48 different 66×66 pixel patches of imagery shown in FIG. 36. For each pixel location within the patch (but omitting the boundary pixel rows/columns), a non-linear, oct-axis filtering operation is applied—comparing the value of the subject pixel to the average value of the eight surrounding pixels. If the subject pixel is larger in value, a "1" is assigned; else a "0." A 64×64 array of 0/1 elements is thereby created.

Twelve accumulators are then initialized, one for each sampling constellation. Each accumulator has 15 elements. These are the structures in which conditional probability scale data gathered in the first phase of operation, and accessed in this second phase of operation, are accumulated.

An initial 24×24 patch within the 64×64 0/1 array is identified. FIG. 38 shows that the initial patch can be located at the upper left of the 64×64 array. Twelve different 16-point sampling constellations, corresponding to those used in the first phase, are successively applied to this 24×24 patch, each yielding a 16-tuple consisting of 0s and 1s. FIG. 39A shows one such constellation—identifying the ordered set of sites that will be sampled for their oct-axis values in the input data. FIG. 39B shows application of this constellation to a sample array of oct-axis values, yielding the 16-tuple: 0111010110001100.

Figure 40:
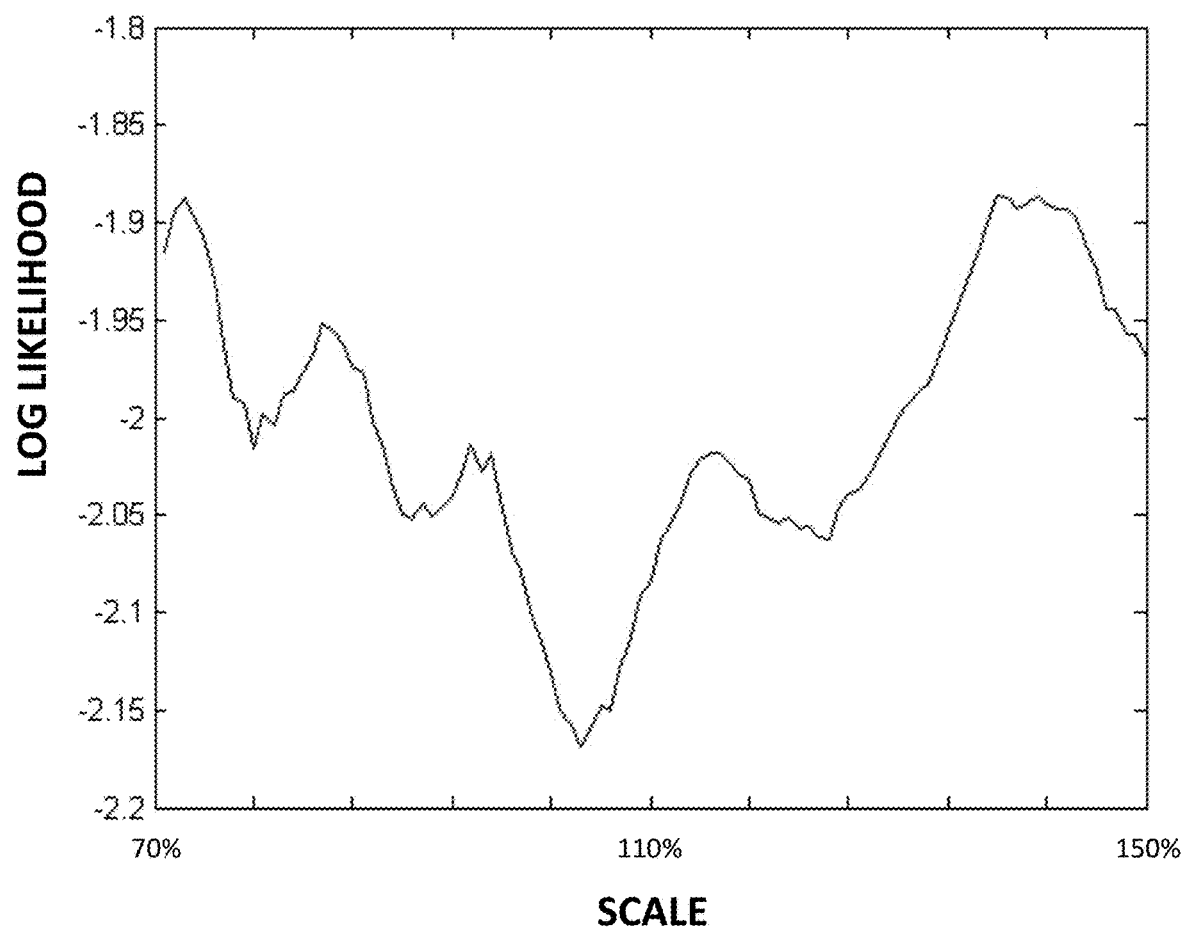
FIG. 40 shows reference data in a data structure detailing condition probability scale data associated with a particular 16-tuple of oct-axis values.

Each such 16-tuple is used to access the earlier-stored reference data, yielding a set of conditional probability distribution data for the scale variable. (This data may be stored in compressed form, e.g., occupying 4 bytes of memory, in which case it may be decompressed for use.) Such a set of conditional probability data for a single 16-tuple is shown in FIG. 40. (In FIG. 40, the probability has been expressed as a logarithm.) The scale probability data that results from the first constellation is added to the first accumulator; the scale probability data that results from the second constellation is added to the second accumulator, etc.

After all 12 sampling constellations have been applied to the first 24×24 patch within the 64×64 array, a second 24×24 patch is processed—located one unit to the right in FIG. 38, and the acts detailed in the foregoing paragraphs are repeated. In similar fashion, the 24×24 patch is located at each of 40 successive locations in the x-direction. The patch is then moved down one unit in the y-direction, where 40 more 24×24 patches are processed. And this continues for 40 different locations in the y-direction. At the end, the 24×24 patch has been placed at all 1600 possible locations within the 64×64 excerpt. Each accumulator thus reflects the accumulation of 1600 sets of conditional probability distribution data like that shown in FIG. 40.

Figure 41:
FIG. 41 shows how estimates of image scale—indicated by four different sampling constellations—converge (here, to about 80%), as more and more conditional probability histograms are accumulated together.

It often doesn't take all 1600 sets of data to reveal the correct scale state. FIG. 41 includes four plots—each corresponding to a different sampling constellation. (As noted, 12 sampling constellations are actually used in the above arrangement, but the chart is then obscured.) The vertical axis indicates the scale state indicated by the accumulated histogram data, i.e., by the bin in the accumulated histogram having the largest count. The horizontal axis indicates the number of 16-tuples for which histogram probability data have been accumulated. In this example, after probability distribution data for 200 16-tuples have been accumulated, the scale estimates for each of the four constellations have substantially converged.

After the constellations reach a specified degree of agreement (e.g., all converging on a single scale bin, plus- or minus-one bin), the processing can stop. Instead of processing 1600 different 24×24 locations with the 12 sampling constellations, processing can stop after just 200 or 400 have been processed. This end-when-converged manner of operation is a substantial improvement over prior art, e.g., FFT-based techniques for determining pose, which must run their full course before yielding an answer. Pose determination is thus performed more quickly and efficiently, with the expenditure of less processing resources, by this shortcut.

Figure 42:
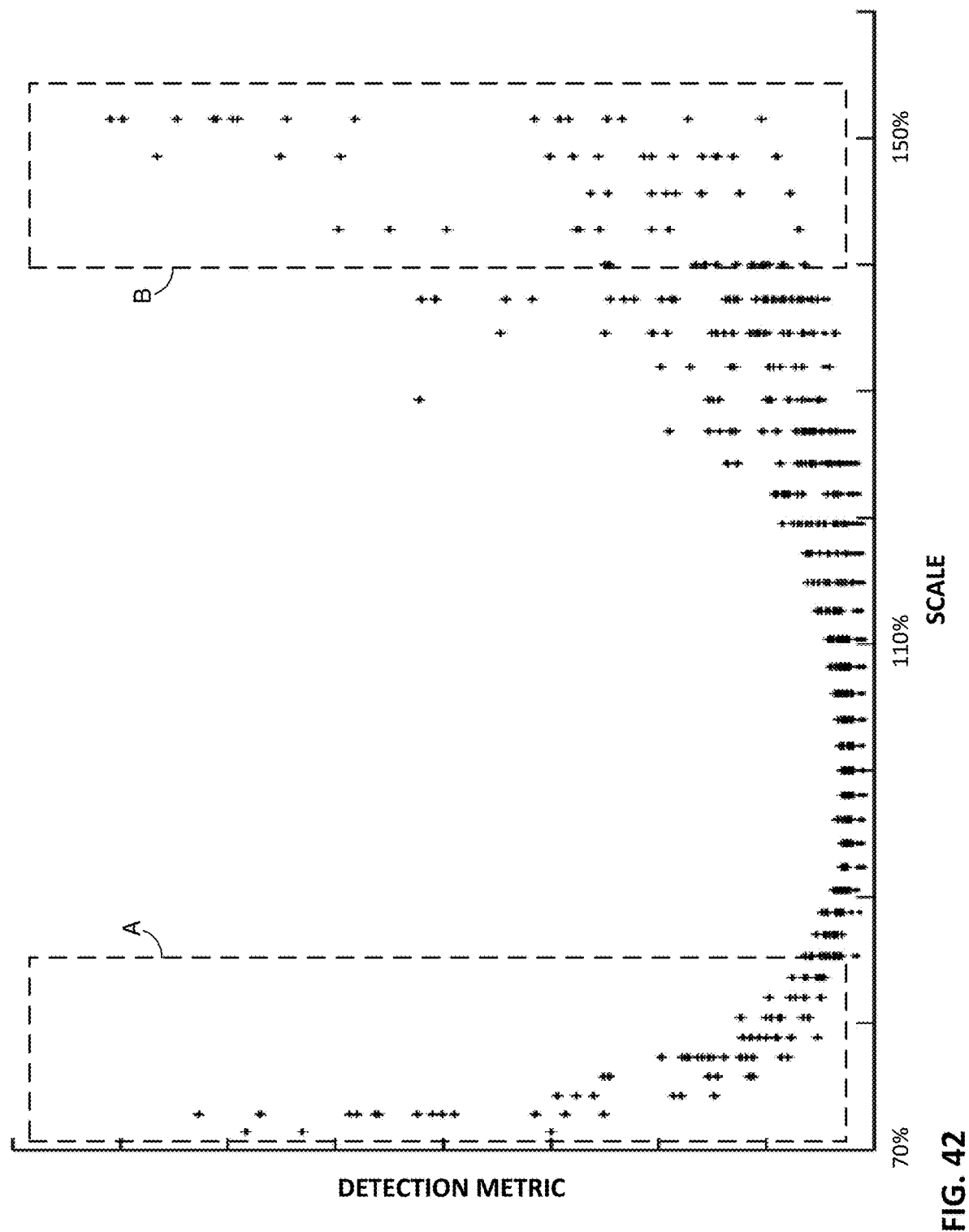
FIG. 42 shows a plot of a detection metric, plotted against reported scale, for a collection of watermarked and unwatermarked image excerpts.

FIG. 42 shows the results of hundreds of trials based on excerpts taken from watermarked and un-watermarked egret images. Each trial was conducted with a random scale (one of 40 different scale states) and a random rotation. The + indicia indicate watermarked image excerpts, and the other symbol indicates non-watermarked image excerpts.

Scale is plotted on the horizontal axis. The vertical axis indicates an arbitrary detection metric. In this case, the 12 accumulated histograms (one for each constellation) are summed (i.e., by adding counts in their corresponding bins), yielding a master histogram. The vertical axis indicates the count of the bin in the master histogram having the largest value. (This may be termed a "simple sum" metric.)

When unwatermarked image excerpts are processed by the foregoing technique, the largest bin in the master histogram never gets very large. There is naturally a bin that is larger than the others, but its maxima is neither large nor particularly prominent. This can be explained by the fact that the 1600*12 histograms that are accumulated for each constellation are based on the reference signal, and the reference signal is uncorrelated with the unmarked egret. So the 19,200 histograms that are accumulated in the master histogram are uncorrelated with each other, leading, essentially, to accumulation of 19,200 noise signals.

Interestingly, the largest bin in the master histogram, in the unwatermarked image case, routinely indicates a scale between 85% and 140%. Values below 85% are not seen. Thus, without any further analysis, a watermark is known to be present if the largest bin in the master histogram indicates a scale in the 70-85% range. This is shown by a dashed rectangle A in FIG. 42.

A similar phenomenon is found at high scale states. That is, the maximum bin for master histograms of arbitrarily scaled/rotated excerpts of the unmarked image never indicates a scale of 140%-152%. Here, again, if such a scale state is indicated (shown by the dashed rectangle B in FIG. 42), the image is known to convey watermark data.

Figure 43:
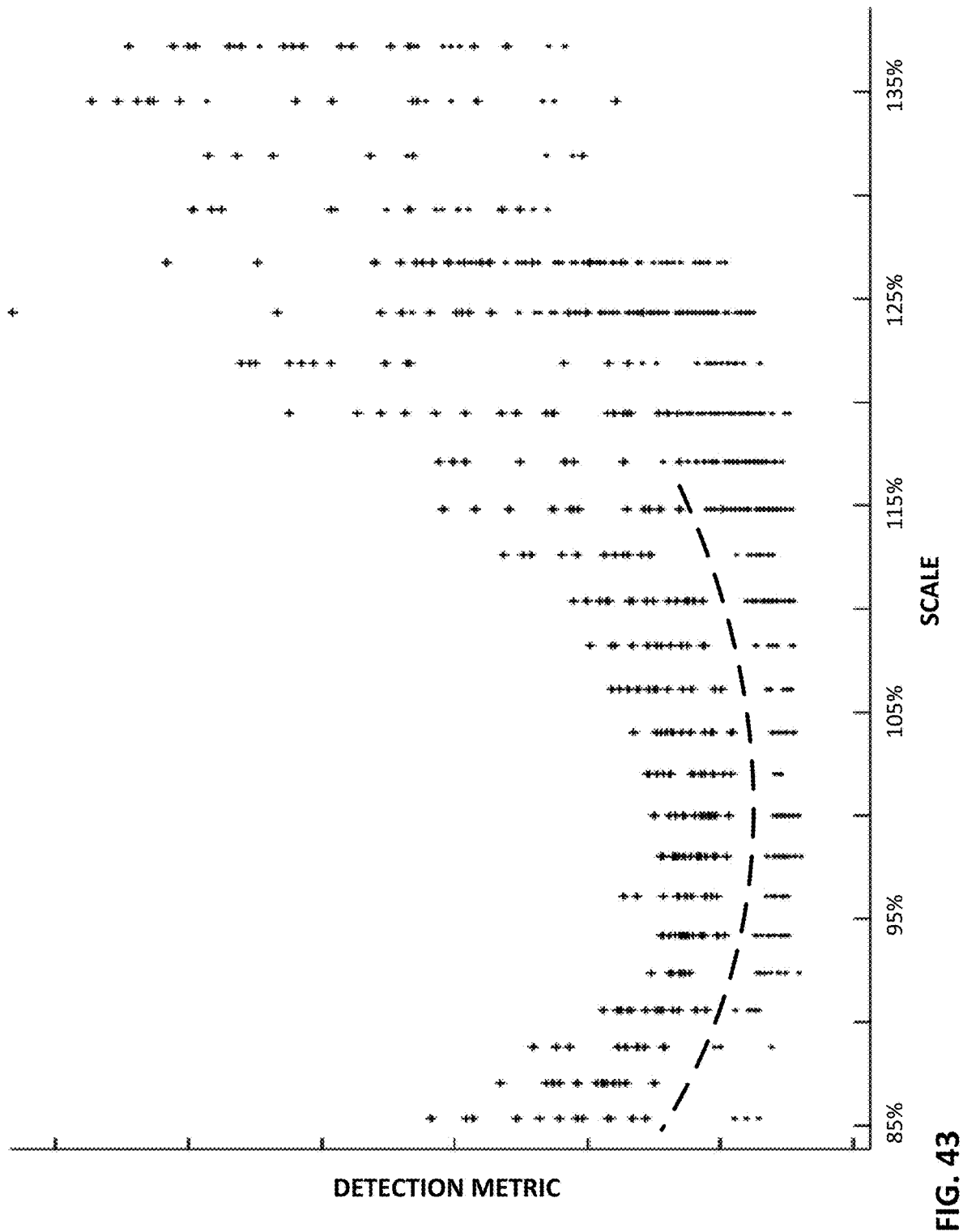
FIG. 43 is an enlarged excerpt from FIG. 42, with the addition of a line separating the watermarked image excerpts from the unwatermarked image excerpts.

At master histogram-indicated scale states between 85% and 115%, there is generally an evident separation between detection metrics for watermarked and unwatermarked images. FIG. 43 is a magnified version of FIG. 42, illustrating this separation by the dashed line. If, at a scale in this range, the detection metric is above the threshold value indicated by this line, the image excerpt includes a watermark. If it is below the threshold value, it is unwatermarked. The location of this dashed line can be determined empirically, such as applicant has done in the depicted case by running hundreds of trials.

A similar threshold approach can be applied for indicated scale states between 115% and 140%, to determine if an image is watermarked or not. However, the separation is not perfect.

Occasionally, an unwatermarked image will have a detection metric above the threshold curve. Or a watermarked image will have a detection metric below the threshold curve.

To eliminate this ambiguity, a first solution is to collect more data. For example, instead of processing a 64×64 patch of imagery, the method can be extended to a 64×128 or 128×128 patch. As more data is considered, the quality of the results improves (and with it, the evident separation in detection metric between watermarked and unwatermarked images).

A second solution to eliminating this ambiguity is to employ a different detection metric.

Simply summing the 12 accumulations of 1600 histograms for the 12 constellations is a blunt metric. In the case of an unwatermarked image, the maximum bins in the 12 accumulated histograms usually show little if any consistency. One may indicate a scale of 93%. Another may indicate a scale of 140%. A third may indicate a scale of 125%. So a more refined detection metric generates a score based on consistency (or lack thereof) between the 12 histogram-indicated scale states.

One such score computes an average of the 12 scale states indicated by the 12 accumulated histograms, and then sums 12 absolute value differences between this average and the 12 histogram-indicated scale states (or the square roots of such differences). With such a deviation metric, the smaller the value, the more likely the image is watermarked. Again, a separation curve can be determined, e.g., experimentally, to distinguish images that have watermarks from those that do not. Other metrics based on deviations between the accumulated histograms (or even between the 1600 histograms for each constellation, and/or between the 19,200 total histograms) can similarly be employed. (Such a metric may, alternatively, be termed a consistency metric.)

Returning to the point of sale application, the above procedure may indicate that several blocks of imagery contain watermark data. In such case, they may be ranked based on a figure of merit score (such as the simple sum metric, or a consistency metric), and data indicating block locations for the top-ranked block(s) can be passed to a watermark detector—together with the estimated scale state(s).

Knowing the estimated scale state, the watermark detector can bypass the usual prior art methods for estimating scale, and can proceed more quickly (and certainly) to extract watermark data from the indicated block(s) of imagery. (Plural blocks may be processed to discover the presence of plural different watermarks, e.g., when several items are simultaneously within the field of view of the POS camera system.)

The block selection protocol earlier described (e.g., analyzing one frame with fixed block selection, followed by a next frame using adaptive block selection) can be modified to include block selection as detailed in the present arrangement. For example, one frame of captured imagery can be processed by attempting watermark decoding on the four static blocks of imagery identified in FIG. 34A. A next frame of captured imagery can be analyzed using image metrics (e.g., using the noted trained-classifier approach) to identify up to three promising image blocks that are passed to the watermark decoder. A third frame of captured imagery can be analyzed by the above-detailed conditional probability approach to identify blocks having watermark data, and the best-scoring blocks (e.g., by the simple sum metric, or by a consistency metric) are passed to the watermark decoder—bypassing the usual scale estimation procedure. This sequence of different block selection strategies repeats, beginning with the fourth frame of POS-captured imagery, and continues to cycle.

Tenth Arrangement

In a tenth arrangement, histogram statistics are gathered for unwatermarked images, and used to further enhance recognition of watermarked, vs. unwatermarked images.

In an illustrative arrangement, a simple classifier is employed to categorize the input image excerpt as falling into one of several classes, e.g., text, dark, low-noise, or high-noise.

Text may be simply characterized by dark markings on a light background. A histogram of grey scale pixel values may be computed, and tested for the presence of the two characteristic humps (e.g., collectively accounting for more than half of the pixels, and with the hump at the lower grey-scale range accounting for at least 10% of the pixels, but being smaller than the hump at the higher grey-scale range). Dark imagery may be characterized by summing all pixel values in the image excerpt; if the sum is below a threshold value (e.g., 200,000, for a 64×64 pixel excerpt), the imagery is regarded as dark.

If neither of the above tests is met, the excerpt is then characterized as low- or high-noise.

Low-noise imagery may be characterized by computing the absolute value difference between 100 pairs of spaced-apart grey scale pixels (at random locations identified by stored coordinates), and summing. If the total is less than a threshold value (e.g., 3,000), the image is regarded as low-noise. If equal or greater than the threshold, it is regarded as a high noise image.

For each type of image, a large corpus of exemplars is processed to collect histogram reference data. The procedures detailed earlier for first phase data collection can be followed—applying different combinations of scale and rotation to each exemplary image excerpt, applying the 12 different sampling constellations to each (here following the ninth above-described arrangement), identifying a reference histogram from the resulting 16-tuple, and incrementing the bin count corresponding to the scale value of the processed image excerpt. Each sampling constellation can be stepped across the image excerpt, in X- and Y-directions, generating thousands of 16-tuples for each pose state; for each, the bin corresponding to the scale of the current image excerpt, in the histogram associated with that 16-tuple, is incremented.

Four auxiliary libraries of pose-probability reference data are thereby obtained, one for each of: unwatermarked-text imagery, unwatermarked-dark imagery, unwatermarked-low noise imagery, and unwatermarked-high noise imagery. (These are in addition to the main library of reference data detailed in the earlier arrangements, derived from imagery containing the calibration signal.)

In use with unknown imagery (e.g., from a point of sale scanner), processing begins as described in the ninth arrangement, accumulating 12 histograms from the main library of reference data (i.e., derived from imagery containing the calibration signal). Additionally, the input image is classified into one of the four classes. Twelve histograms are similarly accumulated from the auxiliary library of reference data (derived from unwatermarked imagery) associated with that image class. Each constellation is thus associated with two accumulated histograms—the first based on reference data including the calibration signal, and the second based on reference imagery not including the calibration signal.

For each of the twelve pairs of accumulated histogram data, the second histogram is weighted by a factor (e.g., 0.2) and is subtracted from the first histogram. The resulting 12 histograms are then processed as described earlier to generate a detection metric (e.g., simple sum, or consistency). The metric is then evaluated to determine whether the input image excerpt is watermarked.

The operative principle behind this tenth arrangement is to identify histogram statistics that may be found in unwatermarked imagery of a particular class, and to compensate histogram data generated from unknown imagery to reduce the influence of such statistics. By such arrangement, the present method reduces the chance that a histogram bin with the largest count—for an unwatermarked image—is mistaken as a determination that the image excerpt contains a watermark of the corresponding scale.

For example, in the egret example used in the ninth arrangement, it was noted that unwatermarked excerpts had histogram accumulations that uniformly peaked in a middle range of scale states—with maxima in the range of 85-140%. Not coincidentally, this is the range in which distinguishing watermarked from unwatermarked versions of the image sometimes requires a bit of help. The present arrangement provides such help.

The egret is a high-noise image. The histogram reference data for high-noise unwatermarked images may consistently accumulate to produce maxima in the mid-range of scale states.

In determining whether an input excerpt of the egret image is watermarked or not, the 12 accumulated histograms from the main reference library are slightly re-shaped to remove some of the larger-bin-values-at-middle-scale-ranges statistical characteristic that tends to be found in accumulated histogram of high-noise, unwatermarked images. If the excerpt is unwatermarked, this re-shaping of the 12 histogram curves will decrease the likelihood that a bin in this middle range of scale states will have the maximum count, and will increase the odds that one of the outlying bins, corresponding to large or small scale states, will be found to have the maximum count. Variation in location of the largest bin among the 12 histograms will thus increase, and it is less likely that an unwatermarked image excerpt will be mistaken for a watermarked image excerpt.

In actual practice, implementations simpler than detailed above can be employed. The unknown input imagery is still assessed to identify its class. But once known, one of plural (e.g., four) corresponding rote forms of histogram correction is applied to the 12 histograms accumulated from the main reference data, based on the input imagery. One compensation may filter the histograms to reduce the bin counts in the middle-range bins by various amounts—20% at the bin corresponding to a scale of 110%, and tapering to zero at bins corresponding to scales of 85% and 135%. A second may reduce bin counts at bins corresponding to the smallest scale states. A third may reduce bin counts at bins corresponding to the largest scale states. A fourth may reduce counts in bins corresponding to both the largest and smallest scale states. (Of course, rather than processing certain bins to reduce their counts, other—complementary—bins may be processed to increase their counts. And compensations can be applied in the compressed domains in which bin data may be stored and/or accumulated, rather than in uncompressed bin counts.)

Naturally, if histogram statistics are varied to increase the likelihood that unwatermarked excerpts have maximum counts in bins corresponding to small or large scale states (e.g., the regions identified at A and B in FIG. 42), then the heuristic that indications of small or large scale states are a certain indicator of the presence of a watermark should be abandoned.

Eleventh Arrangement

The eleventh arrangement is a further variant on the ninth arrangement. In this arrangement, the scale is not indicated solely by the master histogram bin having the maximum count. Instead, a Gaussian curve is fit to plural (e.g., 3, 5, 10) bins in a range that includes the maximum bin. The peak of this fitted curve is taken as the scale state indicated by the histogram.

Such a method can also be applied, individually, to each the 12 component accumulated histograms. 12 peaks of fitted curves are thereby determined. The average of the maxima of these 12 curves then serves to indicate the estimated scale state.

Twelfth Arrangement

The twelfth arrangement further shortcuts the watermark decoding process by application of brute force.

Using arrangements like detailed above, imagery is transformed into thousands or millions of different pose states—applying every combination of, e.g., scale, rotation, and X- and Y-offset within desired ranges, and at desired step sizes (e.g., 2% scale, 0.5° rotation, 0.5 pixels in X- and Y-offset). However, instead of performing these transformations on the calibration signal, they are performed on an excerpt of unknown imagery captured from a physical object by a physical camera. Each transformed excerpt is then applied to a conventional watermark detection algorithm—which expects to receive input imagery at a known, nominal state (e.g., 100% scale, no rotation, no X- and Y-offsets).

One of the transformed excerpts—if watermarked—will be closest to the nominal state. The watermark detector will output a decoding metric indicating some reading success but with some residual error—due to variance between the pose of the best-transformed excerpt, and the true nominal values. If the error is small, the detector will correctly decode the watermark payload (as indicated by a valid correspondence between the encoded bits and CRC data), and the process stops with the decoded watermark result.

If the initial set of poses did not yield a successful watermark decode, a binary search can ensue to further refine the pose. For example, scale can be reduced by half of the step size (e.g., 1%), and detection performed again. If a better decoding metric is achieved, this new scale state is maintained. If a worse metric results, a similar change in the opposite direction can be tried, and detection performed again. If this results in a better decoding metric than the original one, that new scale state is maintained. Else the original scale state is maintained.

The same procedure can be applied to the other pose parameters. After each has been iterated in this fashion, the process can repeat, with perturbations half the size as in the previous cycle. Quickly (typically before this second phase of iteration is performed), a valid checksum is produced, indicating that the correct payload has been extracted, and the process terminates.

If the input image excerpt is unwatermarked, none of the initial trial-watermark decodings will indicate read success, and the process terminates.

At each pose state, goodness-of-fit metrics can be calculated to evaluate how close the pose state is to the true pose. One such metric can be obtained by computing the correlation between the calibration signal and the re-sampled imagery for the specified pose state. (This and other correlations may be performed in the spatial-frequency domain.) The re-sampled image may be subjected to filtering operations to remove the host signal prior to the correlation calculation. Another metric can be obtained by computing the correlation between known portions of the watermark payload signal and the corresponding bits of the re-sampled imagery for the specified pose state. Again, filtering operations may be performed on the re-sampled imagery to suppress the host signal and enhance the watermark signal prior to correlation computation.

The metric evaluation can be performed as a multi-step process to reduce computations. For example, for a watermark signal containing both a calibration signal and a payload signal, the first metric would be a correlation between the re-sampled and filtered imagery for the specified pose state, and the calibration signal. If this correlation is below a certain threshold, then this particular pose state can be discarded. If the correlation exceeds the threshold, a further evaluation is performed by correlation with the known components of the watermark payload signal. If the correlation with the known payload signal components is below a certain threshold, then the pose state can be discarded. If the correlation with the known payload signal components exceeds the threshold, then further processing such as error correction decoding and error detection are performed.

In some cases, the true pose may lie between the evaluated pose states. In such cases, the metrics from adjacent pose state evaluations would indicate a cluster of higher correlations. These clusters will then be chosen for further finer pose state analysis, as detailed above.

The number of initial pose states can be reduced by introducing certain symmetries/redundancies in the watermark signals. For example, the watermark payload signal can be designed to repeat every 32×32 pixels instead of every 128×128 pixels. This reduces the number of translation possibilities from 16384 to 1024. Symmetries can be introduced in the watermark calibration signal (or the watermark payload signal) such that the signal is 90 degree symmetric. This would reduce the number of rotation states by a factor of 4.

In a variant arrangement, one of the pose-estimation techniques detailed above is first applied to the input image data. For example, the scale estimation technique of the ninth arrangement can be applied. In such case, the scale needn't be varied (or may be varied over only a narrow range), with the transformations of the input imagery instead varying other affine parameters (e.g., rotation, X-translation, Y-translation).

This twelfth arrangement permits the calibration signal to be omitted from the digital watermark signal. The watermark signal can instead comprise just the (typically forward-error-corrected version of the) payload data.

The detailed process can be performed quickly using the many cores on current GPU cards, such as the Nvidia Titan X. Although not currently practical for inclusion in mobile devices or point of sale terminals, such computational capabilities foreseeably will migrate into these lower tier platforms.

Thirteenth Arrangement

The foregoing arrangements generally employ a steganographic digital watermark that includes both a payload component and an explicit calibration signal component. Other forms of steganographic watermark are known that omit an explicit calibration signal component. Watermarks with such "implicit" synchronization attributes are detailed in U.S. Pat. Nos. 7,072,490, 6,625,297, 6,614,914 and 5,862,260, which are hereby incorporated by reference.

For example, a 128×128 waxel block comprising just the payload component (as detailed in the cited references, and in the section entitled "A Digression About Geometry and Sampling," above) can be scaled-down in amplitude and tiled across a host image—summed with values of the host pixels, to yield an encoded image. In decoding, the repeating payload blocks can be discerned by applying an autocorrelation operation to the encoded image, while varying parameters of scale and rotation until an output of the autocorrelation process peaks.

In such arrangements, the payload has attributes of random noise, due to XORing with a pseudo-random sequence. Yet due to its recurring, tiled nature, this random noise pattern serves as an implicit synchronization signal. The spatial periodicity of the tile indicates the scale of the watermark signal, and the orientation at which it is tiled indicates the rotation of the watermark signal.

In another prior art, the payload component is structured at a smaller scale—again aiding synchronization. One such embodiment is detailed in WIPO patent publication WO2016118816—excerpts of which are illustrated in FIGS. 45-54.

Figures 45, 46, 47, 48:
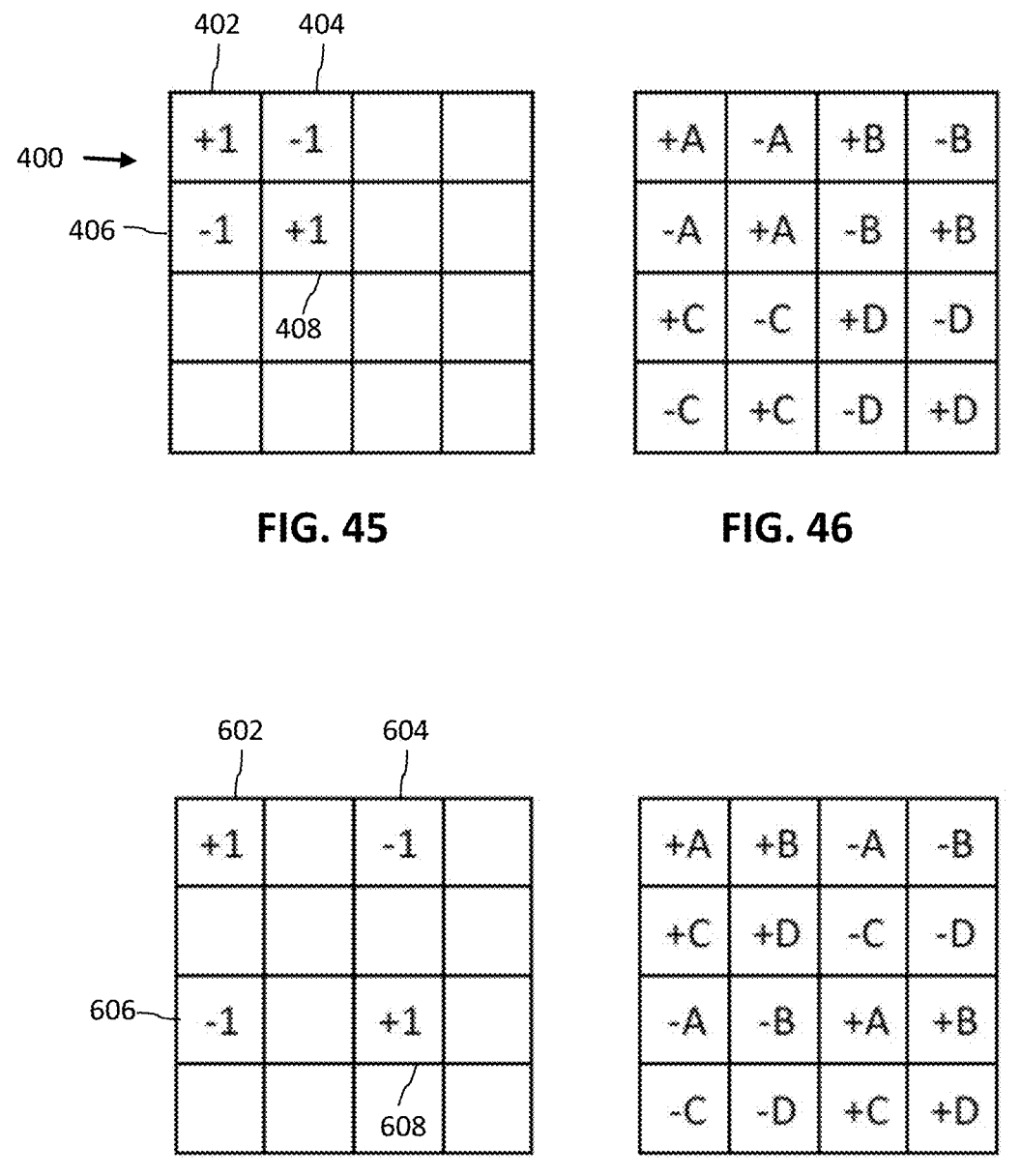

FIG. 45 illustrates a 4×4 arrangement of embedding locations in a sub-block of a tile. We refer to an embedding location, in some embodiments, as a "bit cell." See, e.g., FIGS. 41A-B in U.S. Pat. No. 5,862,260, for example. In the arrangement of FIG. 45, an auxiliary data signal element (e.g., a bit of the modulated carrier signal) is mapped to a neighboring set of 2×2 embedding locations (402, 404, 406, 408). Each bit cell in the set has a differential relationship with its horizontally and vertically adjacent neighbor, which in this case has opposite polarity (1 vs. −1). Along the diagonal, the bit cells have the same polarity.

Extending the example of FIG. 45, FIG. 46 illustrates the arrangement of 4 different data signal elements, A, B, C, D, each differentially encoded within the 4×4 arrangement of bit cells of FIG. 45. This arrangement may, of course, be expanded by repeating the same arrangement for additional data signal elements. In this particular arrangement applied to spatial domain embedding locations of a host image, mid to high frequencies are being utilized for embedding. This arrangement enables the decoder to exploit correlation of neighboring host signal values, yet may be susceptible to blurring.

FIG. 47 illustrates an example of a sparse differential encoding arrangement. Relative to FIG. 45, the embedding locations (602, 604, 606, 608) of an elementary data signal unit are spaced apart to form a signal that is more robust to blurring type distortion. The embedding locations are spaced in proximity to each other to exploit correlation of the host signal values within the area of the embedding locations.

Despite the fact that elementary data units are not mapped to adjacent embedding locations in a sparse scheme, the same data encoding capacity may still be achieved for the same area by interleaving the embedding locations of different data signal elements. FIG. 48 shows an example of interleaved data elements using the sparse differential encoding scheme of FIG. 47.

Structured patterns of payload bits, of the sort shown in FIGS. 45-48, have benefits that aid synchronization. In particular, their predetermined, fixed pattern forms an implicit synchronization signal.

Consider the sparse differential pattern of FIG. 49. The letter "a" corresponds to a data signal element of the auxiliary signal being encoded. Relative to the pattern of FIG. 47, the pattern of FIG. 49 is larger, expanding encoding of data element "a" to an arrangement of 8 predetermined embedding locations over a 4×4 region. We chose this structure to provide a more unique and recognizable pattern.

FIG. 50 depicts the sparse pattern of FIG. 49, extended to show additional data signal elements mapped to predetermined embedding locations. In the case where a data signal element corresponds to one message symbol or bit, for example, FIG. 50 illustrates the mapping of 8 bits into a 5×8 region of embedding locations. This pattern uses all available embedding locations by interleaving the embedding locations assigned to different message symbols.

Figure 51:
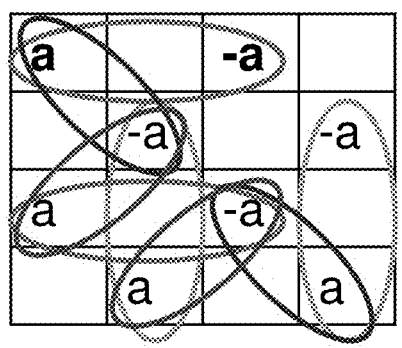
FIG. 51 illustrates that there are 8 differential relationships for the data signal element "a" in the arrangement of FIG. 49.

To exploit the differential arrangement of the pattern, the decoder can employ a filter adapted to extract an estimate of a data element from the differential relationships of the pattern. The filter increases the signal to noise ratio of the data signal relative to noise by leveraging the differential relationship among the signals encoding each data element. FIG. 51 illustrates that there are 8 differential relationships for the data signal element "a" in this arrangement. The filter employs 8 comparisons to predict or reconstruct an estimate of the data signal. This filter may be employed both in the synchronization process as well as the data extraction process. The shape of the filter corresponds to the area from which it samples signal values and the positional relationship of the embedding locations that it evaluates to leverage the differential relationships. For example, the filter may be designed to combine comparisons of the signal values in the differential pairs to reduce host content and increase the data signal.

Figures 55, 56:
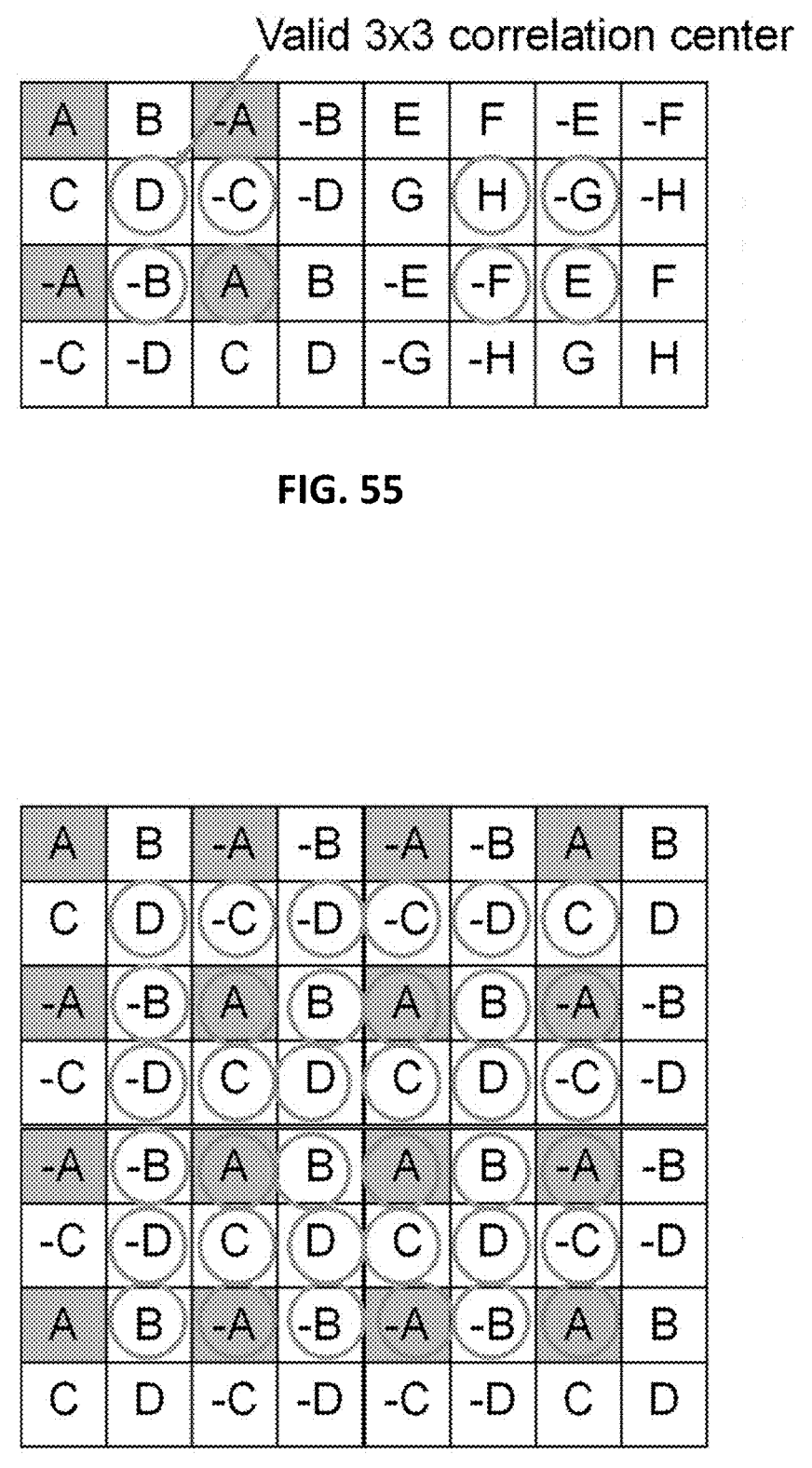

Additional examples of structured bit arrangements are shown in FIGS. 55 and 56. We sometimes refer to repetition of a bit cell pattern as "tiling," as it connotes repetition of elemental blocks adjacent to each other along at least one dimension in a coordinate system of an embedding domain. The benefits of tiling are manifested in at least a couple of ways. As indicated, one benefit is that the repetition of a bit cell pattern creates an implicit structure that may be detected using various prior art pattern detection methods. For example, the structure may form a template in a Fourier domain, autocorrelation domain, or some other transform domain. Another benefit is that repetition can increase the efficiency of correlation detectors, which is detailed in the following review.

The left side of FIG. 55 illustrates two 4×4 tiles, side by side, each encoding 4 message elements. The first 4×4 tile encodes message elements, A, B, C and D. The second 4×4 tile encodes message elements E, F, G, and H. Both 4 by 4 tiles employ the differential scheme of FIG. 48.

To exploit the differential encoding for host suppression, the image can be processed with a filter that compares differentially encoded bit cells for each message element. WO2016118816 teaches that such a filter can be employed for detection, synchronization and message extraction operations. The filter operation may be implemented by convolving a signal having pattern of the upper left 3×3 bit cells of FIG. 47 with the suspect signal, after it is transformed into the embedding domain. This filter may be depicted as:

$$\begin{bmatrix} 1 & 0 & -1 \\ 0 & 0 & 0 \\ -1 & 0 & 1 \end{bmatrix}$$

Assuming for the sake of illustration that the decoder is aligned with the data signal, the process of convolving this filter with this signal will yield valid correlations when the 3×3 filter center is located at the circled locations within the two tiles of FIG. 55. A valid correlation is where the 3 by 3 filter pattern coincides with the location of a 3 by 3 pattern of bit cells for a data element (A, B, C, or D within the left tile, and E, F, G, or H within the right tile). When the filter is located at the bit cells at the boundary of each 4×4 tile, it samples different message elements, yielding an invalid correlation. Thus, in the arrangement of FIG. 55, there are 4 of 16 embedding locations with valid correlations per tile. The output of such a filter provides a detection metric (e.g., a measure of correlation) that may be aggregated across tiles to facilitate detection and synchronization, and across locations of message elements, to aggregate evidence of the value of each message element.

FIG. 56 is similar to FIG. 55, except that 4 message elements, A, B, C and D, are repeated over an 8 by 8 tile. The repetition of each element in FIG. 56 has doubled relative to FIG. 55. This doubling increases robustness and discrimination, yet reduces data capacity. When convolved with the same 3 by 3 filter, there are 36 of 64 embedding locations with valid correlations.

The non-correlating tile boundaries can be used for synchronization based on the formation of a grid of low correlation lines. This grid of lines forms a template that may be used to determine alignment of the tiles using pattern detection methods described in WO2016118816.

Before decoding can proceed, the system must know how the patterning has been spatially transformed, so that it can be restored to the spatial configuration for which the decoding filter was designed. WO2016118816 explains that this transformation can be discerned in various ways, including by autocorrelation, and by reference to the spectrum of the distinctive bit patterning.

Figure 52:
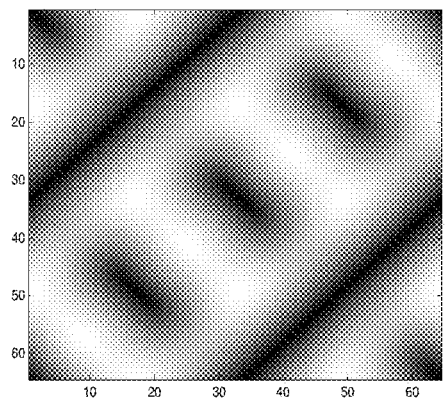
FIG. 52 illustrates the signal spectrum of the signal arrangement of FIGS. 49-50.
Figure 53:
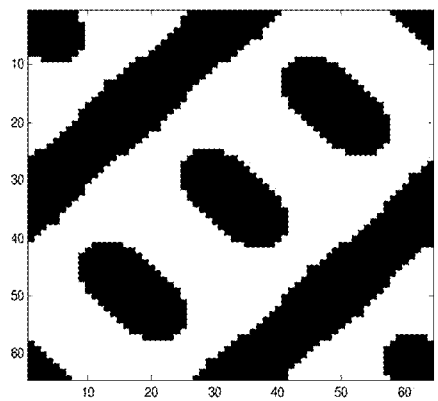
FIG. 53 depicts a threshold operation on the signal spectrum.
Figure 54:
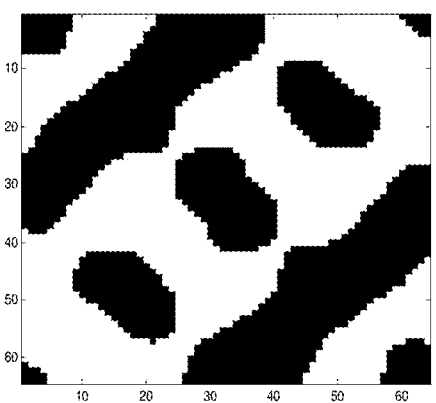
FIG. 54 shows the spectrum of the arrangement of FIGS. 52-53 after embedding.

FIG. 52 illustrates the signal spectrum of the signal arrangement of FIGS. 49-50. FIG. 53 depicts a threshold operation on the signal spectrum, and FIG. 54 shows the spectrum after embedding. These figures show that the spectrum has a structure that a detector can discriminate, facilitating synchronization using various detection schemes.

In accordance with an aspect of the present technology, the methods of the earlier-described arrangements are applied to an obtain estimate of pose. From such initial estimate, successive refinements can be iteratively applied to yield more precise estimates of geometric state.

For example, if a watermark employing the sparse differential modulation pattern of FIG. 48 has been encoded in an image, the pose parameters are estimated by one of the foregoing arrangements, and the image is then transformed to counteract these parameters—restoring the image to an estimate of its original geometric state. A kernel like that shown in FIG. 47 is then convolved with the transformed image. The local variance of the resulting data indicates the accuracy of the scale/rotation estimates. The scale estimate can be adjusted slightly by a positive increment (e.g., 1%), and the convolution process repeated with a newly-transformed image. If the local variance increases, the positive adjustment was in the correct direction, and is retained; if the variance decreases, the adjustment was in the wrong direction. An adjustment to scale in the negative direction is then made, and the process is repeated—usually resulting in an increase in variance.

A second phase of the process is then performed, this time adjusting the rotation estimate by a positive increment, such as 1°. Again, if a positive rotation adjustment increases the local variance, the adjustment is in the correct direction; if not, a corresponding adjustment in the negative direction is made.

This process continues, successively refining the pose parameters until an adjustment in the positive direction reduces the variance, and so does an adjustment in the negative direction. This indicates the refinement of the pose parameter is converging on its correct value. Refinement of the parameter can then continue with smaller increments (e.g., 0.1% of scale, and 0.1° of rotation). When the parameters have converged to a suitably granular residual error, the transformed image is processed to discern the encoded digital watermark payload, e.g., by correlation with a decoding filter.

It may here be helpful to review with a thought experiment. If an input image has no watermark present, then the non-linear filtering operation discussed above, e.g., oct-axis, will attenuate the host image and tend to leave just the unstructured high frequency noise that is present in all natural signals. Sampling such noise with multiple sampling constellations will consequently yield L-tuples that are similarly, essentially, noise strings. When these noise L-tuples are used to index a data structure to obtain previously-stored pose information data, the indexed results will similarly be chaotic and not evidence any clustering. No insight into pose will result.

In contrast, if the input image has a watermark present, and the watermark includes a periodic, recurring or predetermined aspect to its signal, then such nature of the signal will be manifested in the results of the non-linear filtering operation. Sampling the filtered data with sampling constellations will similarly yield L-tuples influenced by this distinctive signal attribute. The indexed selections from the data structure will thus not be random. Rather, they will tend to correspond to groupings of pose information data that were previously collected from watermarked data having pose states similar to the input image. In the aggregate, even a slight bias of these statistics towards the input image's pose state, will be boosted into prominence by the number of L-tuples processed. Information about the input image's pose state is thereby discerned.

It should thus be recognized that principles of the present technology are applicable to the above-described and other forms of digital watermarks that include a periodic, recurring or predetermined attribute, even if an explicit calibration signal, per se, is lacking. (Of course, the less watermark signal energy present in the embedded image, the more information must be collected to discern the watermark signal's presence, and to estimate information about the signal—such as its pose and/or its payload. But this simply goes to the amount of data needing to be processed.)

Fourteenth Arrangement

The fourteenth arrangement generally concerns application of machine learning principles to address the computational complexity and time constraint problems of the prior art.

One such machine learning arrangement employs a support vector machine (SVM) to distinguish two classes of imagery: watermarked and not. In one illustrative embodiment, a corpus of watermarked image excerpts is processed according to the second phase of the ninth arrangement, and the sets of 12 accumulated histograms produced for each excerpt are provided to the SVM as training data—exemplifying the watermarked case. The process is repeated with a corpus of unwatermarked image excerpts. Again, these excerpts are processed according to the ninth arrangement, and the resulting sets of 12 accumulated histograms are provided to the SVM as additional training data—exemplifying the unwatermarked case. The SVM then determines a multi-dimensional hyperplane that serves to divide the space defined by a set of 12 accumulated histograms into two regions—one for sets corresponding to watermarked image excerpts, and the other for sets corresponding to unwatermarked image excerpts.

The histograms used for training may be in compressed form (e.g., as Fourier or Chebyschev coefficients) or may be in uncompressed form—as simple bin counts for each of the tallied scale states.

In use, the 12 accumulated histograms (in compressed or uncompressed form) derived from a query image are provided to the SVM, which classifies that set of histograms as falling on either the watermarked or unwatermarked side of the earlier-determined hyperplane. For watermarked image excerpts, the distance from the dividing hyperplane can be reported by the SVM, and employed as a figure of merit by which multiple watermark-conveying blocks in an image frame may be ranked.

In such an SVM-based embodiment, determination of scale can proceed as in the ninth arrangement, e.g., based on the consensus scale state indicated by the 12 accumulated histograms.

Another machine learning approach uses a convolutional neural network (CNN).

Figure 44A:
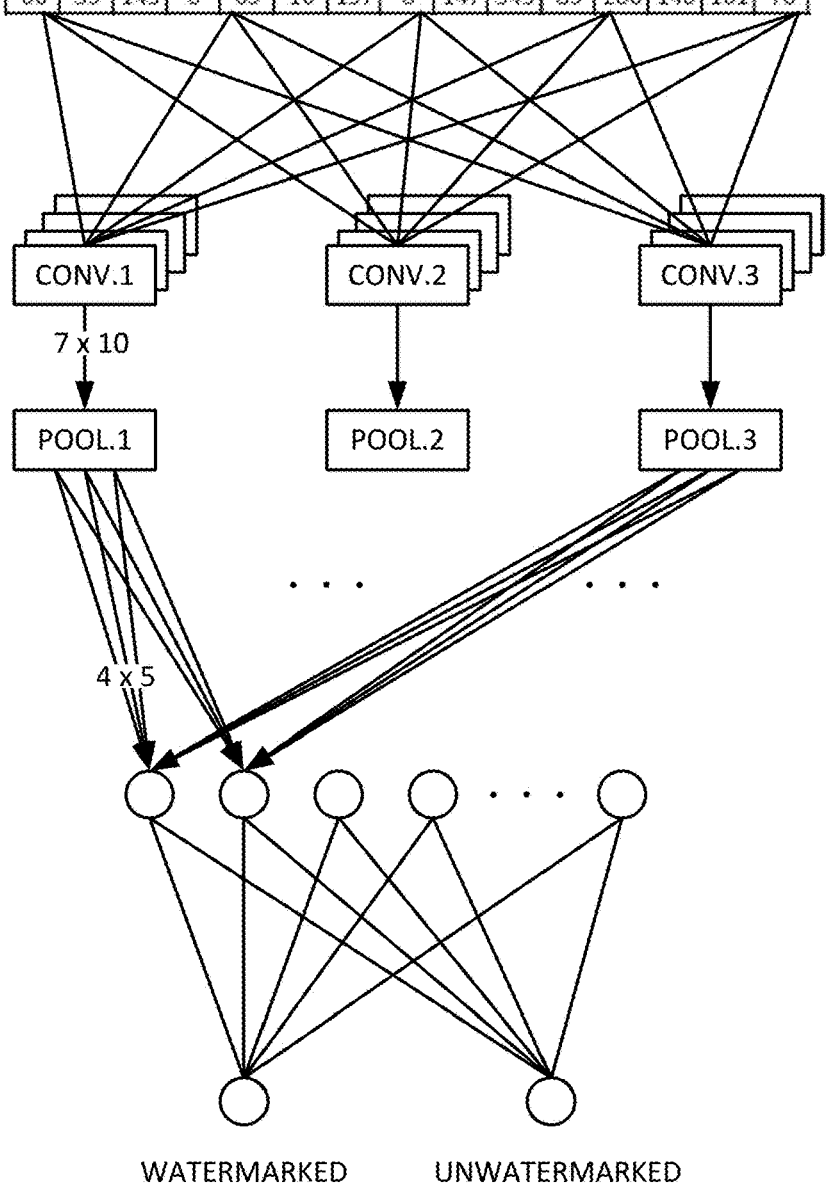
FIGS. 44A and 44B depict neural network embodiments.

Referring to FIG. 44A, the input to the CNN can be uncompressed data from the 12 accumulated histograms. If each has 15 bins, a 12×15 array of data results.

Three convolution stages apply respective convolution functions to 5×5 neighborhoods of the input data, with a stride of 1. Each of the three convolution stages thus yields a reduced volume of output data: 7×10.

Max pooling functions are then applied to the outputs of the convolution stages, determining the maximum value in each 2×2 neighborhood (with a stride of 2). Three different pooled data, each comprising a 4×5 element array, result.

A further layer of plural (N) artificial neurons is employed, each of which is fully connected to the pooling layers above (i.e., 60 inputs). For each neuron, a set of weighting coefficients is applied to the 60 inputs to produce its respective output. (The number of neurons is determined empirically, by trying different values, e.g., 5, 15, 50, and trial-training each, to determine if suitable performance is achieved.)

A final output layer consists of just two artificial neurons. Again, each is fully connected to the N neurons above, with weights to determine its respective output data. One neuron activates to indicate that the input data corresponds to a watermarked image excerpt; the other neuron activates to indicate that the input data corresponds to an unwatermarked image excerpt.

The coefficients of the three convolution filters, and the weights associated with each of the neurons, are learned by application of labeled training data (i.e., watermarked and unwatermarked image excerpts) to the CNN. A stochastic gradient descent backpropagation training method is used—iteratively perturbing these variables until they converge on values that yield the desired binary classification behavior (i.e., the output neurons correctly indicating watermarked/unwatermarked).

The foregoing methods are advantageous because they allow a large number of image blocks to quickly and simply be assessed for the presence of a watermark signal. Watermark decoding can then be instituted only for the blocks determined to have such a signal, making best use of limited processing and time resources.

In a variant embodiment, the CNN does more than indicate whether the input histograms indicate a watermarked image excerpt; the CNN also indicates the scale of the image excerpt.

A variant of the FIG. 44A architecture adds a further layer of convolution and pooling stages following the depicted layer (and before the fully-connected neurons). The number of neurons N is increases—and a further, smaller layer of intermediate, fully-connected neurons is interposed between the depicted layer and the output layer. The number of output neurons is increased, e.g., to 16. As before, there will be one neuron to indicate unwatermarked imagery. But there will be 15 other output neurons that activate in the case of watermarked imagery—one for each of 15 different scale states, e.g., 67.5%-72.5%, 72.5%-77.5%, etc. (As before, the CNN is then trained on reference data—here including labeled exemplars of image excerpts at the specified scale states.)

In other variant embodiments, the input to the CNN is not accumulated histograms, but rather each individual histogram accessed by an L-tuple, together with an identification of the sampling constellation with which it is associated. If 12 sampling constellations are used, and a 64×64 patch of imagery is processed to yield 1600 16-tuples for each constellation, then a data array comprising 19,200 histograms is presented as input to the CNN.

In still other variant embodiments, the histogram reference data is omitted. Instead, L-tuples themselves are provided as input to the CNN (e.g., 19,200 L-tuples, each concatenated with an identifier of the constellation by which it was derived).

In these variant embodiments, the network is trained by presentation of reference histogram (or L-tuple) and constellation input data, each labeled as to whether it corresponds to a watermarked or unwatermarked image excerpt (and, optionally, its respective pose parameters).

Figure 44B:
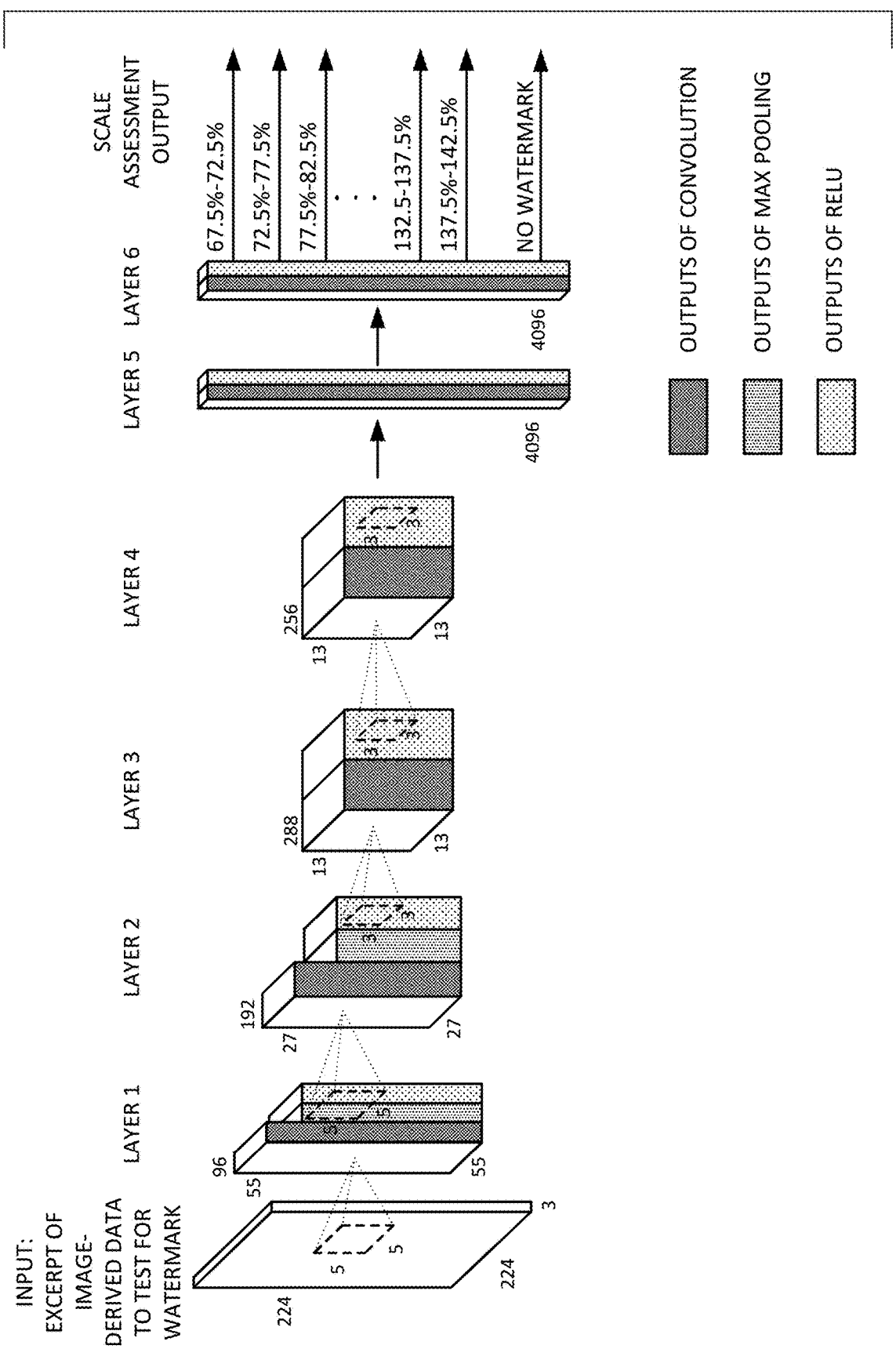

FIG. 44B shows an arrangement that follows the popular AlexNet architecture of Krizhevsky, et al, ImageNet Classification with Deep Convolutional Neural Networks, Advances in Neural Information Processing Systems, pp. 1097-1105, 2012. The input data is three planes of image-derived data, which can be image data per se, or any of the derivatives (e.g., oct-axis data, L-tuple data, histogram data, etc.) referenced herein.

If image data per se is applied, it may be pre-filtered to attenuate the underlying host imagery. The host imagery is a noise source, as far as recovery of the embedded watermark data is concerned. Its attenuation allows the watermark payload to be recovered more accurately, and at lower signal levels, than would be the case when the host imagery is un-attenuated.

Such pre-filtering can be tailored in accordance with the particular watermark signal structure being processed. For example, if the watermark signal has an explicit calibration signal, the earlier-described oct-axis filter may be used. Other high-pass filters, such as Wiener filters, can alternatively be applied. If the watermark signal has an implicit calibration signal—such as the sparse differential signal of FIGS. 47-56, then a differential signal filter kernel, tailored to the sparse pattern, can be employed.

Such pre-filtering can also be tailored in accordance based on the image type. The image type can be sensed by a classifier (e.g., text, label artwork, natural scenes), or the usage context may indicate the type of imagery that is expected to be encountered. For instance, in the context of a supermarket, where imagery is processed by a point of sale scanner (or by a consumer smartphone application), the imagery is most likely to be label artwork (e.g., product labels and shelf tags), or text (e.g., product ingredient lists and coupons) and less likely to be natural scenes (e.g., trees, grass and landscapes).

Traditional image classifiers operate by detecting the presence of image attributes indicative of particular image types (and often detecting the absence of image attributes indicating other image types). For example, text in a patch of imagery can be indicated by high contrast and many parallel paired edges, but without high local variance away from those edges. Label artwork can be indicated by relatively large expanses of nearly uniform luminance and/or chrominance, without commensurately large expanses of high local variance. Shelf tags (labels) typically have very little variance—commonly comprising just black text on floods of background color. Their rectangular shape also aids in their classification.

Newer image classifiers often employ machine learning principles, such as the prior art neural networks identified herein. Such a network can trained with a large corpus of reference images of various types, each labeled as to its type. After training, a new image is presented to the network, and output data produced by the network indicates the type class to which it most likely belongs.

If input imagery is identified as belonging to a text class, a filter associated with that class can be applied. Such a filter can be optimized to attenuate the text components of the imagery, so that other components (e.g., a watermark signal) increase in relative prominence, with a corresponding increase in signal-to-noise ratio. Text can be identified in an image by the stroke width transform algorithm (see, e.g., Epshtein et al, Detecting Text in Natural Scenes with Stroke Width Transform, 2010 IEEE Conf. on Computer Vision and Pattern Recognition, pp. 2963-2970) or by the Maximally Stable Extremal Regions algorithm (see, e.g., Chen, et al, Robust Text Detection in Natural Images with Edge-Enhanced Maximally Stable Extremal Regions, 18$^{th}$ IEEE Int'l Conf. on Image Processing, 2011, pp. 2609-2612). The text regions identified by such algorithms can be dilated slightly (e.g., 1 pixel) and then painted with pixel values equal to a weighted average of four pixels—two on each side of the stroke, in directions tangent to the two bounding stroke contours.

Alternatively, if input imagery is identified as belonging to a text class, the text can be left in the image, and a trained variant of a non-linear filter can be applied to mitigate the effects of the text on watermark decoding. A standard oct-axis filter as described above can be used as a starting point, as a convolution kernel in the first layer. The network can then be trained with exemplary batches of text imagery, both with and without watermarks. The loss function, which drives the training process (through backpropagation) indicates how imperfectly watermarked vs. unwatermarked images are distinguished at the output of the network, and drives adjustment of the filter parameters to minimize the loss function. Through successive batches of training images, the standard oct-axis filter kernel parameters are adjusted so as to yield the best type separation, in the presence of the text interference. (A different embodiment may start with a differential signal filter kernel, tailored to the expected sparse pattern.)

In a preferred embodiment, optimization of the filter parameters involves a transformation of the filtered image data into the frequency domain, and evaluation of the transformed data for detectability of the explicit calibration component of the watermark signal.

Figure 57:
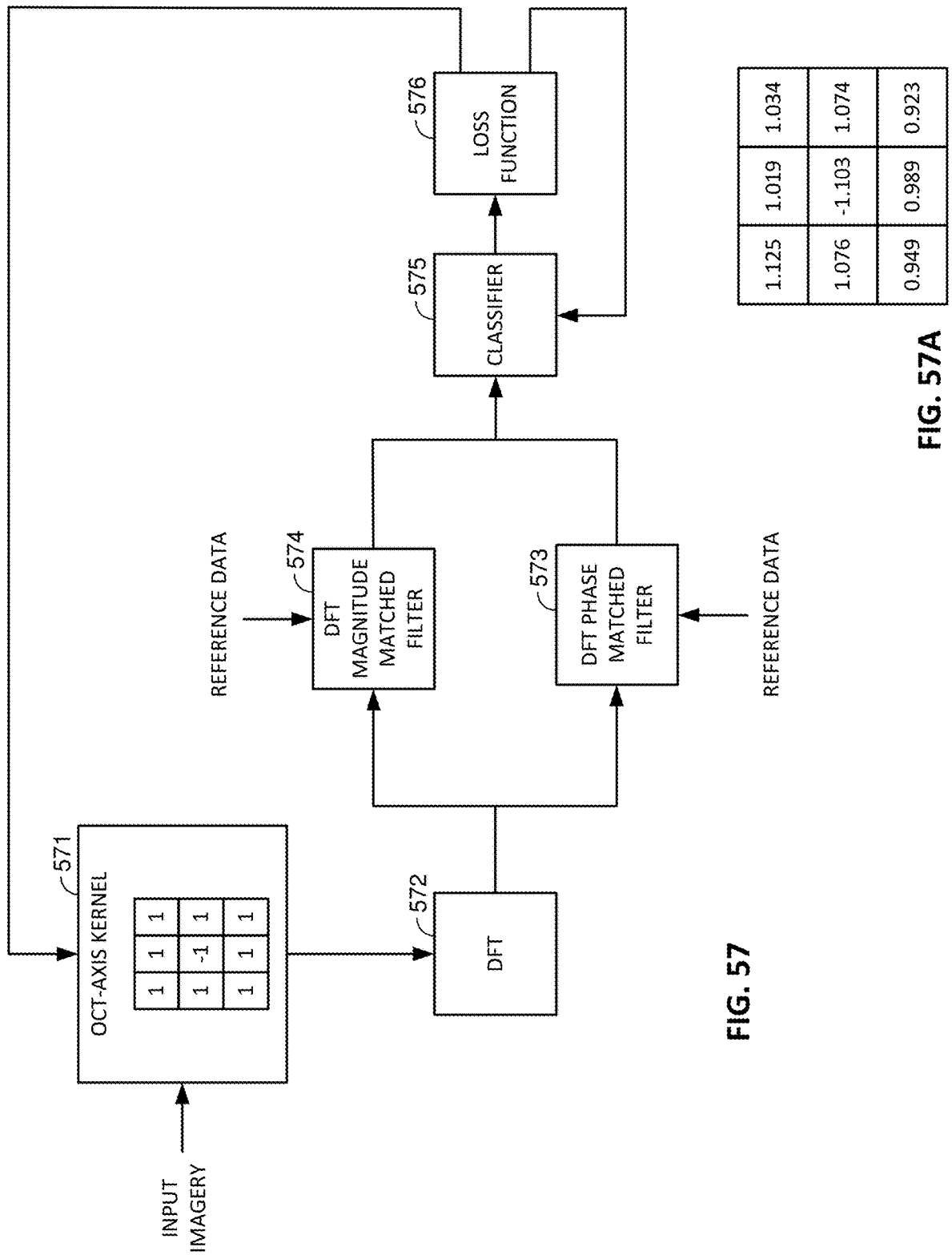
FIG. 57 shows how a filter kernel can be trained to optimize quality of a watermark detected from imagery.
Figure 58:
FIG. 58 illustrates an overt tiled signal, to which aspects of the present technology can be applied.

FIG. 57 illustrates such a system, and can be seen to replicate many of the elements familiar from watermark decoding systems disclosed in the incorporated-by-reference patent documents, such as U.S. Pat. No. 6,590,996, so its description is abbreviated accordingly.

An image excerpt is applied to an oct-axis filtering module 571, which initially applies the depicted filtering kernel to each of the non-edge pixels in the excerpt. The filtered image is passed to a DFT module 572, which computes a discrete Fourier transform on the filtered data set, yielding frequency domain data. In this Fourier spatial-frequency domain, the spatial-frequency impulse signals comprising the calibration component of the watermark signal become evident.

Modules 573 and 574 separately compare the phase and magnitude parts of the DFT output with reference data about the known calibration component of the watermark signal. The degrees of correspondence between the phase and magnitude components of the input signal, and those of the known reference signals, respectively, are indicated by the magnitudes of output data produced by these modules, and serve as two metrics for the quality of watermark detectability in the input imagery. (These metrics are the results of correlation operations between the phase/magnitude data, and their reference counterparts, and are expressed as floating point numbers in the range 0.0-1.0.)

Data output from modules 573 and 574 are applied to a classifier 575, which makes a determination—based on the two watermark quality metrics—whether a watermark is actually present in the input imagery. This classifier is a perceptron arrangement with two output neurons—one indicating watermarked imagery (neuron #1), and the other indicating unwatermarked imagery (neuron #2). A SoftMax output stage is employed, so that the summed value of the two output neurons always equals 1.0.

Ideally, a watermarked input image should force the output of neuron #1 to a value of 1.0, and should reciprocally force the output of neuron #2 to a value of 0.0. And conversely for an unwatermarked image.

In practice, a watermarked image may initially drive the output of neuron #1 to a value of 0.85. The difference between this value, and the ideal value of 1.0, is an error signal, which serves as a loss function for reverse-gradient backpropagation training.

A batch of a thousand training text images, both watermarked and unwatermarked, are applied to the system. Each training image is 128×128 pixels in size, and the watermarked images are encoded with a watermark tile at 100% scale and zero rotation. For each training image, a corresponding loss function is determined. After the batch has been processed, backpropagation is applied, using the ensemble of training images and associated loss functions, to determine an adjustment for each of the nine parameters in the filter kernel 571. (An adjustment is similarly determined and applied for the parameters used by the two neurons in the classifier 575 in weighting the inputs received from the DFT phase and magnitude matched filters.) After such adjustments are made, the process is repeated, with a further batch of a thousand training text images, and with further adjustments to the parameters. Training continues in this iterative fashion until improvements in the loss function, between successive training batches, levels-off (typically 10 or 20 such batches). The thus-trained filter yields filtered text data in which the watermarked/unwatermarked states can most clearly be distinguished. This oct-axis filter kernel is then applied to input imagery that is classified as a text image.

In actual practice, the oct-axis kernel 571 of FIG. 57 is trained in eight parts, each a 3×3 filter, with a −1 initially in the center, and a +1 in each other direction, with zeros elsewhere. Each is then followed by a signum-like function. (Gradient-based training cannot be used with a signum function per se, e.g., due to the discontinuity at zero, and the fact that the function value is unchanging for all positive numbers. In a particular embodiment, signum(x) is replaced by tan h(A*x). For high values of A, tan h(A*x) behaves like signum while still keeping information about gradients.)

FIG. 57A shows an illustrative kernel that may result from the foregoing optimization process. It will be noted that the parameters are no longer integers, and the symmetry (around the vertical axis, the horizontal axis, and each of the diagonal axes) that was present in the original kernel, is now lacking. (Optimized kernels do not always have these attributes, but they often do.) The opposite sign of the center pixel parameter, relative to the surrounding pixel parameters, typically persists through the optimization procedure, from the initial kernel to the optimized kernel.

In some embodiments, the filter parameters are constrained in some fashion throughout the training. For example, the center pixel parameter may be constrained to have a value one-eighth that of the negative sum of the non-center-pixel parameters. Or symmetry across one or more of the noted axes may be enforced as a constraint. Or the four corner parameters may be constrained to have equal values. Etc. Appropriate adjustments are made to the training regimen to implement such constraints.

The just-described arrangement can be trained with images bearing watermarks including an explicit calibration signal and a message signal, or just one or the other. Such arrangement can also be trained with images bearing watermarks having only implicit calibration signals, such as the sparse differential signal of FIGS. 48-56. In this case, the starting point will be the filter configuration that theoretically corresponds to the modulation arrangement (e.g., the filter kernel of FIG. 47). The loss function to be optimized in this instance may be derived by arrangements other than that shown by elements 572-576 described above. For example, a bit error rate of the decoded watermark signal can be used as a loss function. (Such arrangement can likewise be used with watermarks having explicit calibration signals.)

While FIG. 57 illustrates a single filter kernel, in other embodiments there may be several filter kernels—each of which is trained by the described procedure. For example, the input imagery may be color, with different data for red, green and blue channels. If the image is watermarked in the luminance domain, then all three channels convey the modulation comprising the watermark. However, the different channels typically have different noise characteristics. As a consequence, it can be advantageous to use different filter kernels for the different channels. (The separately-filtered RGB data planes can be combined after filtering, in a weighted fashion with weights of 0.2989, 0.5870, 0.1140, respectively, to yield greyscale imagery that is applied to the DFT module 572.) In such an arrangement, 27 filter parameters are adjusted through the backpropagation process, instead of the nine noted above.

In other arrangements, two or more convolution kernels are applied in a cascaded fashion to the input imagery, with a first kernel operating on the input imagery, a second kernel operating on filtered data produced by the first kernel, etc. The kernels may be of the same size, or different sizes. Such cascaded arrangements allow for more complex filtering transformations, which can be helpful in discriminating the very low amplitude signals inherent in watermark decoding, from interfering noise. Again, the FIG. 57 arrangement can be used, but this time training 18, etc., filter kernel parameters instead of the nine shown.

While the foregoing discussion has focused on imagery classified as text imagery, other filter kernels can similarly be optimized for imagery classified otherwise, such as greyscale text imagery, color text imagery, dark imagery, product label artwork, shelf labels, natural imagery, etc. After such training, a classifier can analyze incoming imagery to determine its type, and one or more correspondingly-optimized filter kernels can then be applied to filter the imagery prior to watermark extraction.

In other arrangements, classification of the imagery is implicit, based on context—such as location. Thus, if a smartphone watermark detector is used at a geolocation known (by various data services, such as Google Maps) to be a supermarket, then an image filter previously-optimized for product label and/or shelf label artwork may be applied. If the smartphone is used at a different location, then an image filter previously-optimized for a different context-associated image type is applied.

Some watermarks in color imagery are not encoded in all color channels (so-called "luminance" watermarks) but are instead encoded in just one or two of the channels (so-called "chrominance" watermarks). In some such arrangements, opposite watermark tweaks are made in two complementary color channels. When the two channels are subtracted, the watermark signals additively combine, effecting a doubling of the watermark signal. Such chrominance watermarking arrangements are detailed in our patent publications 6,912,295 and 8,199,969. Thus, optimization can include establishing, and then selecting, different weightings among the available color planes, in filtering prior to watermark extraction—again based on determined or inferred information about image type.

If information is available about the type of watermark, e.g., indicating the color channel(s) in which watermark signal are embedded, and the calibration signal that is present—if any, etc., then filters designed—and possibly trained, for such form of embedding can be employed. If information about the type of watermark is not known in advance, then plural filters may be employed, and each of the resulting filtered signals can be assessed for the presence (and optionally pose state) of a watermark. The filtered data that yields the strongest indicated presence of a watermark signal can then be further processed accordingly, for decoding.

Most of the foregoing discussion has assumed that the data provided as input data to the neural network is image data, per se. In such cases, one or more of the above-noted filtering operations can be performed at the input to the neural network. The filtering can be implemented in a module distinct from the neural network, or it can comprise a first stage of the neural network. In the latter case, the filtering stage, once defined in the network, may be fixed, and not be subject to further adjustment in training of the network. Alternatively, the initial filter parameters may serve as starting points, which may be adjusted (or further-adjusted, in the case of a previously-trained filter) by training of the network.

If a neural network is provided with L-tuples, histograms, or other derivatives of image data, then the pre-filtering is typically applied to the image data before such derivatives are generated.

It will be recognized that, in some embodiments, plural neural networks may be employed. E.g., one to classify the image type, and another to determine its watermark status and optionally its pose state. In other arrangements, a filter designed through machine learned-iteration (e.g., the above-described filter adapted to optimize watermark detection in the presence of text) can be employed apart from a neural network.

In the network of FIG. 44B, there are four convolutional layers and two fully-connected layers. The first two convolutional layers operate on 5×5 pixel blocks; the latter two operate on 3×3 pixel blocks. Of course, these layers can be configured otherwise, e.g., with 8×8 blocks processed in the first stage (per the signal block of FIG. 56), or with all using the same size of convolution kernel, or with all using different sizes of convolution kernel, or with some layers comprising Inception layers. Inception layers apply several different convolutions, of different sizes, to input data, and concatenate the results for processing by the next layer. Such architecture provides a variety of data to the next layer, usually with no increase (and sometimes a decrease) in parameter count.

Another architecture includes one or more layers defining convolutional kernels that are sized, and/or rotated in anticipation of different pose states. When used with watermarks employing the sparse differential patterns of FIGS. 47-56, the kernels can be parameterized to correspond to be the polarities and placements of the differential signal data (e.g., the +A, −A, +A, −A of FIG. 48). If one of these scaled/rotated kernels, when applied to input data, yields an output that is larger than the other kernels, by a margin that is statistically improbable, this indicates that the input imagery is presented at a scale and rotation state to which that kernel was especially adapted. Later stages can then apply similar principles to further refine this discerned scale and rotation state.

There are a variety of network CNN architectures that can be used in particular embodiments, including GoogLeNet (Szegedy, et al, Going Deeper with Convolutions, Proc. IEEE Conference on Computer Vision and Pattern Recognition, pp. 1-9, 2015; see also patent publication US20160063359); Inception (Szegedy, Rethinking the Inception Architecture for Computer Vision, arXiv preprint 1512:00567, 2015); ResNet (He, et al, Deep Residual Learning for Image Recognition, arXiv preprint 1512.03385, 2015); and YOLO (Redmon, et al, You Only Look Once: Unified, Real-Time Object Detection, Proc. IEEE Conf. on Computer Vision and Pattern Recognition, pp. 779-788, 2016).

In one illustrative embodiment, the input data to a CNN is an original excerpt from red/green/blue imagery, e.g., 224×224 pixels. The first convolutional layer of the network may be pre-configured to effect an oct-axis operation on each color plane, or on a weighted aggregation of two or three of the color planes. Training proceeds with patches of labeled reference imagery, indicating their watermark status (watermarked or not) and, in the former case, parameters of the image's geometric state (pose). The convolution parameters and the output layer weights are then trained using reverse gradient descent backpropagation methods so that the output data indicates the labels of the reference input patches. (In a particular embodiment, the network employs a SoftMax output, in which each output neuron produces an output datum in the range of 0-1.0, and the outputs—collectively summed—total 1.0. The outputs can each be compared against a threshold value, e.g., 0.9, or 0.97, to determine which output—if any—confidently indicates a pose state.)

The network can be trained with several thousands, or millions, of watermarked and unwatermarked images. The watermarked images are presented at myriad different pose states—which serve as label data. After each set of training images, backpropagation is employed to adjust parameters of the convolution layers and/or weights of the output layers. With each further set of training images, the errors reduce, until the training process reaches a point of diminishing returns.

The network of FIG. 44B is trained to activate one of its outputs, indicating either that the input is not watermarked, or that it is—and the estimated scale state. Such a network can be paired with one or more other such networks that operate similarly, but trained to estimate other pose parameters (rotation state, x-translation, y-translation, etc.). Alternatively a larger network may have many more outputs, indicating different combinations of pose parameters, e.g., scale in the range 67.5%-72.5% and rotation in the range 1°-3,° etc.

In a variant arrangement, a neural network has plural outputs corresponding to different pose states, but no output signaling an unwatermarked signal. Existence of an unwatermarked signal is instead indicated by ambiguous values of the existing outputs, i.e., none exceeding the threshold value of 0.9, or 0.97.

The artisan is presumed to be familiar with machine learning techniques generally, and SVMs and CNNs, and methods for their training, in particular. Related Wikipedia articles, for Machine Learning, Support Vector Machine, Convolutional Neural Network, and Gradient Descent, are attached at the end of incorporated-by-reference priority application 62/379,578 and form part of this specification. CNN technology is further discussed above in connection with earlier arrangements.

CONCLUDING REMARKS

It will be recognized that certain of the above-described arrangements enable image data, captured from an object by a camera with an arbitrary viewpoint, to be excerpted, processed trivially, and used to access data from a reference data structure. This data indicates the presence of a recognized signal, and can indicate the camera-object pose. Some embodiments similarly decode a watermark's payload. That's it. No iteration. No FFT or other complex operations. The only "cost," so to speak, is a store of reference data (or a store of neural network parameters and weights).

Having described and illustrated the technology with reference to illustrative arrangements, it will be recognized that the technology is not so-limited.

For example, instead of using the pose information determined by the present arrangements to decode steganographically-encoded digital watermark data, the information can be put to other uses. For example, it can serve to generate a 3D model of an imaged object—by determining poses of patches across its surface. It can similarly be used for photogrammetry—making measurements from captured image data. Distance is one such measurement. Distance can be directly derived from the "scale" parameter discussed above, assuming the dimension of the calibration signal block is known. Any camera can thus become a range-finding camera—provided the subject being image is properly characterized by reference data. Still further, accurate characterization of pose can be used in augmented reality—to overlay visual augmentations over a depiction of a physical scene.

Specification for an illustrative calibration signal is provided in the Appendix, below.

The repeated reference to calibration signal should not be understood as limiting the scope of the present technology. Any pattern can be used instead—steganographic or overt. FIG. 57 shows one such variant. Nor need the signal be spatially-repetitive (tiled).

Again, while the detailed arrangements focused on four pose parameters, the same principles are likewise applicable to use with more or less pose parameters, or different ranges (universes) of pose parameters. For example, two pose parameters quantifying perspective distortion, and two parameters quantifying surface curvature can additionally, or alternatively, be employed.

The procedure for non-linearly filtering the input imagery can be varied in numerous ways. For example, variants of the oct-axis procedures detailed above can again compare the value of a subject (center) pixel to the values of its eight neighbors, and sum the eight results. But comparison thresholds can be set to achieve desired percentage distributions between the different output values that are produced. For example, in an 8 bit greyscale image (i.e., having values of 0-255), if the value of the center pixel exceeds the value of a neighbor by more than 5, the oct-axis value is incremented by one. If the value of the center pixel is less than the value of its neighbor, by more than 5, the oct-axis value is decremented by one. If the values of the center pixel and the neighboring pixels are within 5 of each other, the oct-axis value is unchanged. Summing the eight values thus-produced yields an output value between −8 and 8, i.e., 17 different values. By changing the threshold comparison value (5 in this example), the statistical distribution among the 17 different output states can be changed.

The oct-axis neighborhood needn't be eight. It can be four (i.e., omitting diagonals, yielding a "criss-cross" filter), or it can be 24 (i.e., a 5×5 neighborhood, minus the center, subject, pixel location). The "oct" shouldn't be taken as requiring eight.

In similar fashion, the statistical distribution between the −1, 0 and 1 output states of an oct-axis-3 procedure can be tailored as desired. (In one exemplary embodiment, the threshold value is tuned so that about 37% of pixels in representative imagery (or Gaussian noise frames) are non-linearly filtered to result in output values of 1, another 37% result in output values of −1, and 26% result in output values of 0.)

In some watermark-decoding applications, pose-state information that is finer than that provided by one of the above-described arrangements may be required. If so, known iterative techniques can be applied to refine the pose estimate. For example, watermark payloads are typically encoded with forward error correction schemes that allows bit error rates to be determined. One parameter (e.g., X-translation) of the initial pose estimate can be perturbed by half of that parameter's quantization increment (e.g., half of 0.25 pixel), and the bit error rate checked—did it increase or decrease? Likewise with other parameters. Successive perturbations, with reference to changes in the bit error rate, allow the pose to be successively refined to an arbitrary degree of precision.

In some embodiments, noise is added to the pose information stored in the reference data structure. The reference data will be used to assess the pose of objects that have noise in addition to the calibration signal. Accordingly, it can be beneficial to include noise in the reference data.

In some such embodiments, a pseudo-random value is added to each bin count of histograms associated with each L-tuple. This value is typically small, ranging up to 10% or 20% of the average bin value, or 2%-5% of the largest bin value.

In other such arrangements, shaped noise is added, having a statistical maximum at the bin having the maximum count, and distributed symmetrically (statistically speaking) on either side—cycling back in the case of cyclical parameters: X-translation, Y-translation, and rotation (i.e., the "tail" of the statistical function goes continues from 31.75 pixels to 0 pixel in the X-translation case). A Gaussian function is an example of a shaped noise function.

The algorithms detailed above can be implemented in a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed processes on a microprocessor—such as the process of compiling reference pose data in memory—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to perform pose estimation, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed methods, e.g., for generating the reference data, or for processing input data with the reference data to determine pose or payload data, begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the calibration signal can be defined by parameters stored in a re-writable memory. By such arrangement, the same ASIC may be incorporated into two disparate devices, which employ different calibration signals. One may be a point of sale scanner for reading watermark-encoded product identifiers hidden in grocery item packaging—which looks for a calibration signal comprised of one particular constellation of spatial frequency signals. A second may be an age verification terminal (e.g., at a liquor store) for reading watermark-encoded birthdate information hidden in a driver's license—which looks for a calibration signal comprised of a second, different constellation of spatial frequency signals. The chips are all identically produced in a single semiconductor fab, but are differentiated in their end-use by different calibration signal data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored—in the design stage, prior to fabrication—to a particular intended use. Thus, an ASIP may be designed to include native instructions that serve operations associated with some or all of: oct-axis computation, approximate string searching, etc. However, such native instruction set would lack certain of the instructions available in more general purpose microprocessors.

Reconfigurable hardware and ASIP arrangements are further detailed in application Ser. No. 14/842,575, filed Sep. 1, 2015 (now published as 20170004597), the disclosure of which is incorporated herein by reference.

A preferred mobile implementation employs an Apple iPhone device, running the iOS 11 or later operating system, in which filtering and image processing operations are performed on the device GPU, using the Metal 2 API and the Vision framework, where a common memory serves both the device GPU and CPU. The machine learning aspects are implemented with Apple's Core ML framework.

The artisan is assumed to be familiar with machine learning methods. Additional information is provided in Applicant's patent applications 61/861,931, filed Aug. 2, 2013, and Ser. No. 15/149,477, filed May 9, 2016, and in published application 20150055855.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., in conjunction with associated data.

Machine learning arrangements, as identified earlier, can be implemented with software tools such as cuda-convnet, cuda-convnet2, Nvidia's cuDNN, and Google's TensorFlow. Hardware support for CNNs is now being included in various chipsets (such as the latest Qualcomm Snapdragon 820 series processors which contain Neural Processing Units (NPUs), which facilitates implementation of CNN functionality on various devices. Cadence and others are providing stock IP hardware designs (e.g., the Vision P5 and P6 DSPs) optimized for CNN applications.

MatLab code, entitled TriL10_1_rev.m (file size 8 KB), and triMe_rev.m (file size 1 KB), both dated Aug. 4, 2016, were electronically submitted as part of application 62/371,601, and can be used in both generating the reference data, and determining pose of an input image based on such reference data. In this code, N is the side dimension, in pixels, of the square calibration pattern; M is the side dimension, in pixels, of the square image patch being considered; C is the number of constellations; L is the number of locations in the constellation. The calibration signal is sometimes termed the grid, or DWM (Digital Watermark)—its particular parameters are not critical to the technology but here comprises eight impulses in the spatial frequency domain, each with a respective amplitude and phase. It is sometimes referenced as a "toddler" calibration signal (as applicant's usual calibration signal is 128 pixels on a side, not 32, as in most of the above arrangements). The calibration signal can be added to the host egret image at a strength that is controllable by the code; "theta" is the rotation pose parameter; "scale" is the scale pose parameter.)

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a point of sale scanner) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

Additional details concerning watermark decoding are known from Applicant's previous patent filings, including U.S. Pat. Nos. 8,401,224, 6,975,744, 6,973,197, 6,912,295, 6,590,996, 6,345,104, 6,307,949, 6,122,403, 20100150434, 20120046071, 20120078989, 20140029809, 20140108020, 20140119593 and 20150016664, and pending application Ser. No. 14/725,399, filed May 29, 2015 (now published as 20160275639), Ser. No. 14/724,729, filed May 28, 2015 (now published as 20160217547), Ser. No. 15/072,884, filed Mar. 17, 2016 (now published as 20170024840), and Ser. No. 15/237,110, filed Aug. 15, 2016. As noted, such watermarks are most commonly imperceptible, meaning they are not noticeable to a viewer examining watermarked packaging from a typical viewing distance (e.g., 20 inches) in typical retail lighting (e.g., 50-85 foot-candles).

Other work by the present Applicant relevant to the subject technology is found in patent documents 20160189381, 20140071268, 20140119593, and 20140029809, and in application 62/456,446, filed Feb. 8, 2017.

This specification has discussed several different arrangements. It should be understood that the methods, elements and features detailed in connection with one arrangement can be combined with the methods, elements and features detailed in connection with other arrangements. While some such arrangements have been particularly described, many have not—due to the large number of permutations and combinations.

By way of example and not limitation, while certain arrangements generated reference data by exhaustively considering each possible state in the pose state universe, this is not required. Instead, the pose state universe can be incompletely sampled (e.g., randomly) to streamline the process. Similarly, while the first arrangement contemplated a calibration signal that is quad-symmetric (determining rotation only within a 90 degree range), other arrangements can use a calibration signal that lacks this attribute.

Further, the staged consideration of pose parameters (e.g., rotation first, then X- and Y-translation) that was detailed in connection with the eighth arrangement, is likewise applicable in other arrangements. Ditto the incorporation of noise into the reference data. Plural constellations that have no sampling location in common were detailed in connection with the seventh arrangement, but can likewise be incorporated into the other arrangements. Different methods of computing Hamming distances were detailed in connection with the fourth arrangement; these methods are likewise applicable in other arrangements.

The movement of a sampling constellation anchor point in only one dimension, or in two dimensions (and by equal, or unequal distances in the two dimensional case) was discussed in connection with the eighth arrangement, but is similarly applicable to the other arrangements. Neural network approaches were particularly detailed in the context of certain detailed arrangements, but are generally applicable to all of the detailed arrangements.

The foregoing is just a small sampling of the features that can be interchanged between the different arrangements. Unless an artisan recognizes that combining a feature from one arrangement into another arrangement would render the latter inoperative, then such combination should be regarded as expressly anticipated by this specification.

Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

A brief review of some of the inventive aspects of the present technology follows:

In one aspect, the present technology includes an image processing method comprising the acts: producing a first ordered string of values from a received set of data, the received set of data having previously been derived from an image; and determining pose data for the image using the first ordered set of values.

In another aspect, the present technology includes an image processing method comprising the acts: producing a first ordered string of values from a received set of data, the received set of data having been previously derived from an image; performing a string-matching search for the first ordered string of values within a data structure of reference data, to identify a first record in the data structure; and using first pose information data stored in the first data structure record in determining a pose of the image.

In yet another aspect, the present technology includes an image processing method comprising the acts: sampling a received set of data at a first set of plural ordered locations, to produce a first ordered string of values, the received set of data having been previously derived from an image, the first set of ordered locations comprising a first previously-established constellation pattern; sampling the received set of data at second-through Nth-sets of plural ordered locations, to produce second-through Nth-ordered strings of values, these second-through Nth-sets of ordered locations comprising other previously-established constellation patterns, different than the first constellation pattern; using the first ordered set of values to obtain first pose information data for the image from a reference data structure; using the second-through Nth-ordered sets of values to obtain second-through Nth-pose information data for the image from the reference data structure; and combining the first-through Nth-pose information data to estimate a pose of the image.

In still another aspect, the present technology includes an image processing method comprising the acts: receiving a set of image data; transforming the set of received image data into plural sets of transformed image data, which represent the received set of image data at different scales, rotations, or translations; and applying a watermark decoding algorithm to each of these plural sets of transformed image data, using a parallel processor; wherein the set of image data needn't be analyzed to determine its affine transformation prior to watermark decoding.

In a further aspect, the present technology includes an image processing method employing a neural network including at least one convolutional layer and plural outputs, in which the method comprises the acts: (a) applying plural watermarked and unwatermarked training images to the network, and assessing signals at the plural outputs to determine errors between actual outputs and desired outputs for the training images; (b) adjusting parameters of the at least one convolutional layer based on these errors; and repeating acts (a) and (b) plural times; wherein at least ten thousand training images are applied to the network, causing the errors at the end of the method to be less than the errors the first time act (a) was performed.

In yet another aspect, the present technology includes an image processing method comprising the acts: presenting a first batch of plural images to a filter defined by plural parameters, at least some of the images in this first batch being steganographically digitally-watermarked to convey a plural-bit payload; determining first quality metrics respectively indicating detectability of the digital watermarks in watermarked images of this first batch after processing by the filter; adjusting one or more of the plural filter parameters, based in part on the determined first quality metrics, yielding a modified filter; presenting a second batch of plural images to the modified filter, at least some of these images in the second batch being steganographically digitally-watermarked to convey a plural-bit payload; determining second quality metrics respectively indicating detectability of the digital watermarks in watermarked images of this second batch after processing by the modified filter; further-adjusting one or more of the plural filter parameters, based in part on the determined second quality metrics; and using the filter, after this further-adjusting, to pre-filter a query image prior to decoding a watermark payload therefrom, the query image not being among these batches of plural images.

In another aspect, the present technology includes an image processing method including the acts: presenting a batch of plural images to a filter defined by plural parameters, yielding plural filtered images; transforming the plural filtered images to a spatial frequency domain; determining an error associated with each of the transformed filtered images; revising one or more of the plural filter parameters in accordance with the determined errors, yielding a modified filter; and processing a further image with the modified filter.

In a further aspect, the present technology includes a method of processing an image, depicting a subject, to estimate a viewpoint with which the subject is depicted in the image, the viewpoint being characterized by one or more unknown pose parameters, a first unknown pose parameter being a member of a group consisting of: scale, rotation, X-offset, Y-offset, and perspective. This method includes the acts: (a) for each of multiple pixels in the image, computing a transformed pixel value based on relationships between a value of the pixel, and values of plural neighboring pixels; (b) based on a set of L transformed pixel values, corresponding to a constellation of L of the multiple pixels, compiling a query L-tuple of transformed pixel values; and (c) identifying, from a data structure, data indicating an estimated value for the first pose parameter, based on the query L-tuple of transformed pixel values.

In still another aspect, the present technology includes a non-transitory computer readable medium containing a data structure, the data structure being organized for access using an L-tuple of transformed image pixel values taken from an image, to identify information indicating a pose parameter by which a subject is depicted in the image, where the pose parameter functions to enable identification of a steganographic digital watermark signal hidden in the image.

In yet a further aspect, the present technology comprises an image processing apparatus including: a camera; and means for processing imagery captured by the camera to determine a pose parameter characterizing a pose by which an object is depicted in the imagery.

In another aspect, the present technology concerns processing camera-captured imagery, depicting a subject, to estimate a pose between the subject and the camera, the pose being characterized, at least in part, by first and second pose parameters drawn from the group consisting of: scale, rotation, X-offset, and Y-offset. Such a method includes the acts: (a) for each of multiple pixels in the imagery, computing a transformed pixel value based on relationships between a value of the pixel, and values of plural neighboring pixels; (b) selecting an ordered sequence of L of these transformed pixel values, corresponding to a constellation of L of the multiple pixels, yielding a query L-tuple of transformed pixel values; (c) searching a reference data structure to identify a first reference L-tuple that most closely matches the query L-tuple, the first reference L-tuple having associated therewith: (i) the first and second pose parameters.

In a further aspect, the present technology includes an image processing method comprising the acts: (a) generating a patch of image data by simulating presentation of a known pattern to a camera at a known pose state; (b) non-linearly filtering data in the patch; (c) selecting an L-tuple of values from the non-linearly filtered patch; (d) providing the L-tuple, and the pose state with which it is associated, to a machine learning system; and (e) repeating acts (a)-(d) more than 10,000 times; wherein the machine learning system is able to train on the provided data to thereafter recognize the pose state by which a physical object bearing the pattern is depicted in imagery captured by a physical camera.

In still another aspect, the present technology includes an image processing method comprising the acts: in a first phase of operation, capturing a first frame of image data with a camera-equipped point of sale system; selecting blocks of imagery at first and second locations from the first frame; and submitting these blocks to a watermark decoder; wherein these blocks are selected based on location; in a second phase of operation, capturing a second frame of image data with the camera-equipped point of sale system; selecting blocks of imagery at third and fourth locations from the second frame; and submitting these blocks to a watermark decoder; wherein these blocks are selected based on their image content; and capturing further frames of image data with the camera-equipped point of sale system, and cyclically repeating through phases of operation, including the first and second phases of operation, with successive ones of the further frames.

In another aspect, the present technology includes an image processing method comprising the acts receiving a set of image data; transforming the image data to produce multiple transformed versions of the image data, employing multiple processing cores of a GPU, the transformed versions differing from each other in at least one of: scale state, rotation angle, X-offset, or Y-offset; applying a watermark detection process to these multiple transformed versions of the image data to identify one version from which a watermark payload is successfully decoded; and outputting the decoded watermark payload.

In yet another aspect, the present technology includes an image processing apparatus comprising: one or more convolution stages for receiving one or more L-tuples of data, each L-tuple comprising output data resulting from application of L non-linear transformation operations to different N×N pixel excerpts from an input image; one or more pooling stages to reduce data output from the one or more convolution stages; plural artificial neurons, each coupled to outputs of the one or more pooling stages; and first and second output artificial neurons, each coupled to outputs of the plural neurons; wherein control coefficients of the convolution stages and the neurons have been iteratively adapted, by a training process, to cause the first output neuron to activate when the input image does not contain a steganographic digital watermark, and to cause the second output neuron to activate when the input image contains a steganographic digital watermark.

In a further aspect, the present technology includes an image processing method comprising the steps: applying a non-linear transformation operation to each of L different N×N pixel excerpts from an input image, to thereby generate an L-tuple of transformed image data; using the L-tuple to identify corresponding pose data in a data structure; and using the pose data to determine whether the input image contains a steganographic digital watermark.

APPENDIX

Below is a specification of an illustrative calibration signal, comprising 80 components of different phases (specified in radians) in the spatial frequency domain (u, v). A variant signal, which is quad-symmetric in frequency, can be produced by taking the first 40 signal components, inverting the sign of the u coordinate, and assigning random phases.

| Component | u | v | Phase |
| --- | --- | --- | --- |
| 1 | 54 | 15 | 0.6103 |
| 2 | 9 | 37 | 0.7477 |
| 3 | 7 | 54 | 0.7979 |
| 4 | 30 | 12 | 0.938 |
| 5 | 19 | 43 | 0.9903 |
| 6 | 47 | 31 | 1.1742 |
| 7 | 18 | 52 | 1.2352 |
| 8 | 21 | 24 | 1.7343 |
| 9 | 28 | 18 | 1.74 |
| 10 | 25 | 42 | 1.7499 |
| 11 | 17 | 11 | 2.65 |
| 12 | 23 | 29 | 2.7567 |
| 13 | 22 | 49 | 2.7997 |
| 14 | 53 | 9 | 3.179 |
| 15 | 48 | 34 | 3.4383 |
| 16 | 52 | 22 | 3.6773 |
| 17 | 29 | 39 | 3.8707 |
| 18 | 26 | 45 | 3.9732 |
| 19 | 44 | 21 | 4.1161 |
| 20 | 6 | 40 | 4.1185 |
| 21 | 36 | 23 | 4.1201 |
| 22 | 56 | 19 | 4.2646 |
| 23 | 31 | 30 | 4.3657 |
| 24 | 57 | 7 | 4.4362 |
| 25 | 16 | 20 | 4.4571 |
| 26 | 20 | 46 | 4.6692 |
| 27 | 49 | 25 | 4.7204 |
| 28 | 27 | 36 | 4.8099 |
| 29 | 35 | 16 | 4.9776 |
| 30 | 15 | 28 | 5.0283 |
| 31 | 10 | 13 | 5.1163 |
| 32 | 11 | 27 | 5.1191 |
| 33 | 24 | 35 | 5.2824 |
| 34 | 58 | 14 | 5.3352 |
| 35 | 33 | 48 | 5.5977 |
| 36 | 45 | 38 | 5.8387 |
| 37 | 34 | 6 | 5.9704 |
| 38 | 39 | 8 | 6.0141 |
| 39 | 12 | 33 | 6.0162 |
| 40 | 42 | 41 | 6.0302 |
| 41 | 58 | −8 | 0.2 |
| 42 | 35 | −7 | 0.2164 |
| 43 | 37 | −24 | 0.2244 |
| 44 | 29 | −19 | 0.2901 |
| 45 | 27 | −46 | 0.6129 |
| 46 | 49 | −35 | 0.871 |
| 47 | 16 | −29 | 0.8915 |
| 48 | 45 | −22 | 1.0217 |
| 49 | 7 | −41 | 1.0756 |
| 50 | 53 | −23 | 1.4063 |
| 51 | 11 | −14 | 1.5301 |
| 52 | 19 | −53 | 1.5776 |
| 53 | 25 | −36 | 1.5977 |
| 54 | 50 | −26 | 1.6028 |
| 55 | 31 | −13 | 1.618 |
| 56 | 32 | −31 | 1.9924 |
| 57 | 43 | −42 | 2.1387 |
| 58 | 46 | −39 | 2.199 |
| 59 | 24 | −30 | 2.3974 |
| 60 | 21 | −47 | 2.4644 |
| 61 | 30 | −40 | 2.9738 |
| 62 | 40 | −9 | 3.0497 |
| 63 | 48 | −32 | 3.0773 |
| 64 | 10 | −38 | 3.1313 |
| 65 | 26 | −43 | 3.4362 |
| 66 | 23 | −50 | 4.0609 |
| 67 | 22 | −25 | 4.2707 |
| 68 | 54 | −10 | 4.3924 |
| 69 | 17 | −21 | 4.7418 |
| 70 | 57 | −20 | 4.761 |
| 71 | 28 | −37 | 4.9964 |
| 72 | 55 | −16 | 5.1739 |
| 73 | 12 | −28 | 5.6913 |
| 74 | 8 | −55 | 5.7389 |
| 75 | 18 | −12 | 5.7537 |
| 76 | 59 | −15 | 5.8685 |
| 77 | 34 | −49 | 6.0274 |
| 78 | 36 | −17 | 6.0287 |
| 79 | 13 | −34 | 6.0626 |
| 80 | 20 | −44 | 6.0984 |

The invention claimed is:

1. An image processing method for estimating plural affine parameters with which a tiled 2D signal, included in a pattern formed on a physical object, is depicted in camera imagery captured from the physical object, the method including the acts:
receiving first and second sets of data, one of said sets comprising reference data, corresponding to the tiled signal in a reference state, the other of said sets comprising query data, corresponding to an excerpt of said camera imagery;

transforming the first set of data to produce a hundred or more counterpart sets of data, each characterized by a different combination of plural affine parameters including scale and rotation, wherein several of said combinations have the same scale parameter but different rotation parameters, and several others of said combinations have the same rotation parameter, but different scale parameters;

correlating each of said transformed counterpart sets of first data, with said second set of data, to determine which of said transformed counterpart sets of first data yields the largest correlation value; and outputting data indicating the combination of the plural affine parameters with which said determined counterpart set of first data was transformed;

wherein said outputted data, indicating the combination of the plural affine parameters with which said determined counterpart set of the reference data was transformed, serves as an estimate of the plural affine parameters with which the tiled 2D signal is depicted in the camera-captured imagery, for aiding a steganographic digital watermark decoder in decoding a watermark payload from the camera-captured imagery.

2. The method of claim 1 in which said transforming act is performed on said received set of query data.

3. The method of claim 1 that further includes: providing said outputted data to a steganographic digital watermark decoder; and based in part on said provided data, the steganographic digital watermark decoder decoding a watermark payload from the camera-captured imagery.

4. A non-transitory computer-readable medium embodying program code executable in at least one computing device that, when executed by the at least one computing device, causes the at least one computing device to estimate plural affine parameters with which a tiled 2D signal, included in in a pattern formed on a physical object, is depicted in camera imagery captured from the physical object, by acts including:

receiving first and second sets of data, one of said sets comprising reference data, corresponding to the tiled signal in a reference state, the other of said sets comprising query data, corresponding to an excerpt of said camera imagery;

transforming the first set of data to produce a hundred or more counterpart sets of data, each characterized by a different combination of plural affine parameters including scale and rotation, wherein several of said combinations have the same scale parameter but different rotation parameters, and several others of said combinations have the same rotation parameter, but different scale parameters;

correlating each of said transformed counterpart sets of first data, with said second set of data, to determine which of said transformed counterpart sets of first data yields the largest correlation value; and outputting data indicating the combination of the plural affine parameters with which said determined counterpart set of first data was transformed, so that a steganographic digital watermark decoder can have an estimate of the plural affine parameters needed to decode a watermark payload from the camera-captured imagery.

5. The computer readable medium of claim 4 in which said transforming act is performed on said received set of query data.

6. The computer-readable medium of claim 4 in which the program code, when executed in the at least one computing device, causes said device to decode a watermark payload from the camera-captured imagery, based in part on said outputted data.

7. A hardware computer device including one or more processors configured by instructions stored in memory to estimate plural affine parameters with which a tiled 2D signal, included in in a pattern formed on a physical object, is depicted in camera imagery captured from the physical object, said instructions configuring the one or more processors to perform acts including:

receiving first and second sets of data, one of said sets comprising reference data, corresponding to the tiled signal in a reference state, the other of said sets comprising query data, corresponding to an excerpt of said camera imagery;

transforming the first set of data to produce a hundred or more counterpart sets of data, each characterized by a different combination of plural affine parameters including scale and rotation, wherein several of said combinations have the same scale parameter but different rotation parameters, and several others of said combinations have the same rotation parameter, but different scale parameters;

correlating each of said transformed counterpart sets of first data, with said second set of data, to determine which of said transformed counterpart sets of first data yields the largest correlation value; and outputting data indicating the combination of the plural affine parameters with which said determined counterpart set of first data was transformed, so that a steganographic digital watermark decoder can have an estimate of the plural affine parameters needed to decode a watermark payload from the camera-captured imagery.

8. The computer device of claim 7 in which said transforming act is performed on said received set of query data.

9. The hardware device of claim 7 in which said instructions further configure the one or more processors to decode a watermark payload from the camera-captured imagery, based in part on said outputted data.

10. A method for estimating plural affine parameters with which a tiled 2D signal, included in in a pattern formed on a physical object, is depicted in camera imagery captured from the physical object, said estimating being based on a 2D pattern within the tiled 2D signal as printed on the object, the method including the acts:

receiving query data corresponding to an excerpt of said camera imagery;

recalling reference data, earlier-produced by transforming data corresponding to said 2D pattern to produce a hundred or more counterpart sets of data, each characterized by a different combination of plural affine parameters including scale and rotation, wherein several of said combinations have the same scale parameter but different rotation parameters, and several others of said combinations have the same rotation parameter, but different scale parameters;

comparing the query data and the reference data to determine which of said transformed counterpart sets of the reference data is most similar to the query data; and outputting data indicating the combination of the plural affine parameters with which said determined counterpart set of the reference data was transformed;

wherein said outputted data, indicating the combination of the plural affine parameters with which said determined counterpart set of the reference data was transformed, serves as an estimate of the plural affine parameters with which the tiled 2D signal is depicted in the camera-captured imagery, for aiding a steganographic digital watermark decoder in decoding a watermark payload from the camera-captured imagery.

11. The method of claim 10 that further includes: providing said outputted data to a steganographic digital watermark decoder; and based in part on said provided data, the steganographic digital watermark decoder decoding a watermark payload from the camera-captured imagery.

12. The method of claim 10 in which the comparing comprises correlating.

13. The method of claim 10 in which the reference data was earlier-produced by transforming data corresponding to said 2D pattern to produce a million or more counterpart sets of data, each characterized by a different combination of plural affine parameters including scale and rotation.

14. A system for estimating plural affine parameters with which a tiled 2D signal, included in in a pattern formed on a physical object, is depicted in camera imagery captured from the physical object, based on a 2D pattern within the tiled 2D signal as printed on the object, the system comprising:

an input for receiving query data, the query data corresponding to an excerpt of the camera imagery;

first means, for obtaining reference data corresponding to the 2D pattern, the reference data comprising a hundred or more transformed counterpart sets of data based on said 2D pattern, each characterized by a different combination of plural affine parameters including scale and rotation, wherein several of said combinations have the same scale parameter but different rotation parameters, and several others of said combinations have the same rotation parameter, but different scale parameters; and second means, employing the reference data obtained by the first means, for estimating a combination of plural affine parameters characterizing pose of the query data;

wherein said plural affine parameters characterizing pose of the query data is useful to a steganographic digital watermark decoder in decoding a watermark payload from the camera-captured imagery.

15. The system of claim 14 that further includes a steganographic digital watermark decoder that receives said estimated plural affine parameters characterizing pose of the query data.

16. The system of claim 14 in which the second means comprises a correlator configured to determine which counterpart set of the reference data has a highest correlation with the query data.

17. The system of claim 14 in which the second means comprises a neural network, previously-trained using said hundred or more transformed counterpart sets of data, and the different combination of plural affine parameters characterizing each, to identify the combination of plural affine parameters that characterizes the pose of the query data.

18. The system of claim 14 in which the reference data comprises a million or more transformed counterpart sets of data, each characterized by a different combination of plural affine parameters including scale and rotation.

* * * * *